Dec. 21, 1954 W. T. GOLLWITZER ET AL 2,697,396
SELECTIVE PRINTING AND PUNCHING MACHINE
Filed May 31, 1949 33 Sheets-Sheet 1

Inventors
Walter T. Gollwitzer
Robert H. Lease
By Wallace and Cannon
Attorneys

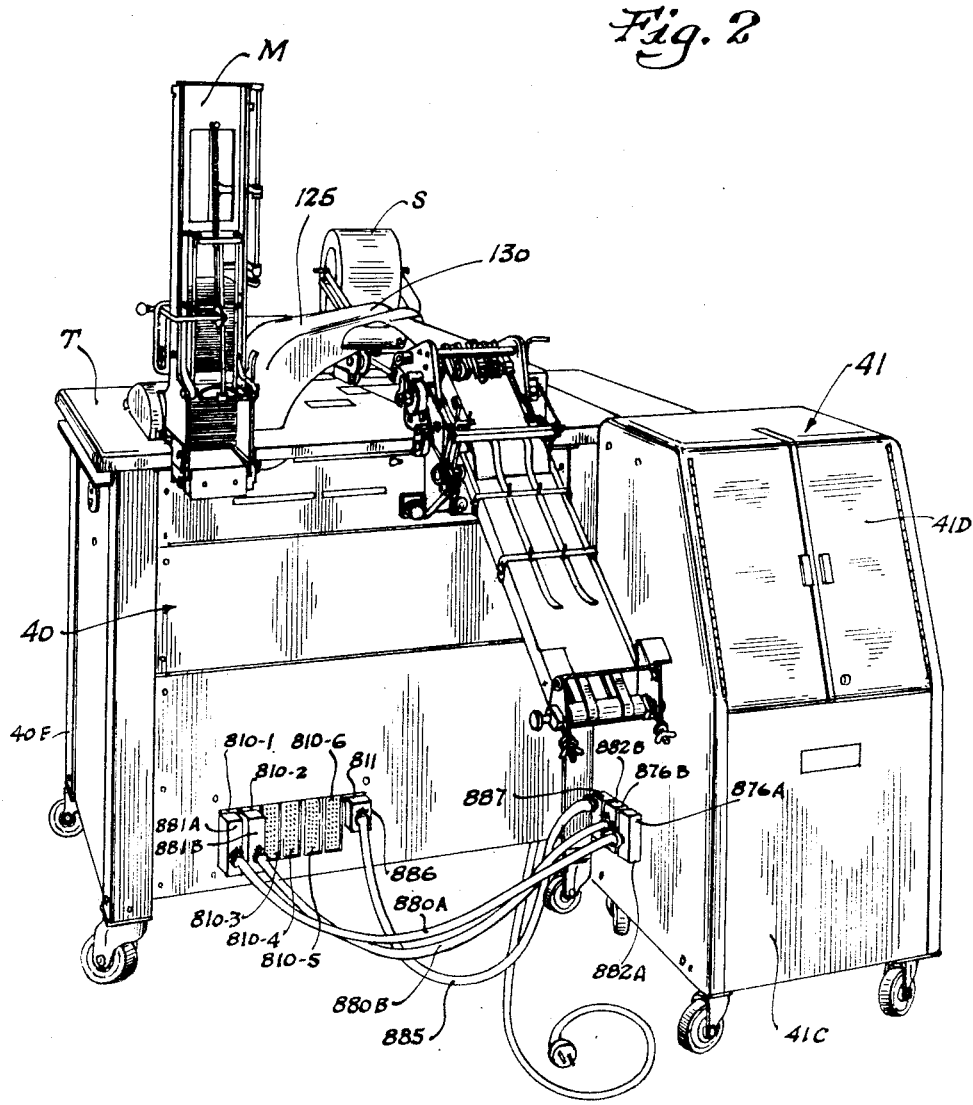

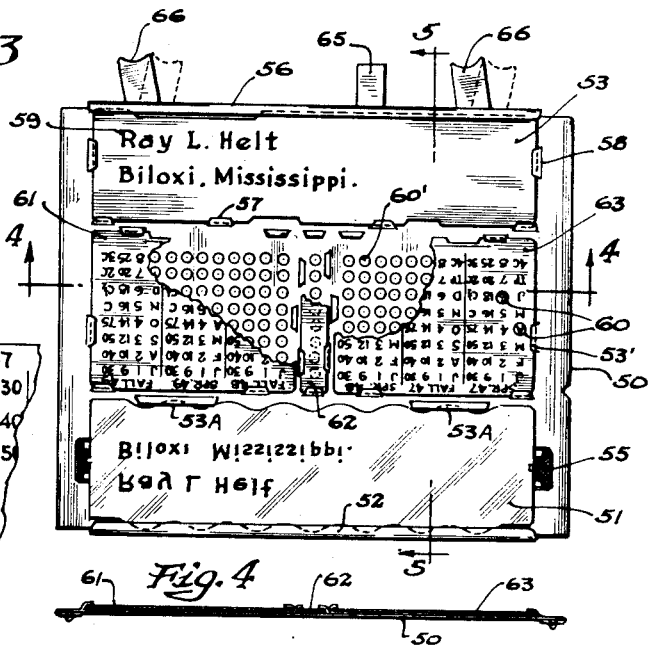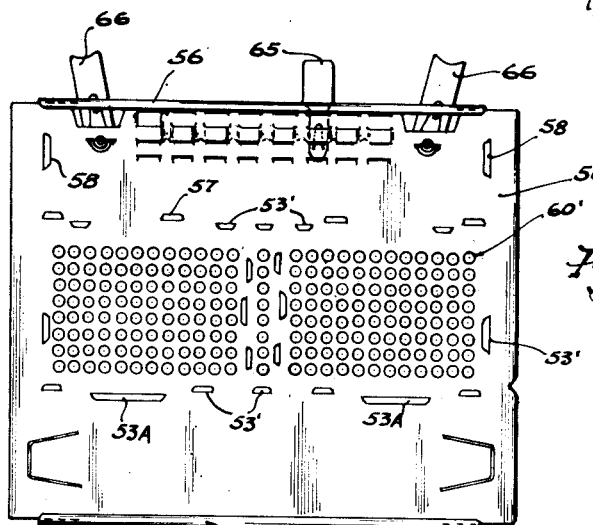

Dec. 21, 1954 W. T. GOLLWITZER ET AL 2,697,396
SELECTIVE PRINTING AND PUNCHING MACHINE
Filed May 31, 1949 33 Sheets-Sheet 4

Inventors
Walter T. Gollwitzer
Robert H. Lease
By Wallace and Cannon
Attorneys

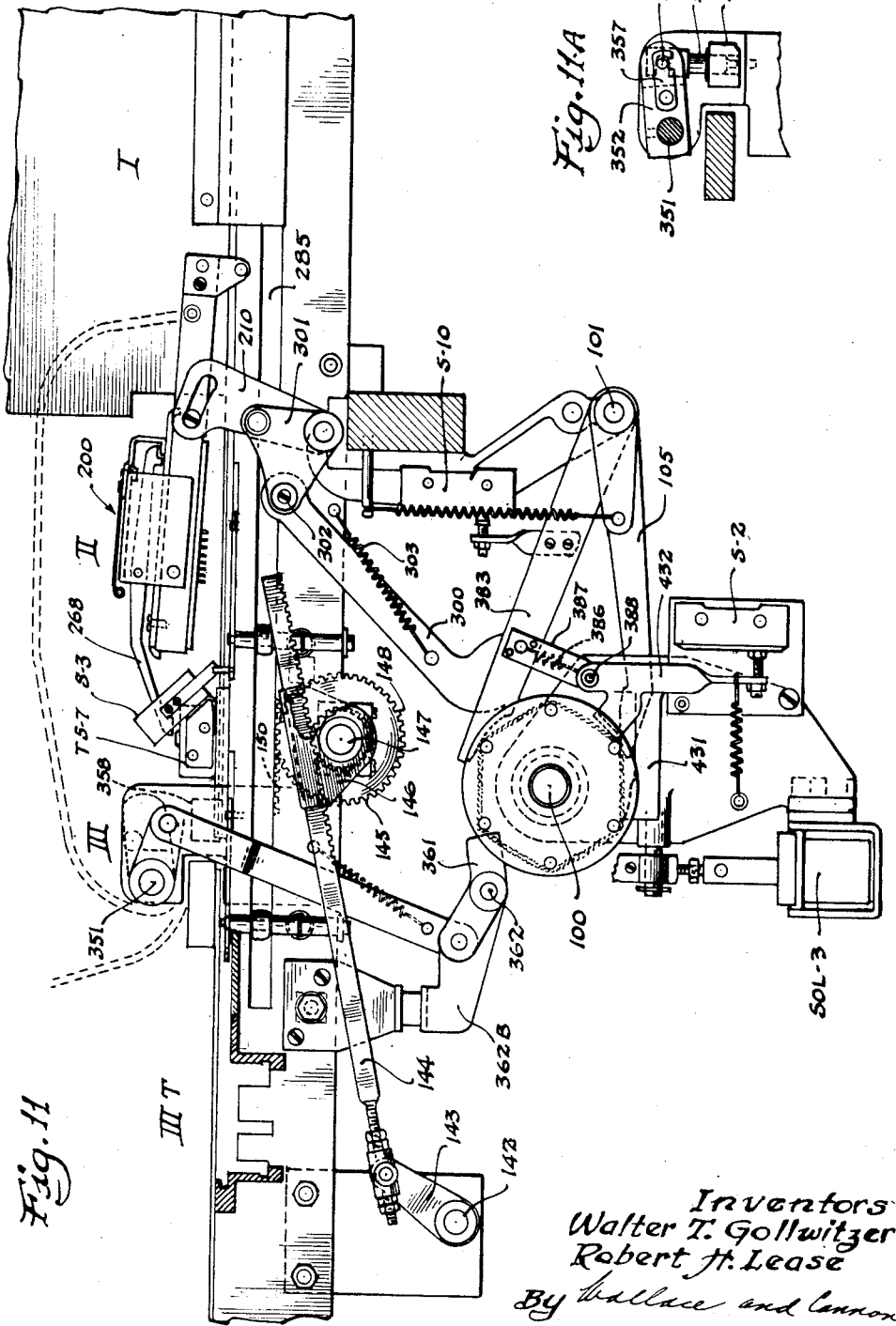

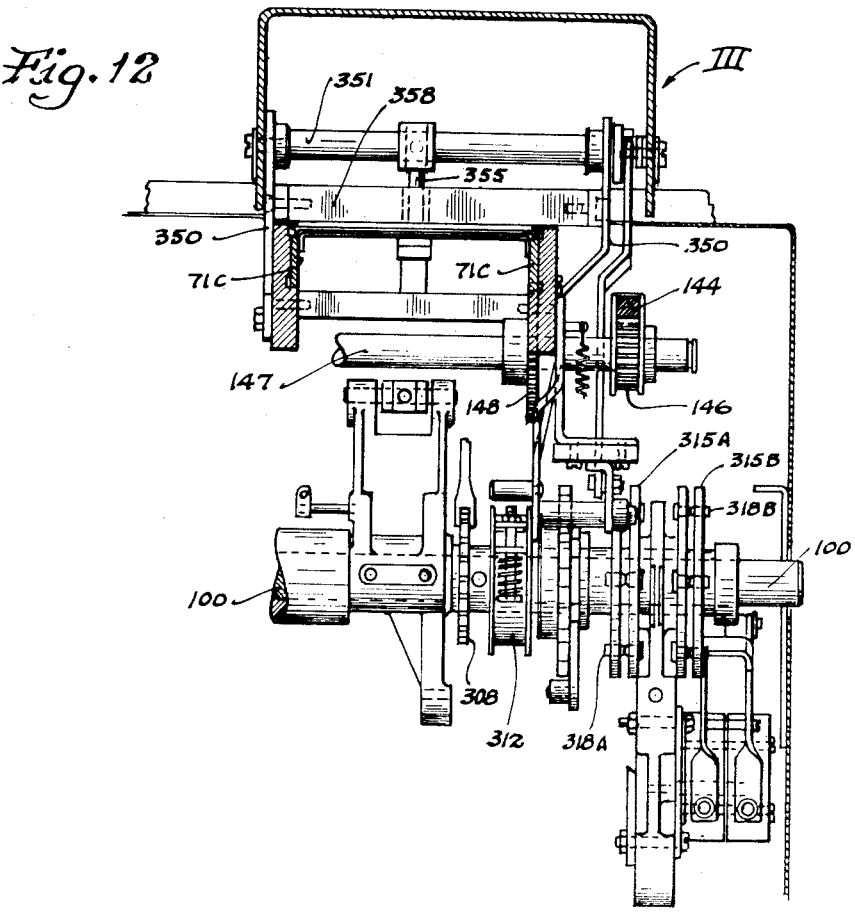

Dec. 21, 1954    W. T. GOLLWITZER ET AL    2,697,396
SELECTIVE PRINTING AND PUNCHING MACHINE
Filed May 31, 1949                                      33 Sheets-Sheet 8

Inventors
Walter T. Gollwitzer
Robert H. Lease
By Wallace and Cannon
Attorneys

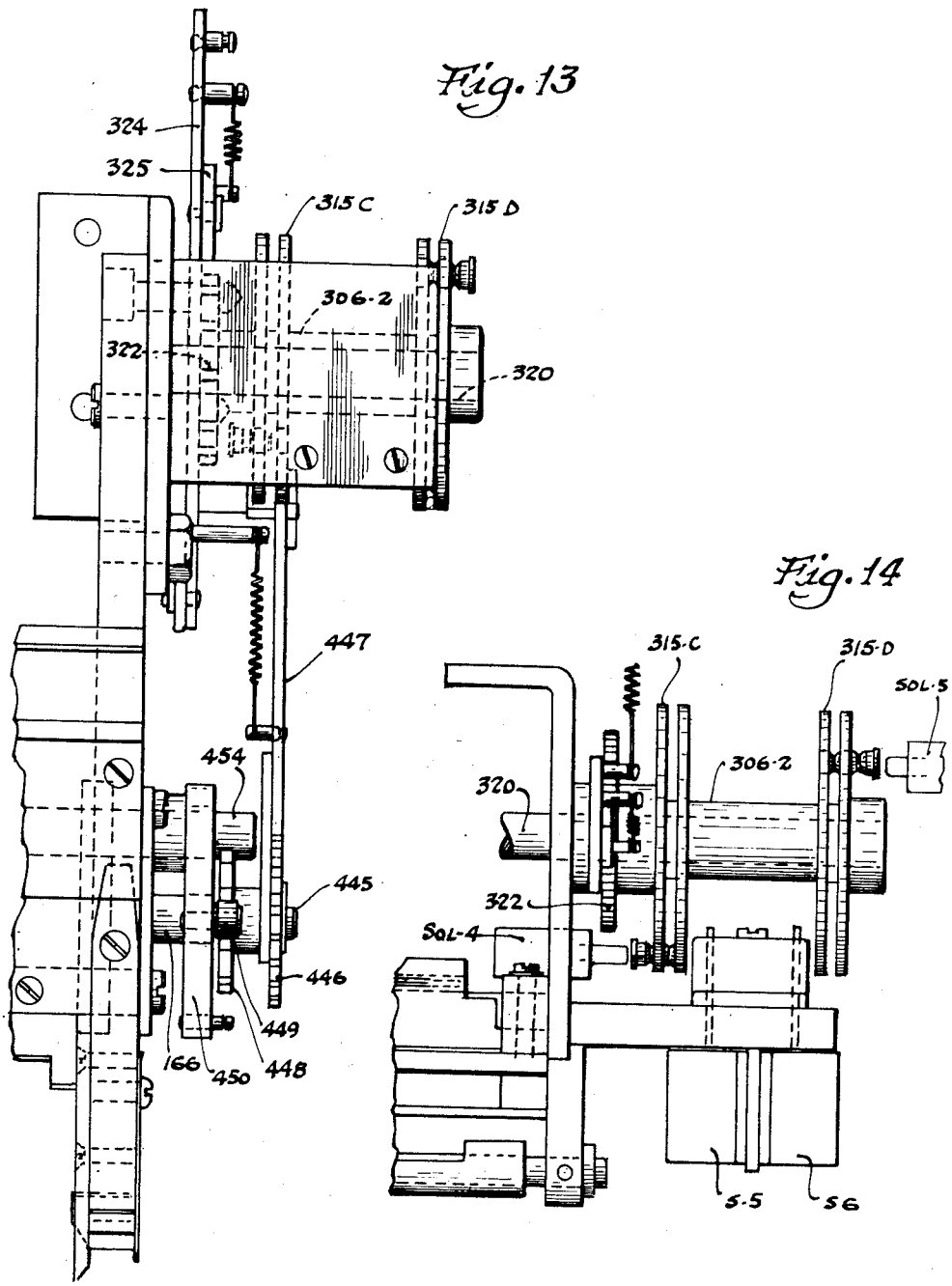

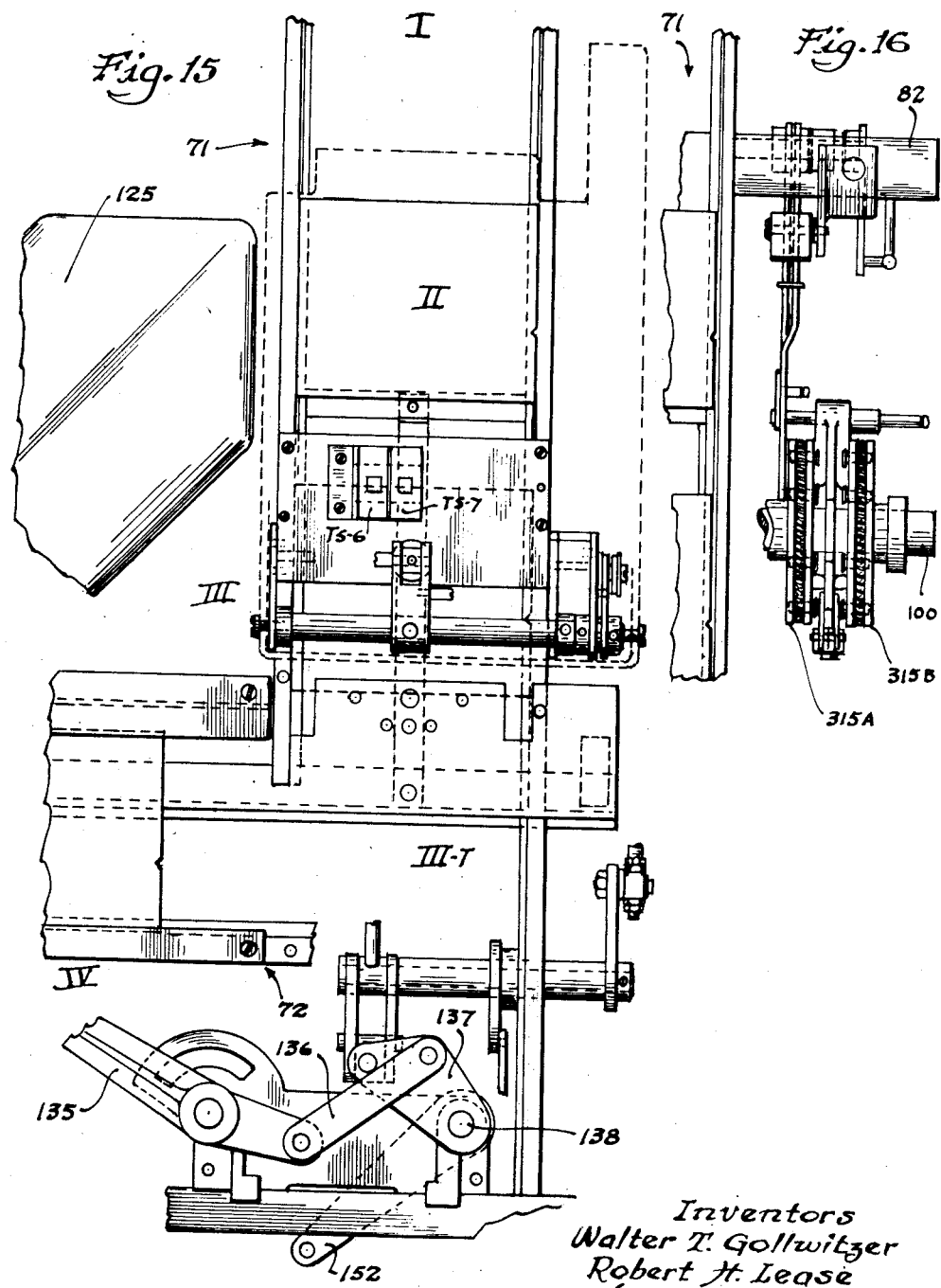

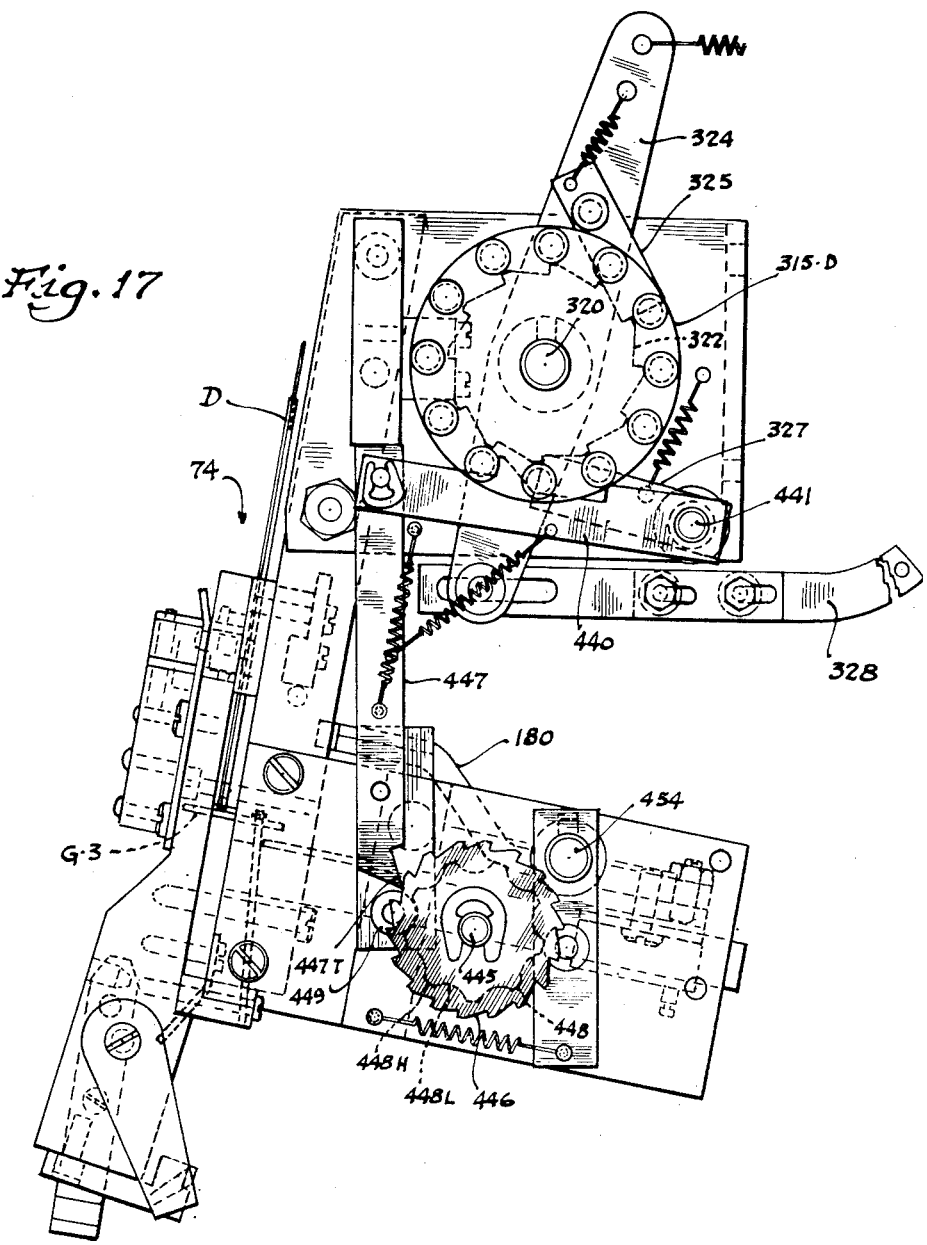

Dec. 21, 1954  W. T. GOLLWITZER ET AL  2,697,396
SELECTIVE PRINTING AND PUNCHING MACHINE
Filed May 31, 1949  33 Sheets-Sheet 12
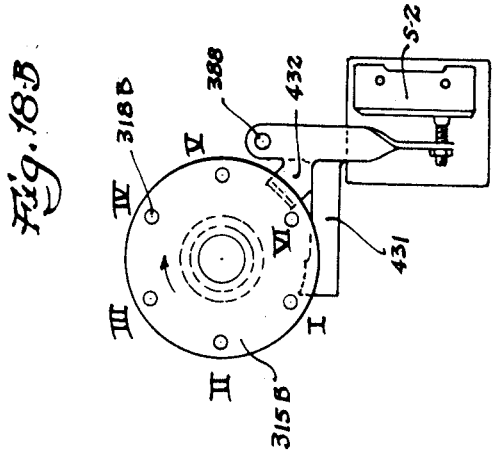
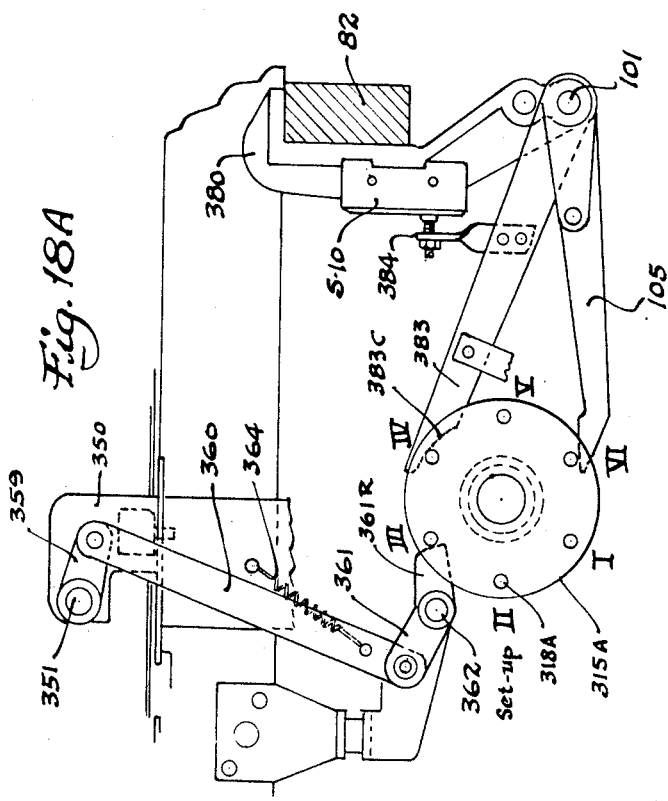
Inventors
Walter T. Gollwitzer
Robert H. Lease
By Wallace and Cannon
Attorneys

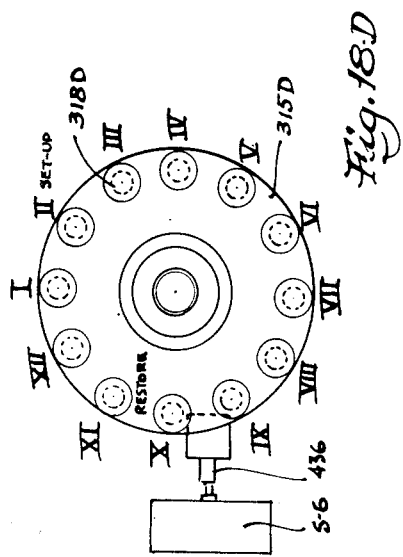
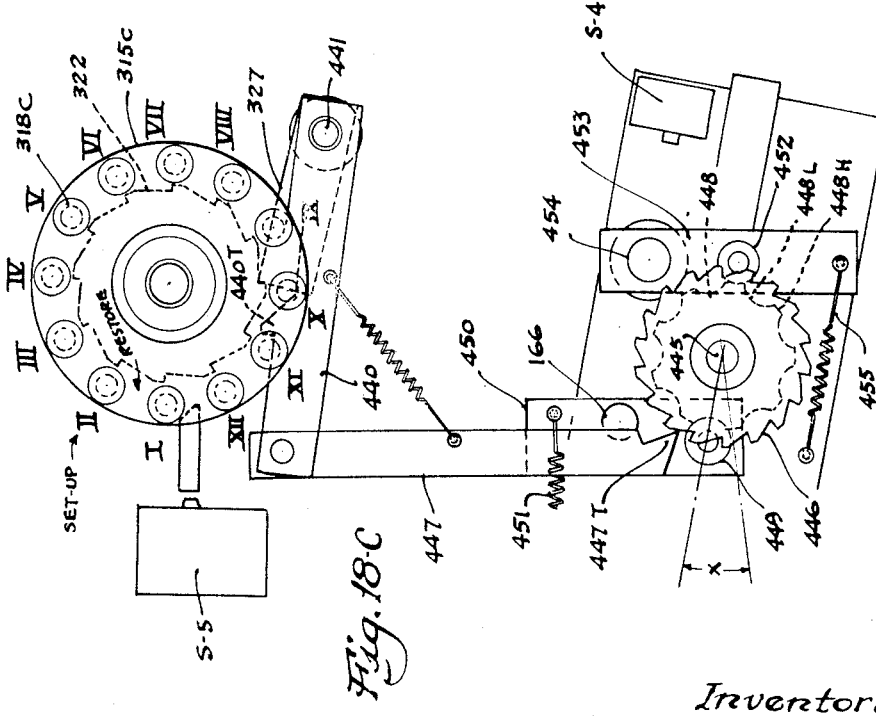

Dec. 21, 1954  W. T. GOLLWITZER ET AL  2,697,396
SELECTIVE PRINTING AND PUNCHING MACHINE
Filed May 31, 1949  33 Sheets-Sheet 14
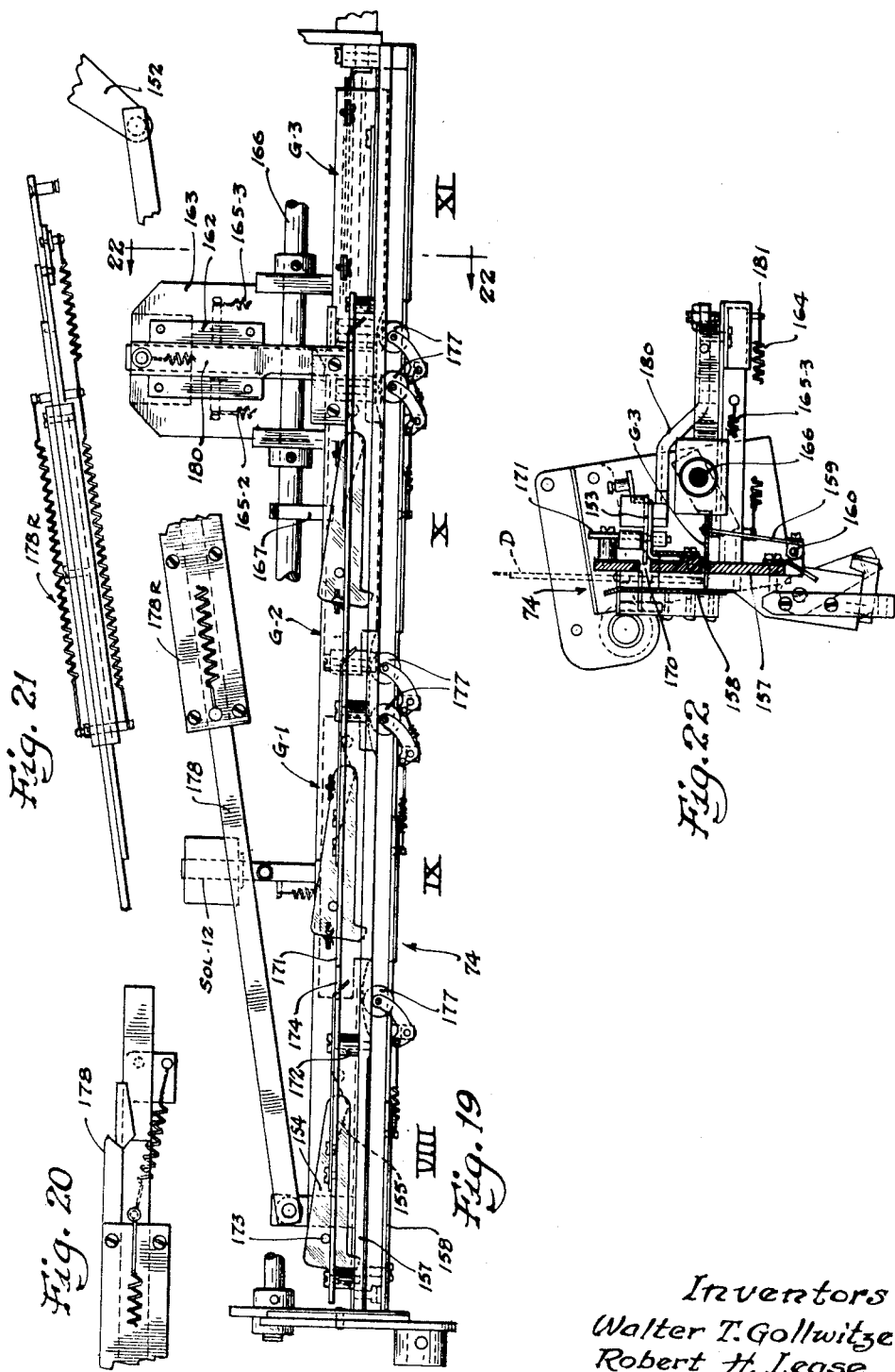
Inventors
Walter T. Gollwitzer
Robert H. Lease
By Wallace and Cannon
Attorneys Dec. 21, 1954  W. T. GOLLWITZER ET AL  2,697,396
SELECTIVE PRINTING AND PUNCHING MACHINE
Filed May 31, 1949  33 Sheets-Sheet 15
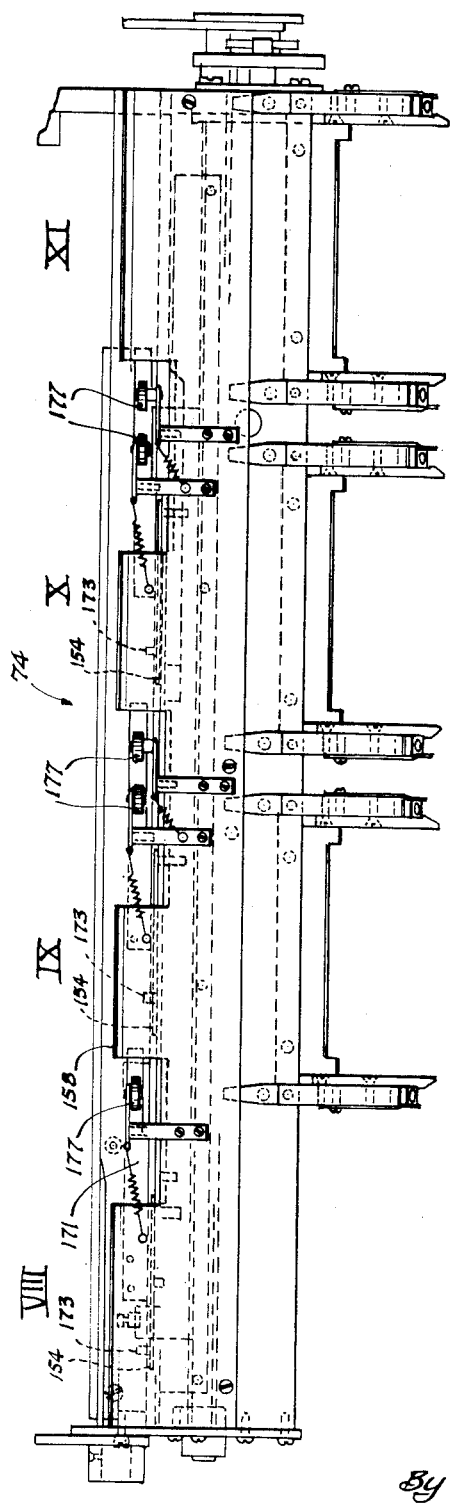
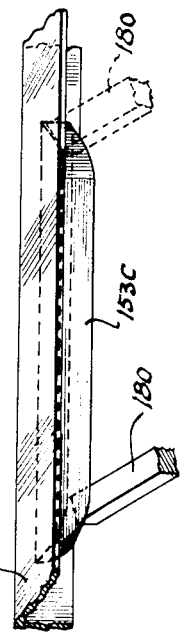
Inventors
Walter T. Gollwitzer
Robert H. Lease
By Wallace and Cannon
Attorneys

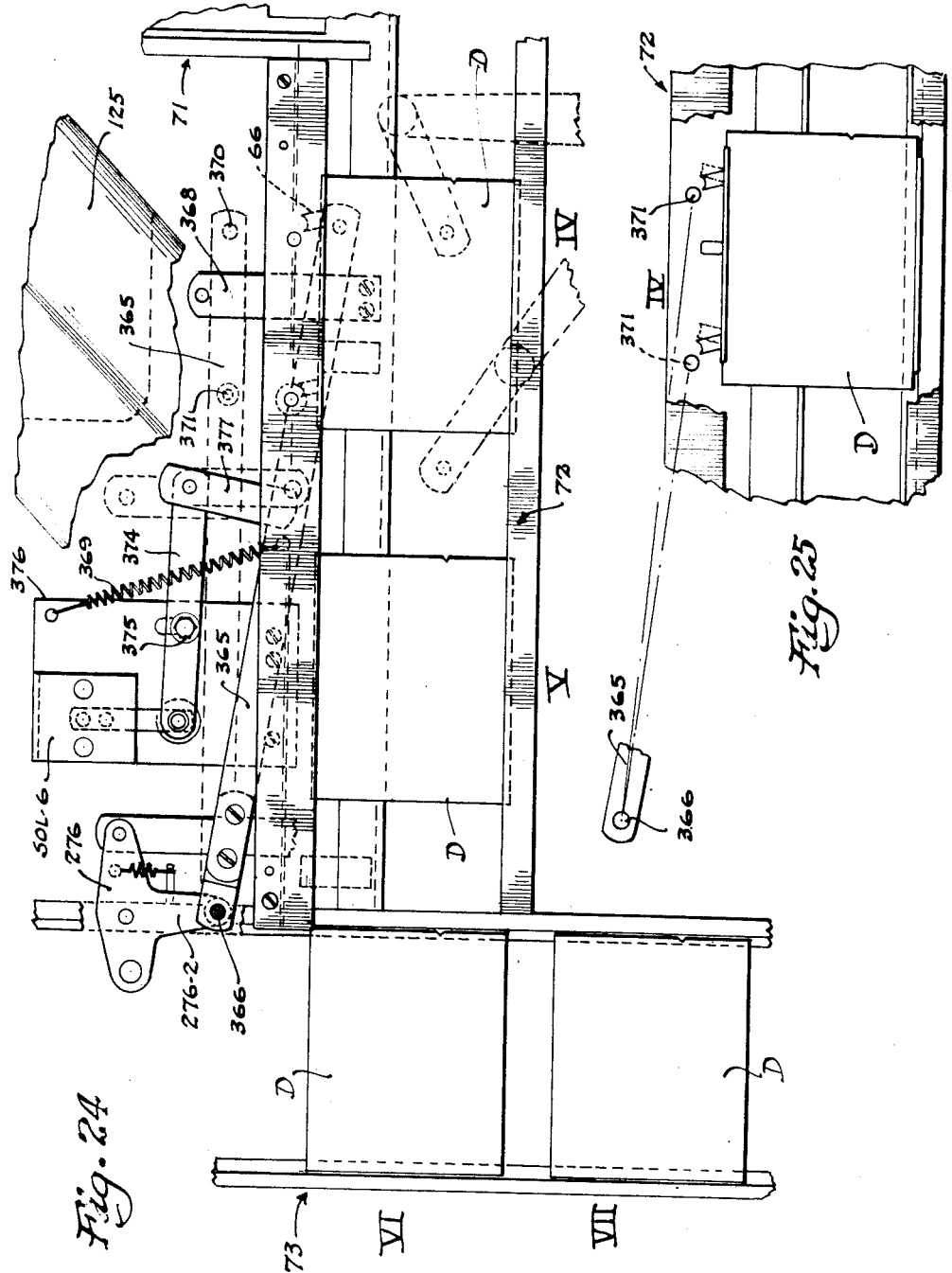

Dec. 21, 1954  W. T. GOLLWITZER ET AL  2,697,396
SELECTIVE PRINTING AND PUNCHING MACHINE
Filed May 31, 1949  33 Sheets-Sheet 17
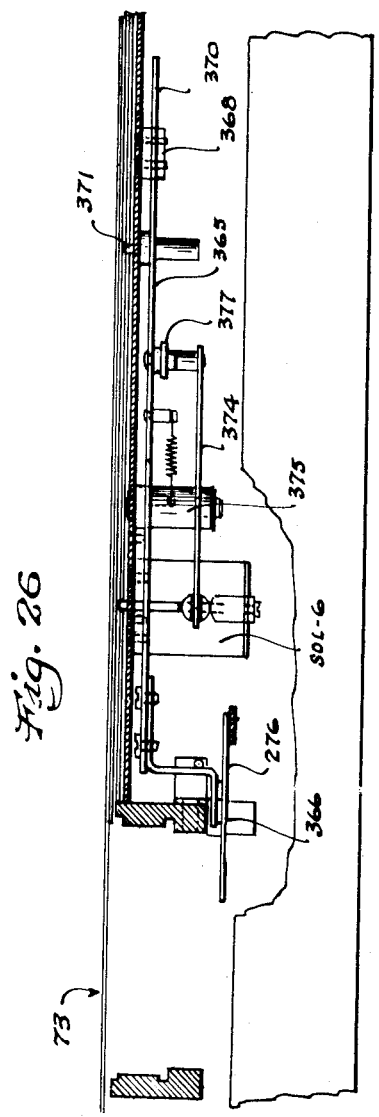
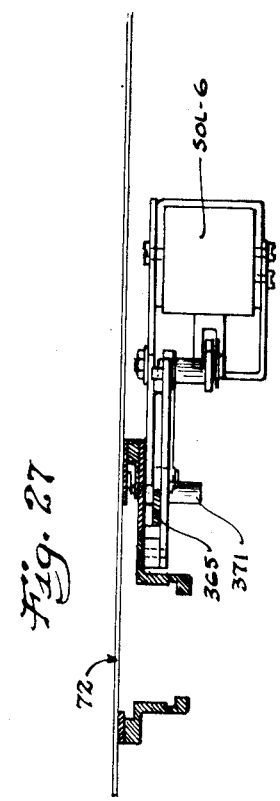
Inventors
Walter T. Gollwitzer
Robert H. Lease
By Wallace and Cannon
Attorneys

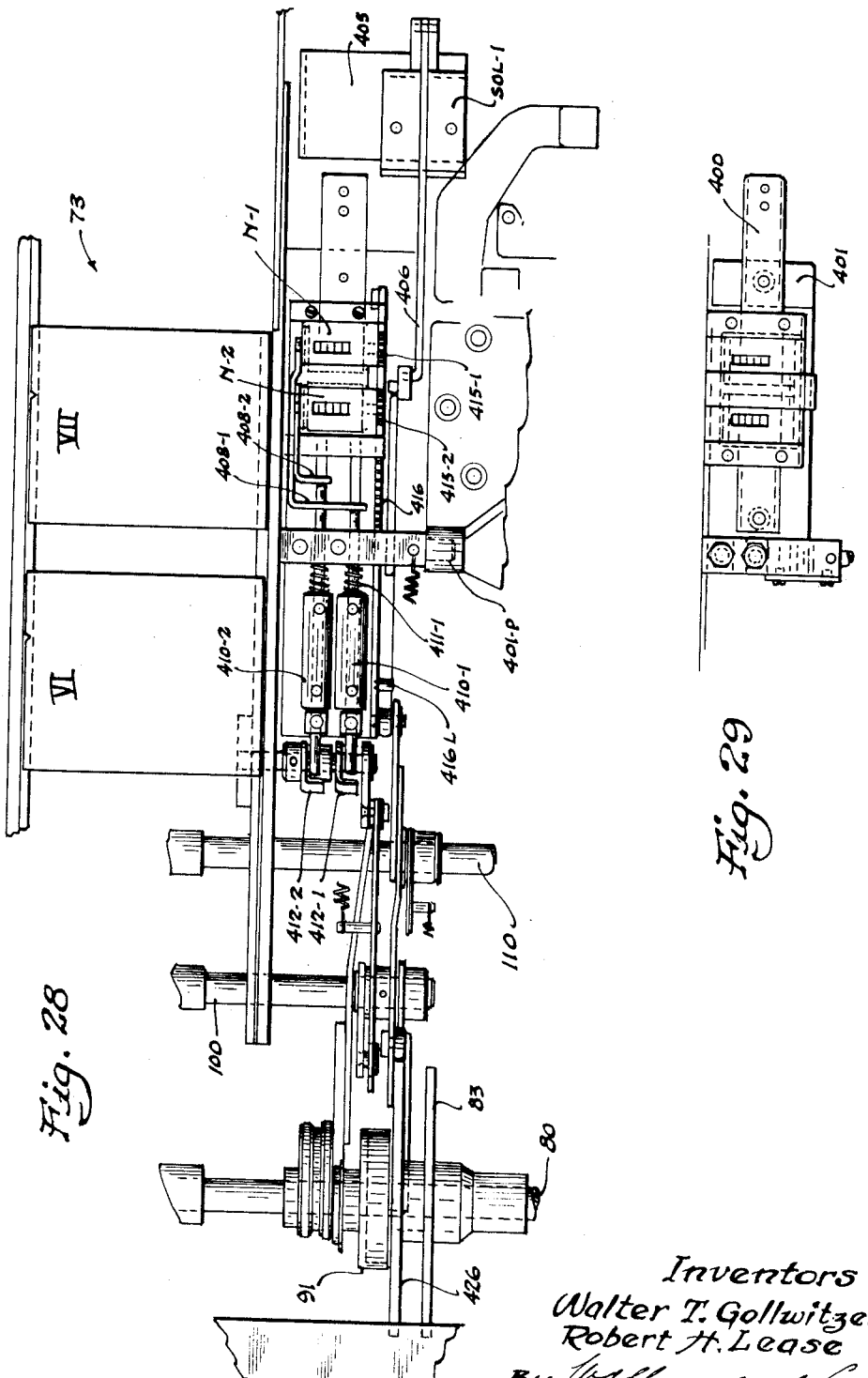

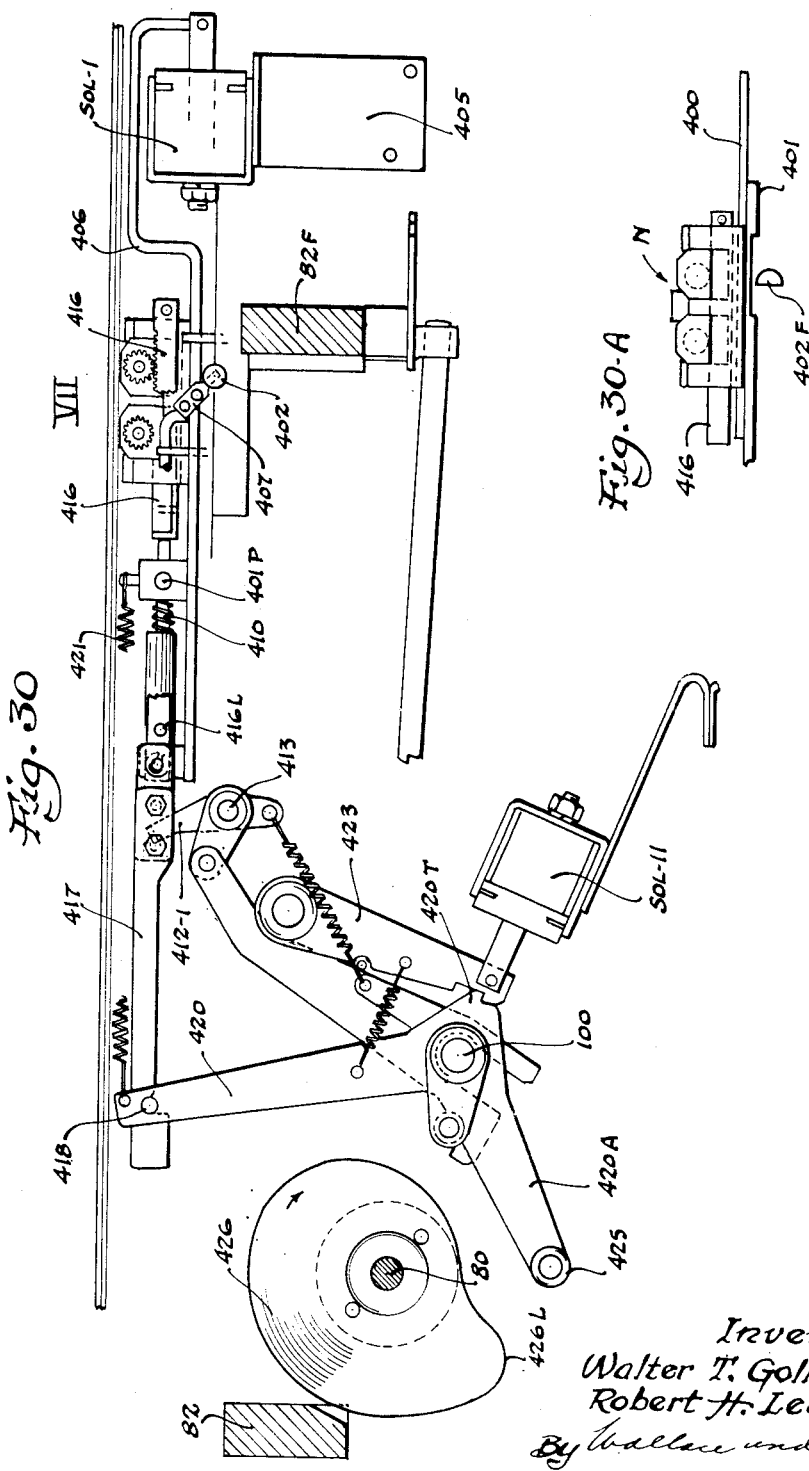

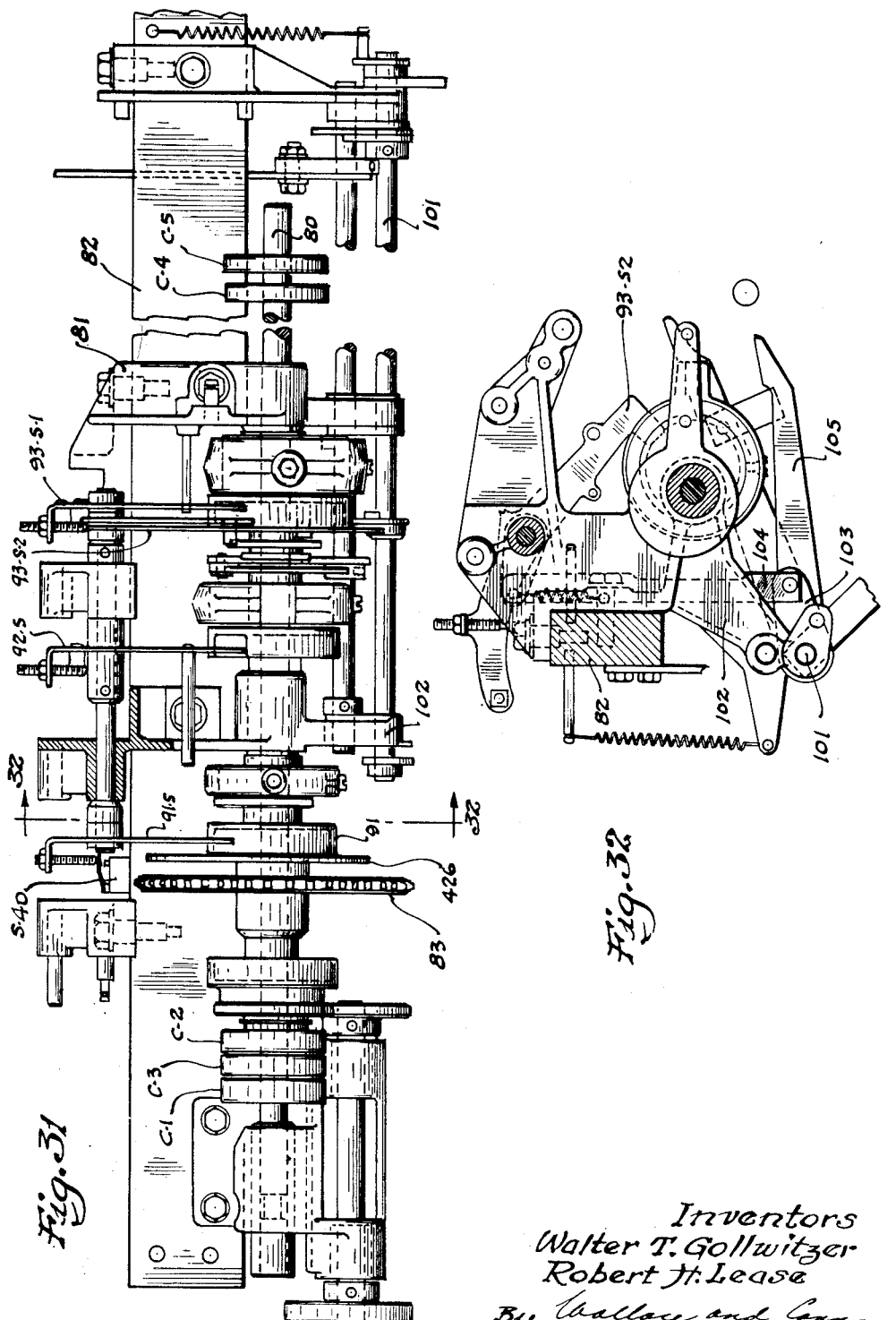

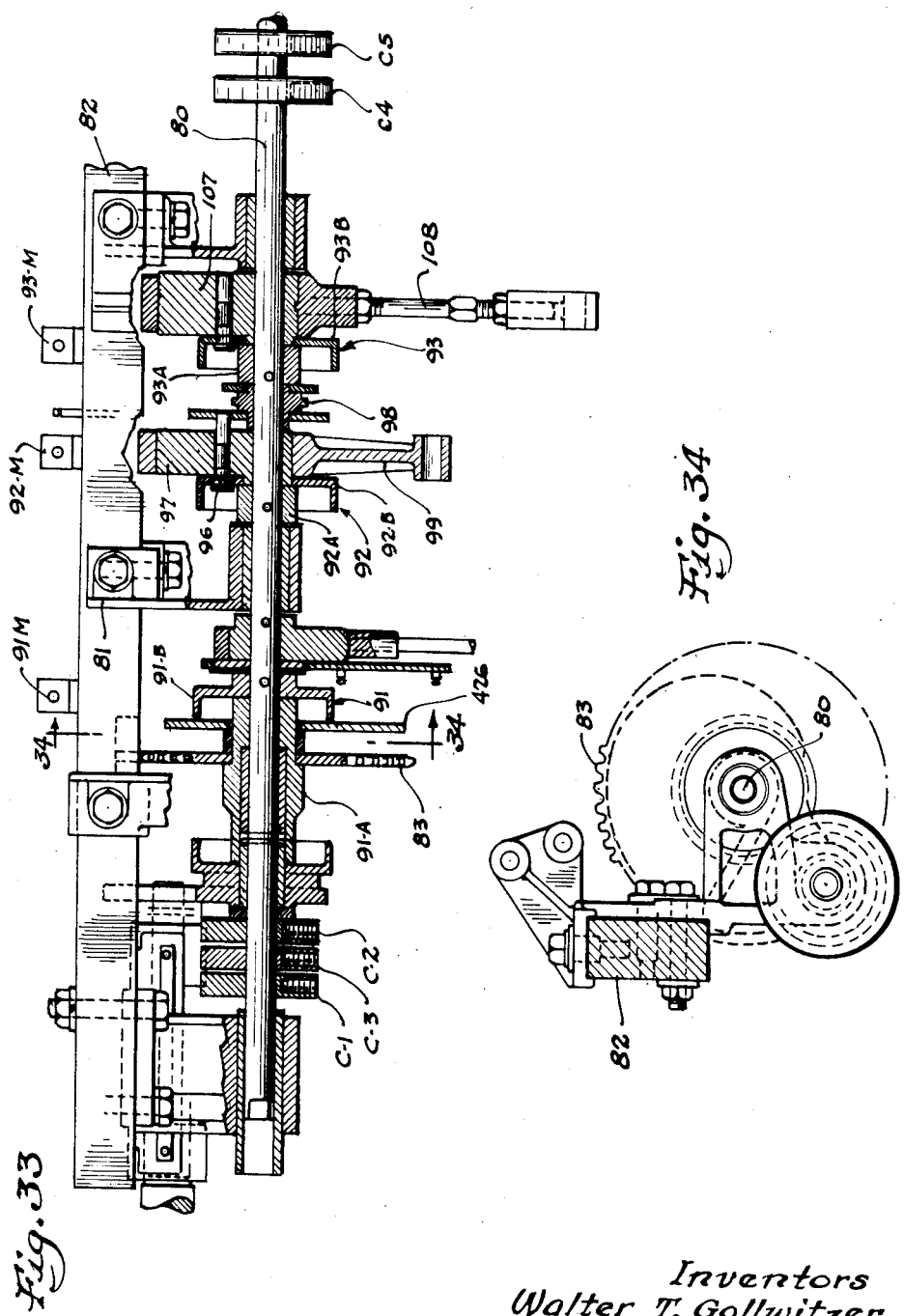

Dec. 21, 1954 W. T. GOLLWITZER ET AL 2,697,396
SELECTIVE PRINTING AND PUNCHING MACHINE
Filed May 31, 1949 33 Sheets-Sheet 22
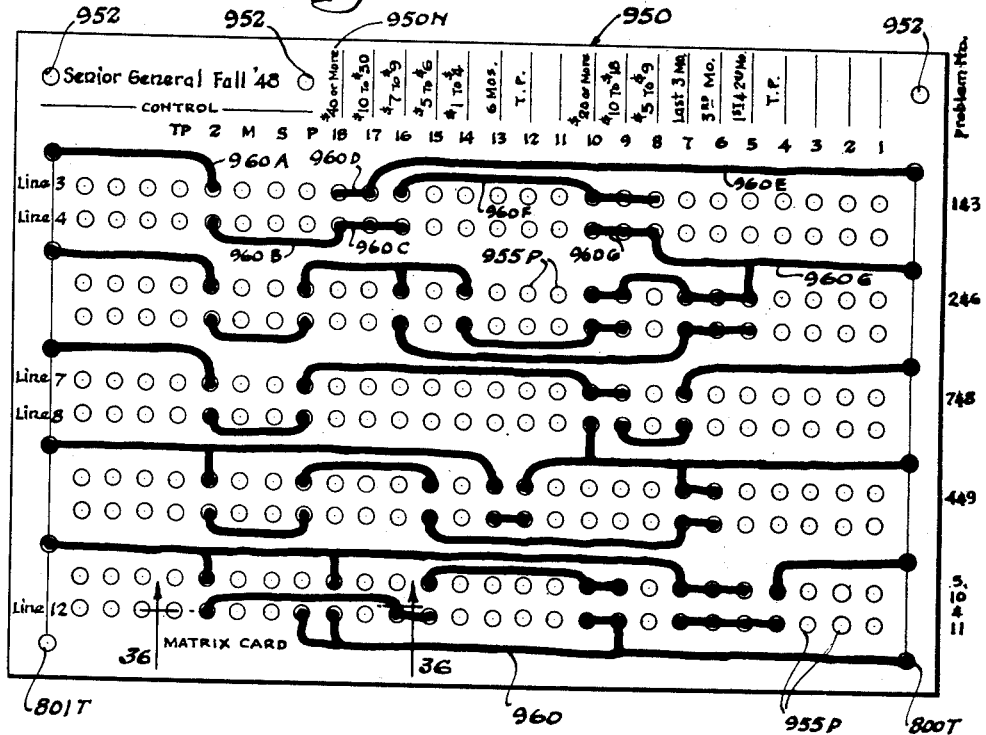
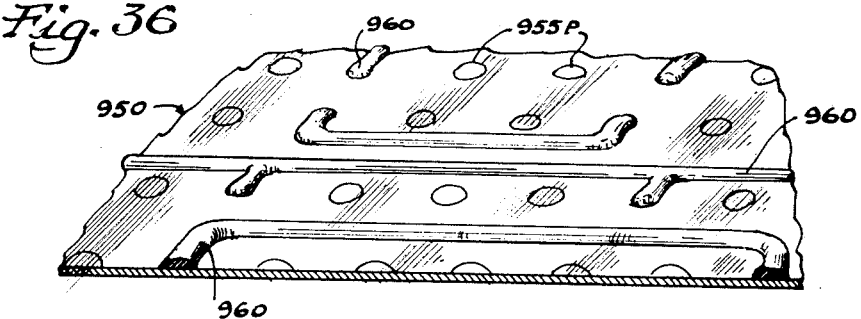
Inventors
Walter T. Gollwitzer
Robert H. Lease
By Wallace and Cannon
Attorneys Dec. 21, 1954           W. T. GOLLWITZER ET AL           2,697,396
                  SELECTIVE PRINTING AND PUNCHING MACHINE
Filed May 31, 1949                                    33 Sheets-Sheet 23

FIG. 36A

PROBLEMS SHOWING TYPICAL SELECTIVE BASES TO BE SET UP IN QUALIFIER 41

| PROBLEM NO. | TYPE OF CUSTOMER AS SHOWN BY CONTROL CARD 62 | PRECEDING SEASON | SECOND PRECEDING SEASON |
|---|---|---|---|
| 1 | 2 ORDERS | $10 OR MORE | — |
| 2 | 2 ORDERS & PREV. PREFD. | $7 TO $9 | AN ORDER |
| 3 | 2 ORDERS | $7 TO $9 | $5 OR MORE |
| 4 | 2 ORDERS & PREV. PREFD. | $5 TO $6 | ORDER IN LAST 4 MOS. |
| 5 | 2 ORDERS | $5 TO $6 | $10 OR MORE |
| 6 | 2 ORDERS & PREV. PREFD. | $1 TO $4 | $10 OR MORE |
| 7 | 2 ORDERS | — | $10 OR MORE AND AN ORDER IN LAST 3 MOS. |
| 8 | 2 ORDERS | — | $20 OR MORE |
| 9 | — | T.P. & AN ORDER | — |
| 10 | — | — | T.P. & AN ORDER |
| 11 | — | $40 OR MORE | — |

THESE ITEMS CAUSE SELECTIVE OPERATION OF RELAYS 900-19 TO 900-26

THESE FACTORS ARE ASSIGNED TO DIFFERENT RELAYS 900-1 TO 900-18, AND CONNECTIONS FROM FIELDS 873A TO RELATED COLUMNS OF SOCKETS 930 ARE MADE BY PLUG CONNECTORS 940 (SEE FIG. 36B). FACTORS ARE THEN WRITTEN OVER CORRESPONDING MATRIX CARD COLUMNS 1-18 (SEE FIG. 35)

*INVENTORS*
WALTER T. GOLLWITZER
ROBERT H. LEASE
BY *Wallace and Connor*
                       ATTORNEYS Dec. 21, 1954  W. T. GOLLWITZER ET AL  2,697,396
SELECTIVE PRINTING AND PUNCHING MACHINE
Filed May 31, 1949  33 Sheets-Sheet 24

AFTER PLUGGING, THE VALUES ASSIGNED TO THE DIFFERENT COLUMNS OF THE PLUG BOARD SECTION 870 L ARE NOTED OVER CORRESPONDING MATRIX CARD COLUMNS 1-18 (SEE FIG. 35)

*INVENTORS*
WALTER T. GOLLWITZER
ROBERT H. LEASE
BY Wallace and Cannon
ATTORNEYS Dec. 21, 1954 W. T. GOLLWITZER ET AL 2,697,396
SELECTIVE PRINTING AND PUNCHING MACHINE
Filed May 31, 1949 33 Sheets-Sheet 25

Inventors
Walter T. Gollwitzer
Robert H. Lease
By Wallace and Cannon
Attorneys

Dec. 21, 1954   W. T. GOLLWITZER ET AL   2,697,396
SELECTIVE PRINTING AND PUNCHING MACHINE
Filed May 31, 1949   33 Sheets-Sheet 26
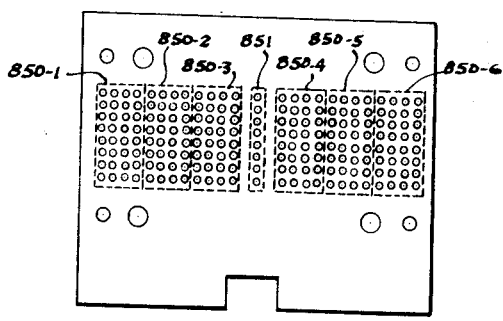
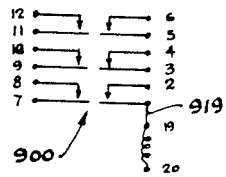
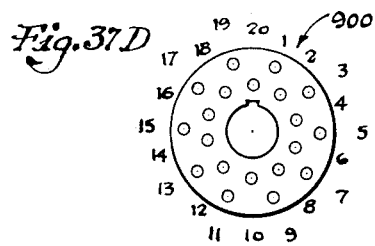
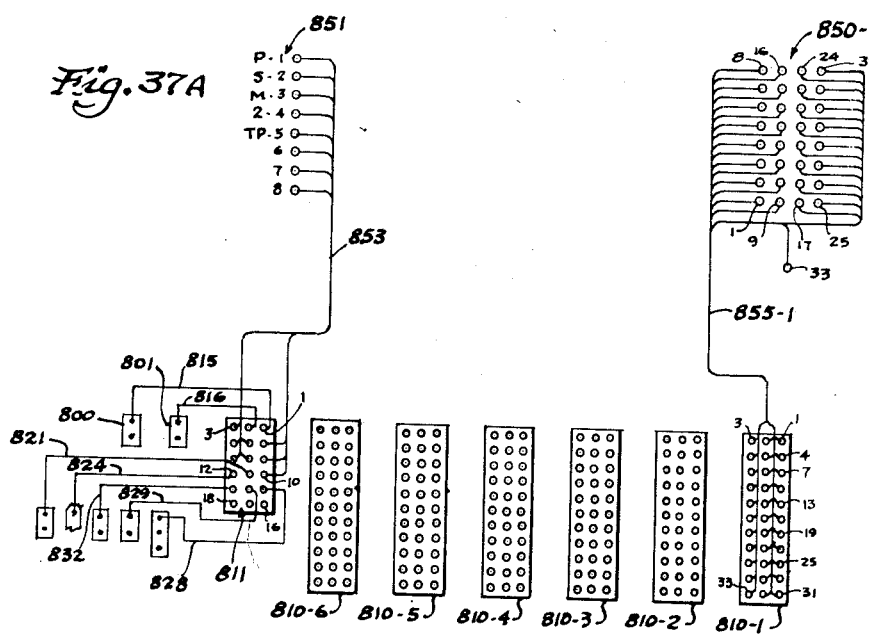
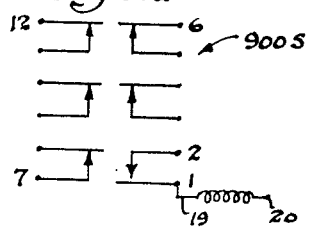
Inventors
Walter T. Gollwitzer
Robert H. Lease
By Wallace and Cansen
Attorneys Inventors
Walter T. Gollwitzer
Robert H. Lease
By Wallace and Cannon
Attorneys Inventors
Walter T. Gollwitzer
Robert H. Lease
By Wallace and Cannon
Attorneys INVENTORS
WALTER T. GOLLWITZER
ROBERT H. LEASE
BY Wallace and Cannon
ATTORNEYS Dec. 21, 1954   W. T. GOLLWITZER ET AL   2,697,396
SELECTIVE PRINTING AND PUNCHING MACHINE
Filed May 31, 1949   33 Sheets-Sheet 31
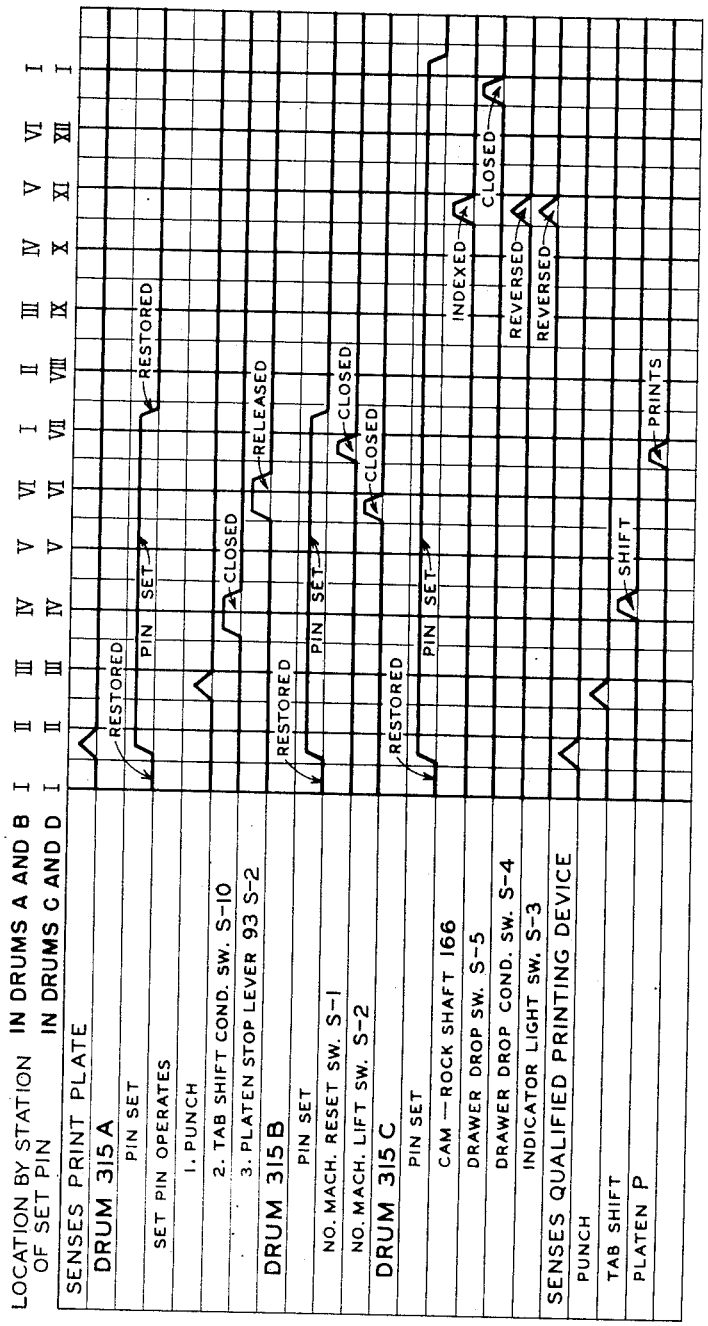
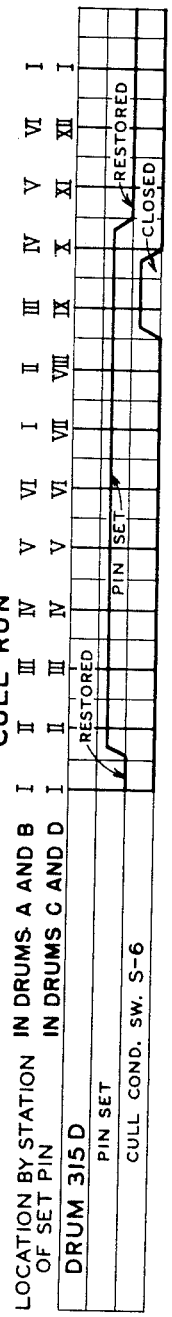
*INVENTORS*
WALTER T. GOLLWITZER
ROBERT H. LEASE
BY *Wallace and Cannon*
ATTORNEYS

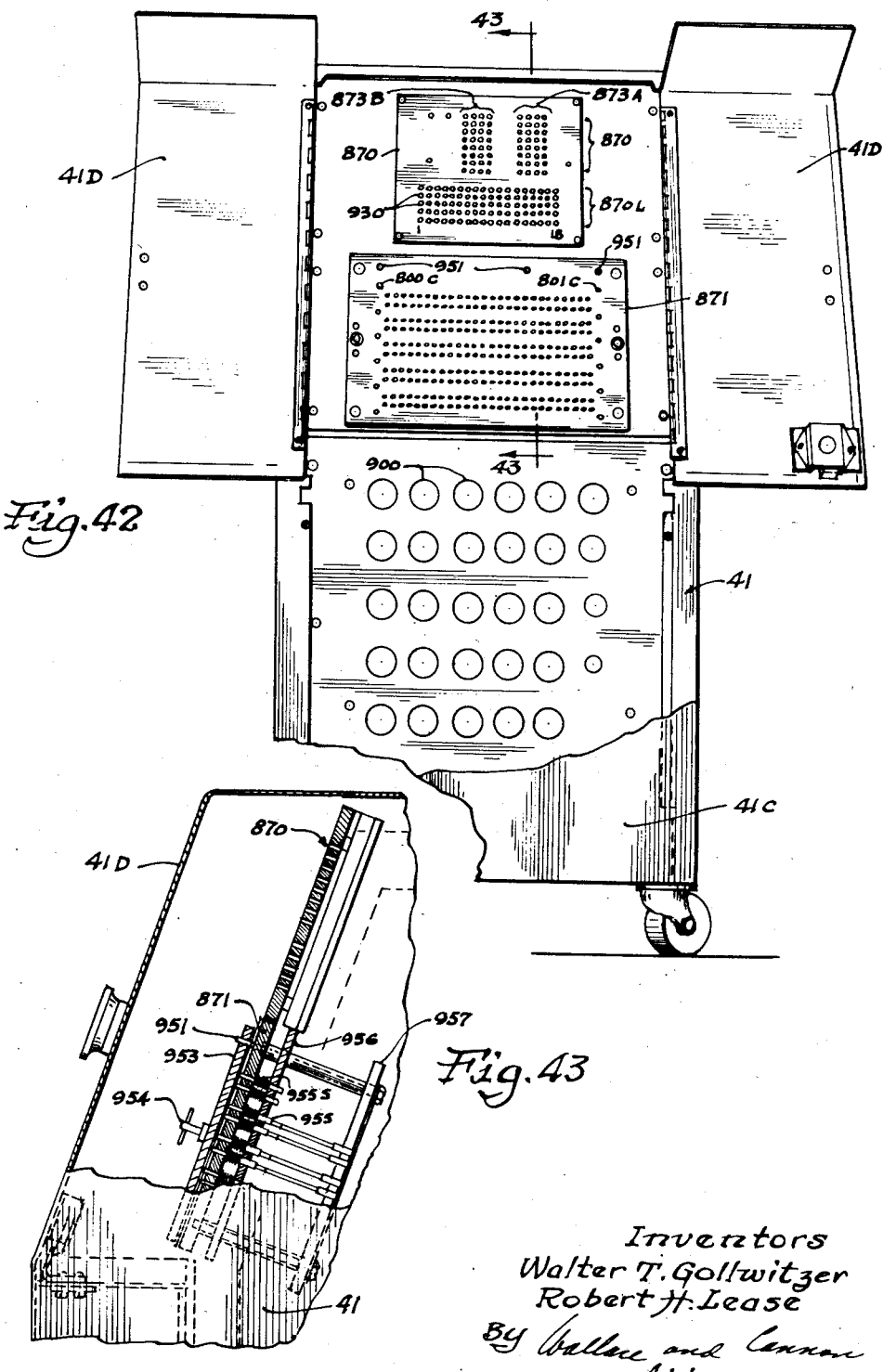

United States Patent Office 2,697,396
Patented Dec. 21, 1954

2,697,396

SELECTIVE PRINTING AND PUNCHING MACHINE

Walter T. Gollwitzer and Robert H. Lease, Euclid, Ohio, assignors to Addressograph-Multigraph Corporation, Cleveland, Ohio, a corporation of Delaware Application May 31, 1949, Serial No. 96,288

14 Claims. (Cl. 101—19)

This invention relates to machines for producing printed sheets and particularly to apparatus for producing printed sheets from and under control of individual printing and control devices that are passed one by one through the printing machine.

In various types of business it has been found advantageous to utilize individual printing and control devices which are passed one by one through printing machines that may take the form of a printing machine disclosed in Hueber Patent No. 2,359,849, patented October 10, 1944, and machines of the aforesaid character are adapted for use with automatic sheet feeding mechanism so that the machine may be continuously operated to produce printed impressions from the printing and control devices. The printed impressions may, of course, be made on individual sheets that are fed to the printing station of the machine as, for example, by the automatic sheet feeder disclosed in Morse Patent No. 2,359,852, patented October 10, 1944, or the printed impressions may be made on a continuous sheet such, for example, as a strip lister mechanism of conventional form that feeds the paper sheet or strip past the printing station of the printing machine in timed relation to the operations of the printing mechanism of the machine.

The individual printing devices that are passed through printing machines of the aforesaid character may take many different forms, and may be constructed if desired in the general manner disclosed in the Walter T. Gollwitzer Patent No. 2,132,412, patented October 11, 1938. As shown in the aforesaid Gollwitzer patent, the individual printing devices have a sheet metal carrier or frame that is adapted to removably receive a printing plate upon which embossed type characters may be formed to afford identifying means such as the name and address of a person or company to whom the particular printing device is allocated. Such printing devices also have a plurality of tab mounting means such as tab sockets afforded along what may be termed the upper edge of the printing device frame so that individual index or identifying tabs may be disposed in selected of the tab mounting sockets to serve as an identification or data representing means in respect to the particular printing and control device. In addition to the foregoing, such printing and control devices are arranged to have one or more data fields afforded thereon, and as disclosed in the aforesaid Gollwitzer patent, such data fields comprise areas having a plurality of index points located at different positions thereon. As shown in such Gollwitzer patent, these index points are afforded in a plurality of vertical columns, and at each index point where data is to be represented, a frame perforation is afforded in the printing device frame. Then, when data is to be represented on a data field, a control card is placed removably in position over such data field, and data may be represented in such data field by forming a control perforation in the control card at any one or more of the index positions of such data fields. Where such control perforations are provided at index points in a data field, the data represented by such perforations may then be sensed in the printing machine by sensing means which will pass through the aligned control perforations and frame perforations to accomplish control operations in the printing machine or related mechanisms.

In prior installations wherein printing and control devices of the aforesaid character have been utilized, the data representing perforations have in most instances been utilized to represent numerical data in accordance with a predetermined numerical code, while the identifying tabs have been utilized to represent control information whereby selector mechanism in the machine might determine among other things whether or not the machine is to be operated through a print cycle or a skip cycle when such printing device reaches a printing position in the machine. Such uses of printing and control devices have, of course, been quite advantageous, and it is an important object of the present invention to extend the range of control that may be attained in such a printing machine through the use of the data representing perforations or identifying tabs of such printing and control devices.

In printing and control devices as heretofore utilized in printing machines of the aforesaid character, the amount or range of control data represented on such printing and control devices has been quite limited, and primarily this is then the result of the inherent limitations of the selection and control mechanisms of such printing machines. In other words, the printing machines as heretofore utilized have been able to utilize but a very few controlling factors that may be set up by or under control of identifying or control data carried on the printing device, and it is a more specific object of the present invention to enable selection to be accomplished in a printing machine of the aforesaid character in response to a relatively large number of control factors that may be related in a relatively simple manner so that selection in such a printing machine may be rendered dependent upon a relatively complex series of qualifying or controlling factors.

When a printing machine of the aforesaid character has been utilized for selective printing purposes, it has been customary to merely control the machine in the single run of the machine in accordance with the selector operation, and hence, in order to obtain a similar selection at a later date, it has been necessary to again set up the selector mechanism for the same controlling conditions or factors. In view of this, it is a further and important object of the present invention to enable the results of the particular selecting operation of such printing machine to be indicated or recorded upon the printing and control devices so that in a subsequent run of the same printing and control devices through the printing machine, the recorded information resulting from the previous run may be utilized directly as a controlling factor in determining the operation of the printing machine. More specifically, it is an object of the present invention to enable shift tabs carried on the printing and control devices to be shifted from one position to another in response to the selecting action of the selector mechanism of the printing machine, and a related object is to enable control perforations to be formed in the printing and control devices under control of the selecting operation of the printing machine.

As disclosed in Walter T. Gollwitzer Patent No. 2,390,583, patented December 11, 1945, provision may be made in a printing machine utilizing individual control devices for automatically governing the discharge of the printing and control devices from the machine and into collecting drawers, and as shown in such patent, two drawers are provided and the printing devices are discharged first into one of these drawers and then under control of a tab on the last printing device that is to go into a particular drawer, the discharge point of the printing and control devices is changed so that the printing devices are then discharged into the second one of such collecting drawers. The discharge point is alternately changed so that the drawers may be removed and replaced alternately, and when the run is completed, all of the printing devices will have been returned to the same drawer from which they were originally removed. Another and important object of the present invention is to simplify the controlling operations in respect to the collecting drawer mechanism of the aforesaid Gollwitzer Patent No. 2,390,583.

In many uses of printing machines of the aforesaid character, it is desirable to remove certain of the printing devices from the collection of printing devices in accordance with the operation of the selector mechanism, as, for example, when some particular control data or indication is sensed upon a printing device, and in such instances the printing and control devices that are to be removed from the collection are discharged into what is termed an "expiration" drawer in some instances or a "cull" drawer in other instances, and a further object of the present invention is to enable the control mechanism of the printing device discharge means of the aforesaid Gollwitzer Patent No. 2,390,583 to cooperate in the attainment of a culling operation wherein selected of the printing and control devices are removed from the collection of printing and control devices and are discharged into a cull drawer.

In the attainment of selective printing operation in a printing machine of the aforesaid character, it is, of course, important that the user be able to readily and easily set up the controlling factors for determining the selective printing operation of the machine, and another important object of the present invention is to enable this to be accomplished. More specifically, it is an object of the present invention to afford a qualifying control mechanism in printing machines of the aforesaid character whereby each problem of selection may readily and easily be set up on a control member in the nature of a matrix that may be readily put in place in the qualifying control mechanism to govern the selective operation of the printing machine. A related object is to enable such a controlling matrix to be made up in the form of a card which permanently carries the selection-determining control means, and a related object is to accomplish this in such a way that these control cards may be readily filed and preserved for subsequent use when the same control or selection problem is presented.

A further and more specific object of the invention is to enable the operative mechanisms in a printing machine or the like to be controlled through sensing of control perforations as well as through the sensing of identifying tabs on the printing and control devices, and more specifically, it is an object to enable such control to be attained under the joint governing action of the punch hole selection and the tab sensing means or to be governed by either of such sensing means in the same machine cycle.

In reference to the attainment of control by data representing perforations in a printing and control device or the like, it is customary to rely upon the presence of a perforation to attain control operations in the machine, but in many instances it is desirable also to enable a selecting or controlling function to be attained in response to the absence of a control perforation rather than in response to the presence of a control perforation. Such control, of course, may be attained in response to the presence of a predetermined combination of data representing perforations, and it is a further and more specific object of the present invention to enable similar selection or control to be attained in or in connection with a printing machine in response to the sensed absence control perforations in one or more positions on the printing device.

As pointed out hereinbefore, the present invention has as one of its important objects the provision of a selecting or qualifying mechanism wherein qualifying problems are solved and represented on matrix cards that may be preserved so as to be useful in subsequent runs of the machine wherein the same qualifying conditions are desired, and it is a further object of the present invention to afford a qualifying system wherein the predetermined set of qualifying conditions that have been established in the machine through the use of such matrix cards may be quickly and easily altered in certain important respects during a run of the machine, where this appears to be desirable. One instance where this characteristic becomes important is in the production of mailing labels for catalogs or like advertising material, since it is known that in the course of a relatively long run of the machine it may appear that the qualifying conditions that have been set are not low or sufficiently high and that, therefore, the number of labels produced will vary above or below the number of printing catalogs or other material that is available. In such instances, it is highly advantageous to enable one or more of the factors included in the qualifying problems to be readily and easily altered so as to set either lower or higher standards for qualification, and to enable this to be done is another important object of the present invention.

In the production of mailing labels, it is customary to produce what are known as town markers so that a group of mailing pieces that are directed to the same town or area may be assembled with this town marker slip to facilitate mailing, handling and related matters, and in such instance it is highly desirable to afford an indication on such town marker slip as to the number of mailing pieces that have been included in each group. It is, therefore, another important object of the present invention to enable town marker slips to be automatically produced in connection with a run of a printing machine, and to enable these town marker slips to be numbered with the number of mailing pieces included in the group. More specifically, it is an object of the present invention to enable one or more numbering machines to be advanced in accordance with the number of mailing slips or labels produced and to enable impressions to be made from the figures of the numbering machine when a particular group of mailing slips has been completed. More specifically, it is an object to enable the total number of mailing slips in a group to be printed automatically on the town marker slip that is produced automatically at the end of each group, and a related object is to afford, in association with such impression, a further numbering impression which shows the total number of printing devices included in the group of printing devices pertaining to the particular area or city. The provision of the two numbered impressions on each town marker enables the operator of the machine to quickly judge the percentage of qualified printing devices that have been detected in each group, and thus the proper control of the run of the machine is facilitated.

Other and further objects of the present invention will be apparent from the following description and claims and are illustrated in the accompanying drawings, which, by way of illustration, show a preferred embodiment and the principles thereof and what we now consider to be the best mode in which we have contemplated applying those principles. Other embodiments of the invention embodying the same or equivalent principles may be used and structural changes may be made as desired by those skilled in the art without departing from the present invention and the purview of the appended claims.

In the drawings:

Fig. 2 is a rear perspective view of the apparatus;

Fig. 3 is a front face view of a printing and control device adapted for use in the machine shown in Figs. 1 and 2;

Fig. 4 is a sectional view taken along the line 4—4 of Fig. 3;

Fig. 5 is a sectional view taken along the line 5—5 of Fig. 3;

Fig. 6 is a front face view of the frame of the printing and control device shown in Fig. 3;

Fig. 7 is an enlarged fragmentary elevational view of one of the control cards utilized on the printing and control device of Fig. 3;

Fig. 11 is a fragmentary vertical sectional view illustrating the sensing head and the related parts of the machine;

Fig. 11A is a fragmentary vertical sectional view illustrating details of the punching apparatus;

Fig. 12 is a fragmentary vertical sectional view illustrating parts of the punching mechanism and certain of the storage and control mechanism;

Fig. 13 is a front elevational view of other storage mechanism employed in the machine;

Fig. 14 is a fragmentary top view of the mechanism shown in Fig. 13;

Fig. 15 is a fragmentary top plan view illustrating the punching mechanism;

Fig. 16 is a view illustrating the storage mechanism that is located adjacent to the punching mechanism;

Fig. 17 is a side elevational view of the forward storage mechanism and illustrating its relationship to the drawer change and control mechanism;

Figs. 18A, 18B, 18C and 18D are diagrammatic views illustrating the four storage mechanisms and the mechanisms that are controlled thereby;

Fig. 19 is a top plan view of the distributing portion of the printing and control device feed path;

Fig. 20 is a fragmentary portion of the drive mechanism illustrated in Fig. 19;

Fig. 21 is a front elevational view of a portion of the drive mechanism shown in Fig. 19;

Fig. 22 is a fragmentary vertical sectional view showing details of the discharge mechanism associated with the mechanism of Fig. 19;

Fig. 23 is a front elevational view of the printing and control device distributing path and showing its relationship to the collecting drawer mechanisms;

Fig. 23A is a perspective view showing the cam and cam follower for actuating certain of the distributing gates;

Fig. 24 is a fragmentary plan view illustrating the tab shifting mechanism;

Fig. 25 is a diagrammatic view similar to Fig. 24;

Fig. 26 is a vertical sectional view showing the operating mechanism for the tab shift device;

Fig. 27 is a vertical sectional view showing further details of this operating mechanism;

Fig. 28 is a plan view of the numbering mechanism that is located at the printing position;

Fig. 29 is a plan view of a portion of the mechanism shown in Fig. 26;

Fig. 30 is a fragmentary vertical sectional view illustrating the advancing and restoring mechanism of the numbering machine;

Fig. 30A is an enlarged section showing the means for lifting the numbering machines;

Fig. 31 is a vertical sectional view illustrating the driving and clutch mechanism of the machine;

Fig. 32 is a vertical sectional view taken along the line 32—32 of Fig. 31;

Fig. 33 is a plan sectional view taken along the axis of the drive shaft;

Fig. 34 is a vertical sectional view taken along the line 34—34 of Fig. 33;

Fig. 35 is a face view of the control matrix of the present invention;

Fig. 36 is an enlarged fragmental perspective view taken partially in section along the line 36—36 of Fig. 35 and showing further details of the control matrix of Fig. 35;

Fig. 36A is a view setting forth a typical selection or qualifying problem;

Fig. 37A is a wiring diagram showing portions of the circuits in the printing machine;

Fig. 37B is a diagrammatic bottom view of the switches at sensing station in the printing machine;

Fig. 37C is a view showing the contact and coil arrangements in the relays of the qualifying unit;

Fig. 37D is a view showing the socket connections of such relays;

Fig. 37E is a different form of relay utilized for "no hole" selection;

Figure 39:
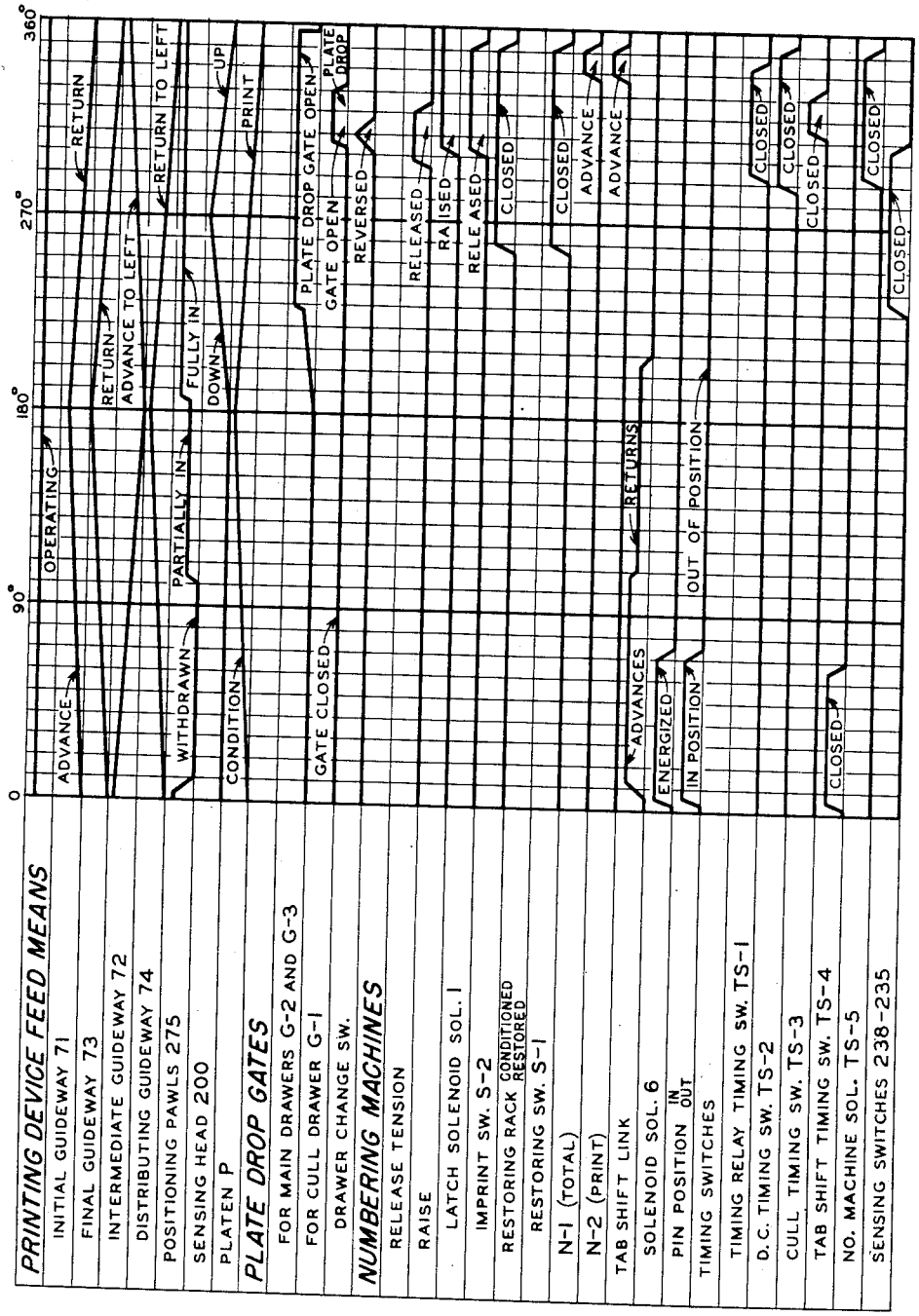
Figure 39:
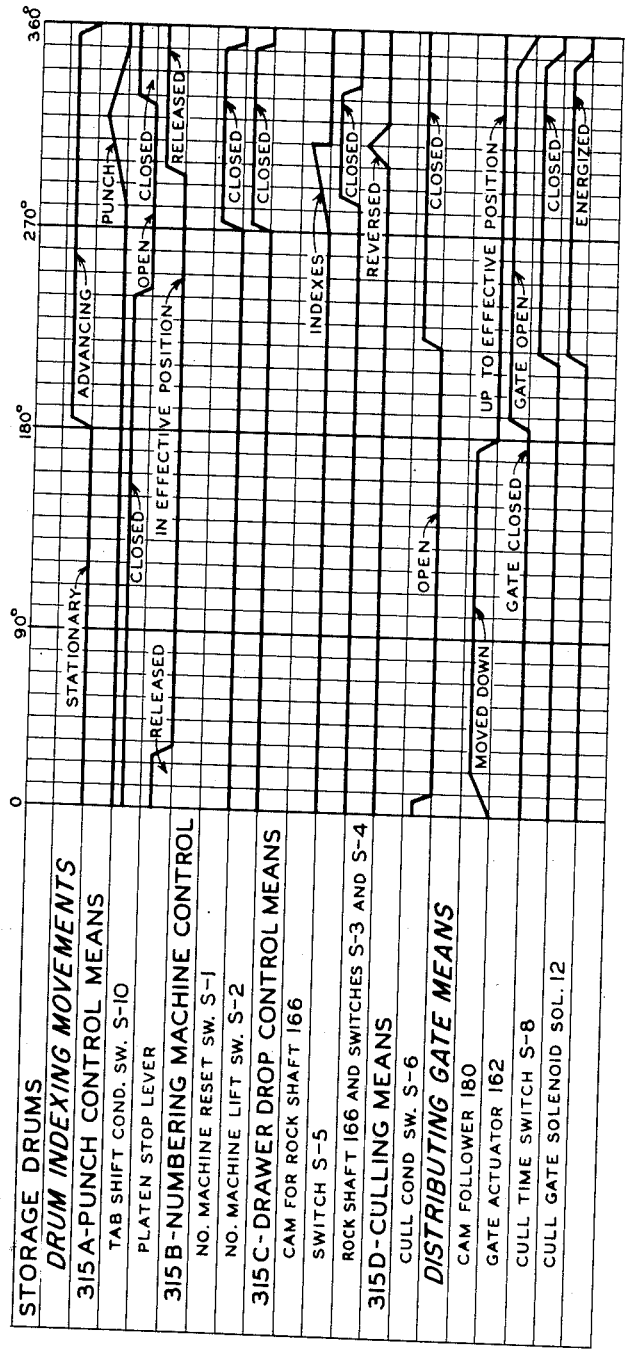
Figure 41:
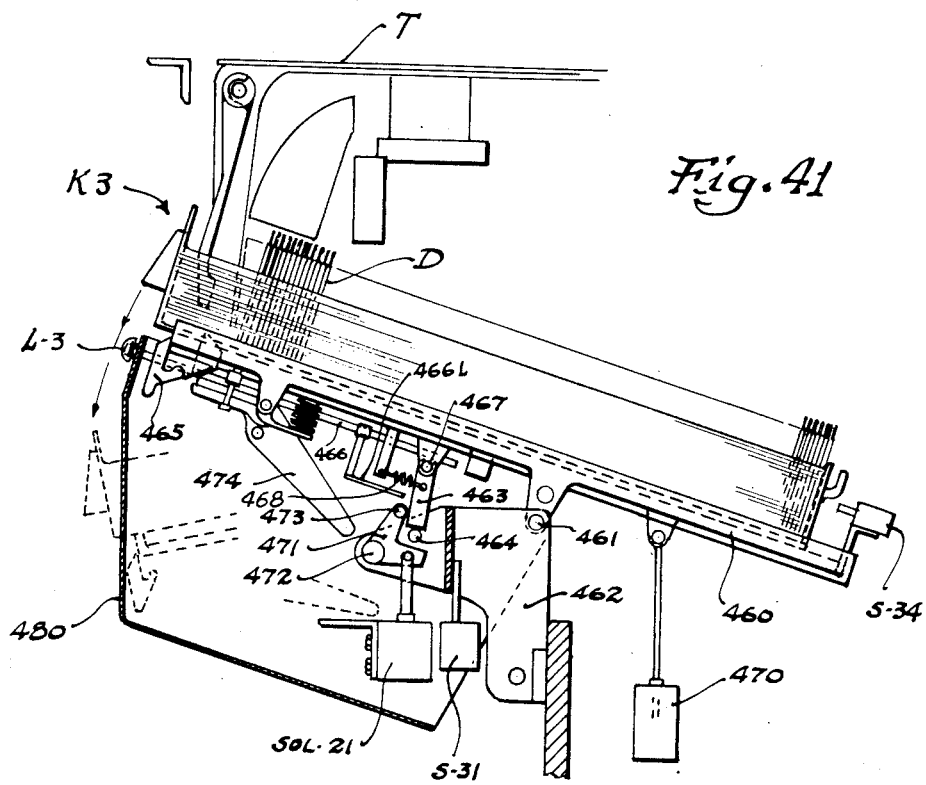

Figs. 39 and 39A constitute, when taken together, a timing chart showing the operation of the various elements of the machine;

Fig. 40 is a timing chart illustrating the progressive functioning of the elements of the machine in successive cycles of a regular run of the machine;

Fig. 40A is a similar timing chart showing the timing of machine operations in a cull run of the machine;

Fig. 41 is a vertical sectional view showing the drawer drop control means;

Fig. 42 is a view of the qualifier unit in a position similar to Fig. 2, but with the doors open and certain parts removed and standing in front of the lower portion of the unit; and Fig. 43 is a fragmentary vertical section taken from front to rear through the qualifier unit.

For purposes of disclosure, the invention is herein illustrated as embodied in a printing apparatus comprising a printing machine 40 having a qualifier unit 41 operatively associated therewith in a separable relation for cooperation in a controlling relation so that operations of the printing machine 40, such as the print or skip operation thereof, may be controlled and printed impressions may be selectively printed from the printing means of printing and control devices D, Fig. 3, and under control of control means carried by such printing and control devices D, that are passed through the printing machine 40. The impressions may, of course, be made on sheets S that may take different forms such as a mailing strip or sheet S of Figs. 1 and 2, that is passed in a step by step manner past the printing station of the printing machine 40, or in other instances individual sheets may be fed into and then out of printing position by means such as the sheet feeder covered by Morse Patent No. 2,359,852, patented October 10, 1944. The sheet feeding means are, of course, related to the printing machine 40 in such a manner as to operate in timed relation to the operations of the impression means of the printing machine 40.

Figure 1:
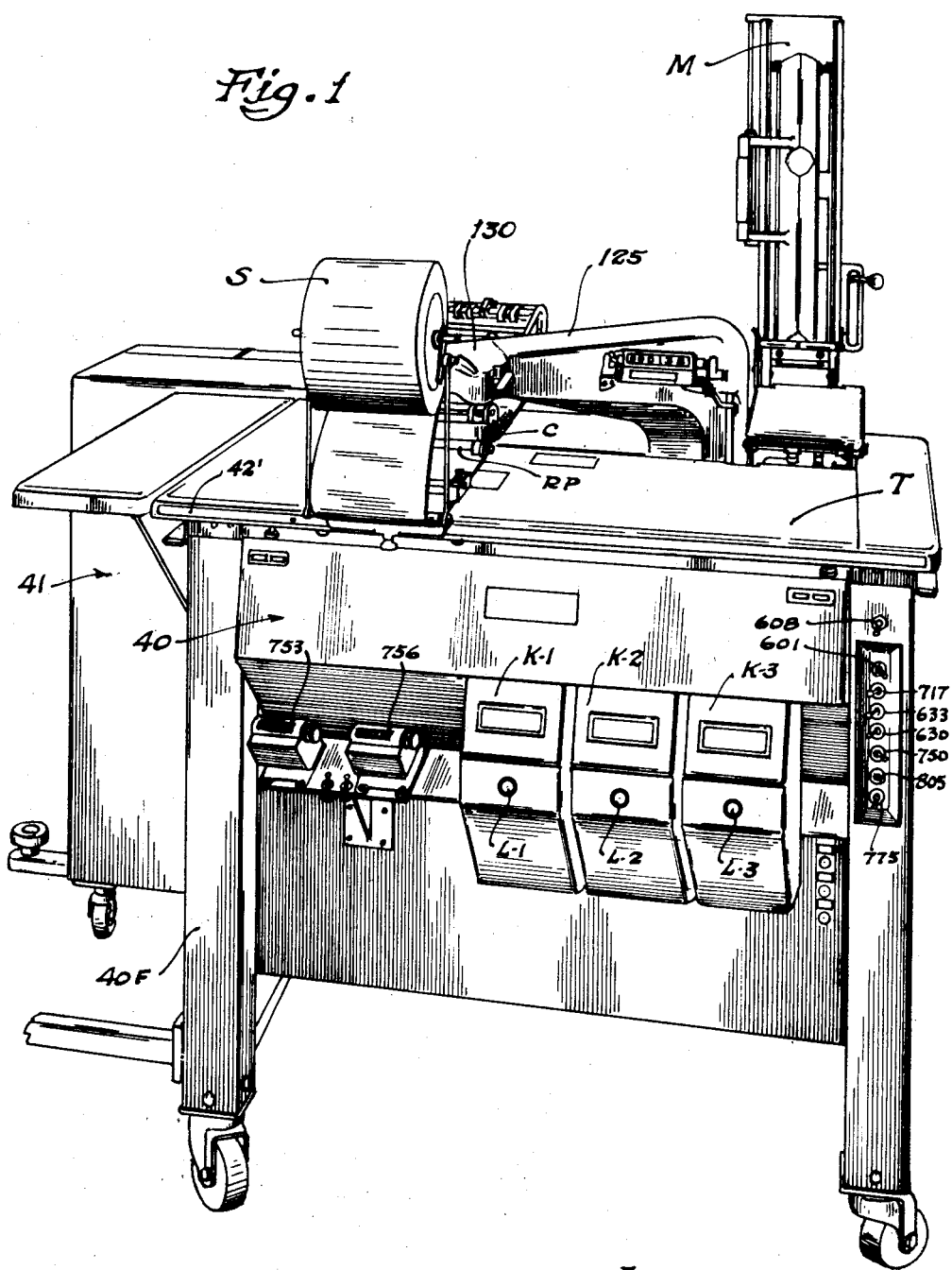
Fig. 1 is a front perspective view of a printing apparatus embodying the features of the invention.

While the particular form and arrangement of the printing machine 40 is in many aspects of the present invention immaterial, the particular printing machine 40 that is herein shown is of the type wherein a series of individual printing and control devices D, Fig. 3, each bearing printing means and control means thereon, are advanced one by one from a supply means such as an upstanding magazine M to a printing position provided in the machine. The printing position may in the present instance be considered as being defined in part by an impression means such as the platen mechanism P. The magazine M is supported on a printing machine frame 40F which in the form herein shown is generally desk-like in character so as to provide a table top T upon which sheets, forms and the like may be supported beneath the platen mechanism P for the performance of the printing operations thereon. In the operation of the printing machine 40 the printing devices D are withdrawn one by one from the bottom of the upstanding magazine M and are advanced in a step-by-step manner into a series of stations along a feed path beneath the table top T until each printing device comes to rest at printing position. The printing position is indicated in Fig. 1 of the drawings by the platen P, and it is while the printing device D is at rest at printing position that the platen mechanism P is operated to produce a printed impression from all or selected portions of the type characters embodied in the printing device. After one or more printing operations have been performed thereon or therefrom, the printing device D is further advanced so as to be discharged into a distributing guideway along which such devices are thereafter advanced in a step-by-step manner for selective discharge into any one of three collector drawers K-1, K-2 or K-3, as will hereinafter be described. The form and construction of the printing machine 40 will be described herein only insofar as it is directly related to the attainment of control operations such as the selective printing of impressions on sheets S, and for further details of the construction and operation of the printing machine 40 reference may be had to Hueber Patent No. 2,359,850, patented October 10, 1944.

*The printing devices*

The printing and control devices D may be of many different types, and the characteristics of the printing device must, of course, be related in each instance to the construction and operational characteristics of the printing machine. For use in connection with the printing machine 40 herein shown, a printing and control device of the general character disclosed, for example, in Gollwitzer Patent No. 2,132,412, patented October 11, 1938, may be employed. In other instances, where a different construction and arrangement is provided in the printing machine, a different type of printing device, such for example as the printing device shown in Gollwitzer Patent No. 1,992,661, patented February 26, 1935, may be employed. In other instances, the present invention may also be utilized with printing machines which employ printing devices of the stencil type wherein a thin sheet of stencil paper is incorporated in a protective carrier or frame. In all of the various kinds of printing devices of this general class, the printing means of each printing device is arranged to embody various classes of data to be printed, and such data is disposed in a plurality of lines disposed one above another upon the operative face of the printing device. As shown in Fig. 3, it will be evident that the several lines of embossed type are formed upon a printing plate 51 which are carried on one face of a frame 50. The printing device D is, in the present instance, provided with a single printing plate 51 which is removably held in position on the operative face of the printing device D by retaining means formed on the frame 50. The printing plate 51 is held in position by a curled lower edge 52 and lugs 53A, and spring latches 55 serve to releasably engage notches in the end edges of the printing plate 51 to hold the same in position on the frame 50. Spaced from the printing plate 51, and adjacent the opposite edge of the frame 50, an index and data carrying card 53 is held in place by a curled edge 56 on the frame 50 and cooperating lugs 57 and 58. A printed impression as at 59 may be formed on index card 53 from a part of the printing means of the printing device so that the printing device may be readily identified.

The printing and control devices D are each arranged to carry data representations that may be sensed so as to control the functioning of the printing machine 40 and such data representations in the present instance are afforded by perforations 60 that are formed in any one of several data fields of the control device D in accordance with a predetermined positional code. In the printing and control device D as herein shown, the several data fields are afforded by three separate control cards 61, 62 and 63, the control card 62 being relatively narrow and elongated in a vertical direction while the control cards 61 and 63 are relatively large and are disposed on opposite sides of the control card 62 in the area between the printing plate 51 and the index card 53. The control cards 61, 62 and 63 are held in place by retaining devices 53' that are formed from the metal of the frame 50.

As herein illustrated, the control card 62 is arranged to afford eight index positions at any one or more of which control perforations 60 may be formed. The index points afforded on the control card 62 are arranged in a vertical column, and at each index point, the frame 50 has a frame perforation 60' formed therein.

The control cards 61 and 63 are of generally similar form and each of these cards is arranged to afford three data fields, each of which includes four vertical columns of index positions with eight index positions in each such column. The particular printing device D that is shown herein is intended and particularly adapted for use in connection with mail order sales, and each of the three fields on the card, as 61, is allocated to a particular season of a particular year, as indicated by the printed identifying headings 65. The several index points within each one of the three fields afforded on the card 61 are allocated to the indication of the same informational values, and as will be noted in Fig. 7, the upper six index points in the left-hand column of the field are allocated to the various months in the season to which such field is allocated. Thus the initial letters of the months from January to July are indicated in these six positions. The seventh position in this column, that is, the one that is next to the bottom position, has the letters "TP" printed therein, and this indicates that this index position is allocated to the representation of a particular class of preference to the customer to which the printing device D pertains.

All of the other index positions in each field are allocated to different money values so that the amount of an order received from the particular customer in a particular season may be recorded in the proper data field by forming a perforation 60 at the index point allocated to approximately the money value of such purchase. Thus the money values allocated to the several index points in the data field are indicated in the present instance as dollar values, and different index points are allocated to the even dollar values from 1 to 10, and above this amount the dollar values are more widely separated so that relatively high value purchases may be indicated. Thus the letter "C" is used in association with a figure to indicate increments of hundred-dollar values, and as herein shown the highest value to which an index point is allocated is four hundred dollars.

In recording purchases in the fields of the printing and control device D, the month of such purchase is recorded by making a control perforation 60 at the index point allocated to such month in the particular season, and the approximate dollar value of the purchase is indicated by making a control perforation 60 at the appropriate value representing index point. When a subsequent purchase is made in a season, the new value is added to the highest previously recorded value, and the sum is indicated by a control perforation at the proper index point.

Such representations as to the months in which purchases have been made and as to the total dollar value of such purchases in any particular season may thus be utilized in accordance with the present invention to determine whether or not a mailing slip or tag is to be printed from the printing and control device D, and this is accomplished through the use of the selector mechanism of this invention which, of course, includes the qualifier unit 41.

The printing devices D are in many instances classified into a relatively large number of groups or classes and such classification may be attained by suitable identifying means provided at selected identifying positions on the printing device D. In the present instance the printing device D, shown in Fig. 3, has a plurality of identifying tabs 65 disposed at selected positions along its upper edge in the general manner disclosed in the aforesaid Gollwitzer Patent No. 2,132,412, and in this connection it will be noted that a relatively large number of identifying positions are provided along the upper edge of the frame 50 and that the identifying means or tabs 65 in Fig. 3 are disposed in but selected ones of such identifying positions. The printing and control device D as shown in Fig. 3 also has a pair of shift tabs 66 mounted thereon, these tabs in the present instance being located adjacent to the opposite ends of the upper edge of the printing and control device. The shift tabs 66 as herein shown are of the construction illustrated in the Walter T. Gollwitzer Patent No. 2,080,417, patented May 17, 1937, but it will be recognized that other forms of shiftable tab mechanism may be employed.

The data which is to be printed from each printing device is, as aforesaid, disposed upon the operative face of the printing device D in a series of lines, and when a printing device such as that shown in Fig. 3 is employed, the type characters may be formed on the printing plates 51 through the use of an embossing machine such as that shown in the patent to Duncan No. 1,518,904, patented December 9, 1924. With such a machine type characters are embossed in the metal of the printing plate 51 so that when a sheet is pressed into operative association with the embossed faces of such type characters a corresponding printed impression is made therefrom. It will be recognized, of course, that the type characters must in every instance be properly inked and this may be properly attained through inking of the type characters prior to the printing operation or through the use of an inked ribbon which is interposed between the type characters and the sheet at the time when the printing impression is made.

*The printing machine*

Figure 8:
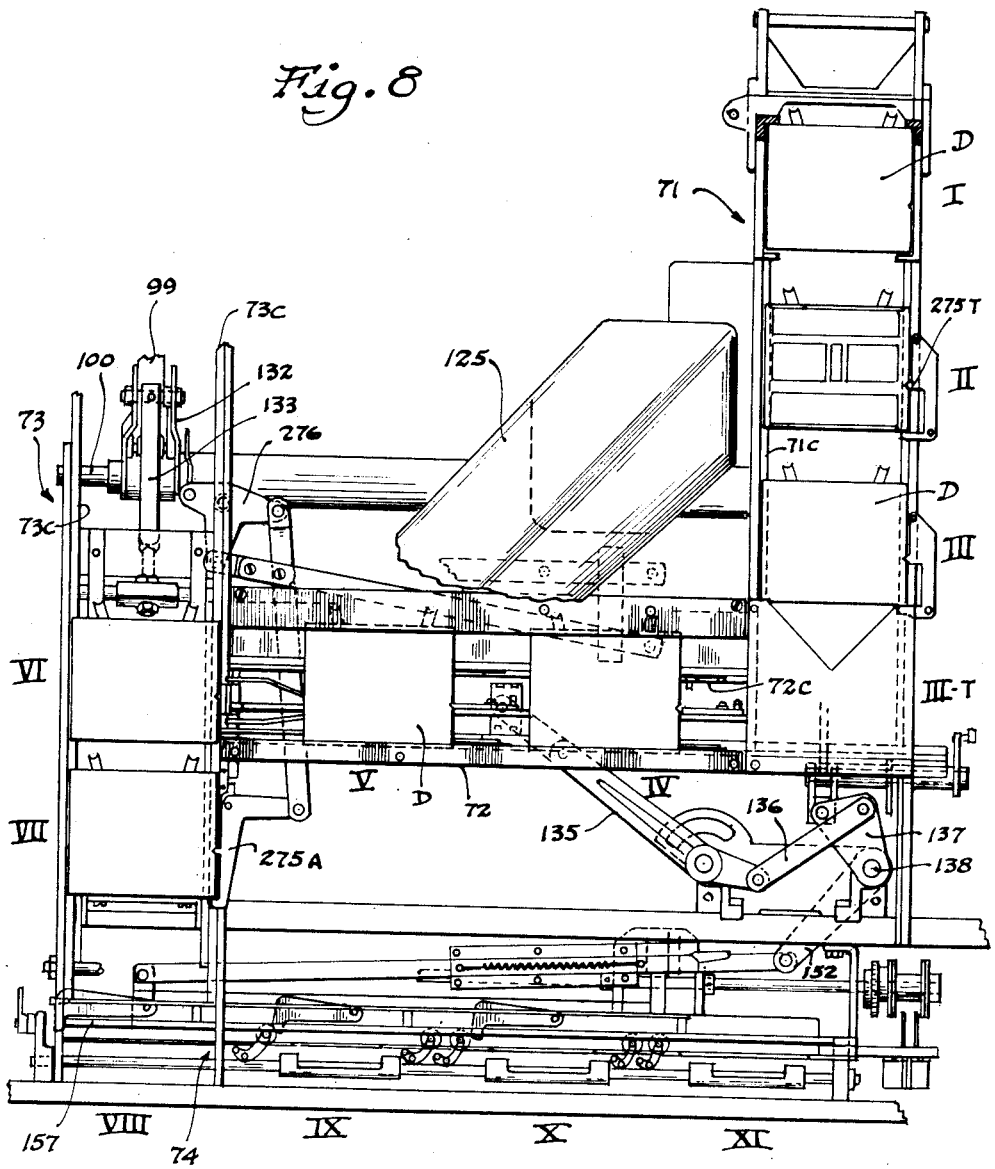
Fig. 8 is a fragmentary plan view of the machine shown in Figs. 1 and 2 with the cover plates removed so as to show the path of the printing and control devices as they move through the machine.

The printing machine 40 herein illustrated is of the type wherein the impression means is provided by the platen mechanism P, and this platen mechanism is supported in an operative relationship above the table top T by means of a rigid printing frame 125, the specific construction of which is illustrated and described in Hueber Patent No. 2,275,439, patented March 10, 1942. The printing frame 125 is in the present case disposed so as to project upwardly from the table top T at a point located a considerable distance rearwardly and to the right of the printing position, and the printing frame extends forwardly at an angle of substantially 45° with respect to the forward edge 42' of the printing machine frame, thereby to locate the forward end of the printing frame 125 directly above the printing position. The magazine M is located just to the right and somewhat rearwardly of the vertically extending portion of the printing frame 125 and the printing devices D are advanced from the bottom of the magazine M in a forward direction and then along a suitable guide path beneath the table top T and to printing position, as shown in Fig. 8 of the drawings. The particular arrangement and construction of the printing device feeding path as used in the present machine is disclosed in a general way in the aforesaid Hueber Patent No. 2,359,850. The printing device advancing means of the printing machine is arranged to advance the printing devices in a step-by-step manner such that each printing device comes to rest at a plurality of different stations along the printing device guideway, and in the machine herein disclosed the magazine position is identified as station I, Fig. 8, and from this position the devices are advanced to a sensing station II at which the identifying means such as the tabs 65 and the data representing perforations 60 may be sensed to determine whether or not a printed impression is to be made from such printing and control device when the printing and control device reaches the printing station of the machine. Such sensing of the data representing perforations 60 and the tabs of the printing and control device may also be utilized, as will hereinafter be described, to determine whether or not the particular printing and control device is to be withdrawn from the collection as is done in a culling operation that will hereinafter be described in detail.

The magazine station I and the sensing station II are located along an initial printing device guideway 71, Fig. 8, and forwardly of the sensing station II, an additional station III is afforded which in the present instance constitutes a recording station at which a control perforation 60 may be formed in the control card 62 under control of the selecting and qualifying mechanism, as will hereinafter be described. Forwardly of the recording station III, the initial printing device guideway 71 intersects with a transverse or intermediate guideway 72, and this intersection is arranged to define a transfer station III-T in the same general manner as described in the aforesaid Hueber Patent No. 2,359,850. In the cycle in which a printing and control device is advanced from recording station III to the transfer station III-T, the printing device does not come to rest for any appreciable time in the transfer station, but is almost immediately moved to the left in Fig. 8 along the transverse guideway 72 to a second recording station IV, and this recording station in the present machine is the location at which the shift tabs 66 may be selectively moved from one position to another so as to record the results of the selecting or qualifying operation of the machine, as will hereinafter be described. In the next cycle of machine operation, the printing and control device is moved to an idle station V in the guideway 72, and then in the next machine cycle this printing device is moved into a second idle station that is located in a third guideway 73 that extends from front to rear of the machine and which includes printing station VII that is located immediately forward of the idle station VI. Hence, the next movement of the printing and control device D is such that this printing and control device moves into printing station VII, and while it is in this printing station, an impression may be made from the printing means of the printing and control device.

In the cycle of machine operation that follows, the printing device that is in printing station VII is discharged forwardly and downwardly and into a generally vertical position into station VIII at the left end of what may be termed a transverse distributing guideway 74 that extends to the right and over the three collecting drawers K-1, K-2 and K-3, so that as the printing devices are moved to the right along the guideway 74, they may be selectively discharged into these collecting drawers, as will hereinafter be described. The printing device that is discharged downwardly from the guideway 73 and into the distributing guideway 74, comes to rest in station VIII of the distributing guideway, and in the next cycle is shifted to the right, Fig. 8, and into a first discharge station IX that is located over the collecting drawer K-1, which drawer in the present instance constitutes the cull drawer into which printing devices are discharged when it is desired to remove such printing devices from the general collection thereof. In the next machine cycle, the printing device, unless it has been discharged into the drawer K-1, is moved further to the right in Fig. 8 to station X, and from this position may be discharged into the collecting drawer K-2. In the event that the printing device is not discharged into the collecting drawer K-2, it is moved in the next cycle of machine operation to station XI that is located over the collecting drawer K-3.

The means for advancing the printing and control devices D along the guideways 71, 72, 73 and 74 are described in detail hereinafter, but it may be pointed out that the advancing means in the intermediate guideway 72 and in the third guideway 73 are quite similar to the advancing means shown in the aforesaid Hueber Patent No. 2,359,850, while the advancing means in the guideways 71 and 74 are constructed and operated in a manner that will be described presently.

The basic driving means employed in the printing machine 40 correspond in most respects to the driving mechanism illustrated and described in the aforesaid Hueber Patent No. 2,359,850, and such driving means are illustrated herein only insofar as such driving means are different from the disclosure of the aforesaid Hueber patent. Thus, as shown in Figs. 31 to 34, the machine has a main operating shaft 80 carried in supporting brackets 81 on a horizontal supporting frame bar 82 that is located adjacent to the rear portion of the machine frame. This shaft 80 carries a drive sprocket 83 that is constantly driven through suitable speed reducing means from a drive motor 84, Fig. 38, and when any mechanism of the machine is to be driven, the drive sprocket 83 is operatively connected to the main shaft 80 through a clutch 91. Thus the sprocket 83 has a sleeve 91A fixed thereto so as to constitute the driving element of the clutch 91, and the clutch 91 has a driven element 91B that is pinned onto the shaft 80. The clutch 91 is of the one revolution type, and details of this clutch are illustrated in the aforesaid Hueber Patent No. 2,359,850. This clutch 91 is adapted to be disengaged by a stop lever 91S that is normally urged toward an effective position, and is arranged to be disengaged by a solenoid 91M which must thus be energized at all times during operation of the machine.

The printing device feeding mechanism is arranged to be driven by a clutch 92 that has a driving member 92A pinned to the shaft 80, and which has a driven member 92B arranged to be controlled by a stop lever 92S. The stop lever 92S is normally urged to a released position in the present machine so that the clutch 92 is normally engaged, and when the printing device feeding means is to be disabled, the stop lever 92S is moved to its effective position by a solenoid 92M. The driven member 92B of the clutch 92 is connected by means of a pin 96 to an eccentric 97 and also to a cam sleeve 98, and associated with the eccentric 97 there is a forwardly extending operating link 99 whereby rocking movement is imparted to a shaft 100. This shaft 100 is utilized in its rocking movement to impart the desired advancing movements to the printing and control devices D, and for other purposes, as will hereinafter be described.

The main shaft 80 also has a third or platen control clutch 93 mounted thereon, and this clutch includes a driving member 93A pinned on the shaft 80 and a driven member 93B. The engagement of this clutch is adapted to be controlled by either one of a pair of stop levers 93S-1 and 93S-2. The stop lever 93S-1 is normally urged to its released position, and is adapted to be moved to its effective position by a solenoid 93M. The stop lever 93S-2 is normally disposed in its effective position, and is arranged to be moved to its released position by means of a character illustrated in the copending application of Walter T. Gollwitzer, Serial No. 58,742, filed November 6, 1948, now U. S. Patent No. 2,568,064. This control arrangement includes a rock shaft 101 mounted in depending supporting bearings 102, and this rock shaft has a forwardly projecting arm 103 from which a link 104 extends upwardly and is connected to the rear end of the stop lever 93S-2. Thus, when an operating arm 105 that is fixed on the shaft 101 near its right-hand end, Fig. 31, is moved downwardly at its free end, as will hereinafter be described, the stop lever 93S-2 is moved to its released position so that the clutch 93 may engage. When thus engaged, the driven element 93B of the clutch drives an eccentric 107 that is connected by means including a link 108 to a rock shaft 110 which operates the platen mechanism of the machine in the manner described in the aforesaid Hueber patent.

The sensing operation, through the intermediary of the qualifier unit 41, may be effective, as will hereinafter be described, to govern the operation of the stop levers 93S–1 and 93S–2 and hence platen mechanism P when the particular printing device from which a sensed indication is derived reaches printing station VII. Such controlling operation is described in detail hereinafter, and the specific operating structure and its controlling action will be described in detail.

The platen mechanism P is herein illustrated as being of the form which is incorporated in the printing machine shown in the aforesaid Hueber Patent No. 2,359,850, and this platen mechanism is described in detail in Hueber Patent No. 2,359,849, patented October 10, 1944. The platen mechanism P comprises a carriage C supported for reciprocation in a direction from front to rear of the printing machine along a guideway provided beneath a head 130 mounted beneath the forward end of the printing frame 125, and a platen roller PR is supported on and carried by the carriage C. The platen roller PR is arranged in a horizontal position at right angles to the path of reciprocation of the carriage C, that is, parallel to the forward edge 42' of the printing machine frame. The platen roller PR is supported by means such as toggles so that the platen roller may be shifted from a normal elevated or inactive position to a lower or active position wherein the platen roller may be effective to press a sheet or form such as the form S into printing cooperation with a printing device disposed at printing position. The platen mechanism P in the form herein disclosed is arranged so that the platen roller is in its elevated or inactive position when the carriage C is at its rearward or at rest position shown in Fig. 1 of the drawings. When a printing operation is to be performed the carriage C is actuated in a forward direction through an idle stroke by means of actuating mechanism described in the aforesaid Hueber patent, and in the course of such forward movement of the carriage C the toggle means are actuated to shift the platen roller PR to its lower or active position. The platen roller PR reaches its lower or active position at substantially the time when the forward stroke of the carriage C has been completed and the toggle means is then latched so as to maintain the platen roller in its lower or active position during the return or rearward stroke of the carriage C. Hence during the rearward or active stroke of the carriage C the platen roller PR may be rolled across the sheet to effect the desired printing operation. As the platen roller approaches the rear end of its stroke and has completed the desired printing operation, it is withdrawn to its elevated or inactive position so that the sheet or form may be readily shifted, or removed and replaced by a new sheet.

The printing device advancing means

As pointed out hereinbefore, the printing device driving clutch 92 is connected by a link 99 to a rocking lever 132 that is fixed on the rock shaft 100, and thus the shaft 100 is operated through a rocking movement each time the clutch 92 operates through its cycle of movement. The arm 132 also has a connecting link 133 extended therefrom and connected to carrier bars 73C that are mounted in the third guideway 73. This arrangement is substantially the same as that illustrated in the aforesaid Hueber Patent No. 2,359,850.

Figure 12A:
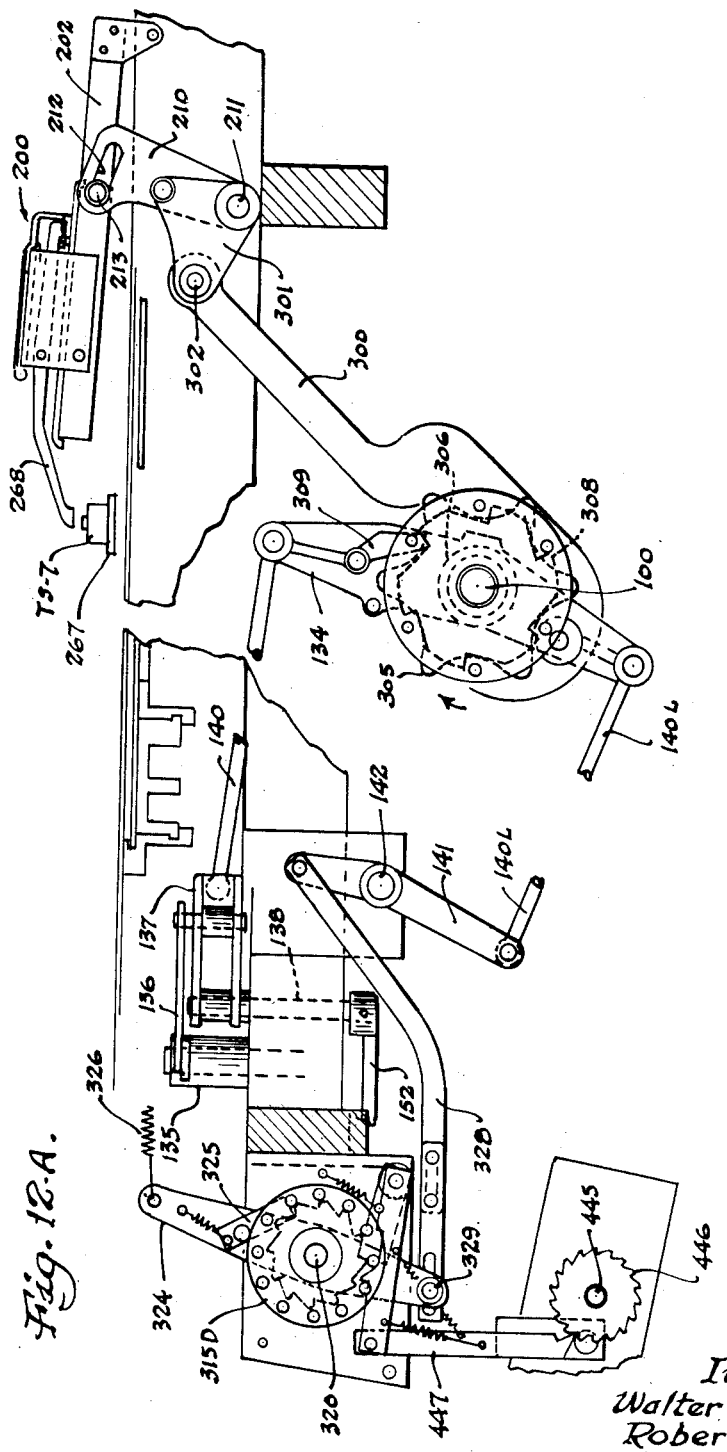
Fig. 12A is a fragmentary vertical sectional view illustrating the drive means for the storage drums and a part of the printing device advancing means.

At its other end as shown in Fig. 12A, the shaft 100 has a lever 134 fixed thereto, and this lever is utilized, among other things, for operating the carrier bars 72C of the intermediate guideway 72. The carrier bars 72C are connected by a rocking lever 135 and a link 136, Fig. 8, to a rocker 137 that is fixed on a vertical pivot shaft 138 in the same manner as in the aforesaid Hueber Patent No. 2,359,850, so that by imparting rocking movement to the rocker 137, the carrier bars 72C may be reciprocated in the proper timed relation to the carrier bars 73C. In the present instance this connection is afforded by a link 140 that is extended forwardly from the upper end of the lever 134. This serves to actuate the carrier bars 72C in the same timed relationship as was disclosed in the aforesaid Hueber patent. The lever 134 is also utilized to drive carrier bars 71C that are afforded in the initial guideway 71, and in accomplishing this the lower end of the lever 134 has a link 140L extended forwardly therefrom and connected to the lower end of a centrally pivoted rocker 141. The rocker 141 is mounted on a horizontal shaft 142 that extends outwardly beyond the right-hand side of the printing device guideway, Fig. 11, and an arm 143 is extended upwardly and somewhat rearwardly from the shaft 142 as shown in Fig. 11 of the drawings. The arm 143 has a rack 144 extended rearwardly and upwardly therefrom as shown in Fig. 11, and this rack extends through a guide 145 which holds the rack in engagement with a pinion 146. The pinion 146 is fixed on a horizontal shaft 147 that extends beneath the guideway 71 and the shaft 147 has gears 148 fixed thereon that mesh with downwardly facing racks 150 that are formed on the lower edges of the carrier bars 71C. Thus, as an incident to the rocking movements of the shaft 100, the carrier bars 71C are reciprocated in timed relation to the movements of the other carrier bars, and it might be observed in this regard that the carrier bars 71C and the carrier bars 73C move forwardly in the first half of each cycle as shown in the timing chart of Fig. 39, while the carrier bars 72C of the intermediate guideway move in a return direction to the right at the time when the carrier bars 71C and 73C are moving in their forward or advancing direction.

The shaft 138 that is operated by the rocker 137 is utilized in the present instance to operate the printing device advancing means of the final or distributing guideway 74, and for this purpose an arm 152 is extended forwardly and to the left from the lower end of the shaft 138, as will be evident in Figs. 8 and 12A. The arm 152 is utilized to impart reciprocating movements to a pawl carrier 153 that is disposed along the rear side of the printing device guideway 74 for reciprocation along such guideway. The pawl carrier 153 has a plurality of pawls 154 mounted thereon at spaced positions, and these pawls are spring biased by means of springs 155 toward positions wherein the noses of the pawls are disposed within the printing device guideway 74 for operative engagement with the left-hand end edges of such printing devices to move such printing devices in a step by step manner to the right as viewed in Figs. 8 and 19.

The printing device guideway as herein shown is afforded by a relatively rigid back plate 157, Figs. 8, 19 and 22, and from this back plate 157 a front plate 158 is supported in a parallel and forwardly spaced relationship so as to define a generally vertically disposed channel in which the printing devices may be disposed in an upright position, and between the two plates 157 and 158, means are provided which afford a bottom wall or support for the printing devices during their advancing movements. Such means include horizontally shiftable gates G–1, G–2 and G–3 that are disposed respectively in positions over the collecting drawers K–1, K–2 and K–3. These three gates are generally similar in form and mounting and, as shown in Fig. 22 of the drawings, the gate G–3 is disposed in a horizontal position so as to project forwardly through a horizontal slot in the rear wall 157 of the guideway 174. Beneath the gate an operating plate 159 is pivoted at its lower edge on a pivot 160, and is associated at its upper edge with the gate G–3 so that the gate may be opened by application of a rearward force to the plate 159.

In respect to the gate G–1, this rearward force is applied through the medium of a solenoid SOL–10, and the gate G–1 is moved to its rearward position when the solenoid is energized.

The gates G–2 and G–3 are arranged for operation by an actuating slide 162 that is mounted for movement in a front to rear direction on a stationary bracket 163, the slide being urged in a forward direction by means including a spring 164, as will hereinafter be described in greater detail. The slide 162 is arranged to be yieldingly connected by springs 165–2 and 165–3 to the gates G–2 and G–3, respectively, so that when the slide 162 is moved rearwardly, a yielding force is applied to both the gates G–2 and G–3, tending to move these gates toward their open positions, and this arrangement is utilized in the present instance so as to enable the gate G–2 to be held in its closed position during those cycles when printing and control devices D are not to be discharged into the drawer K–2, but are to be advanced to position XI for discharge into the drawer K–3. This control operation is accomplished by means including a rock shaft 166 that has a blocking arm 167 afforded thereon so that in one position of the rock shaft 166, the arm 167 will effectually block the opening movement of the gate G–2, while in the other position, the gate G–2 will be permitted to open whenever the actuating slide 162 is moved in a rearward direction.

The pawl carrier 153 is formed in the shape of an angle bar having a downwardly extending flange that rides in a guideway afforded on the rear face of the plate 157 above the level of the gates G–1, G–2 and G–3. The other flange of the carrier extends rearwardly, and the pawls 154 are pivoted on vertical pivots on this horizontal flange of the pawl carrier 153. The pawls 154 are adapted to move into their operative positions through a slot 170 formed in the rear plate 157 at substantially the level of the pawls 154, and such movement is controlled in accordance with the direction of movement of the pawl carrier 153. Thus, a guide plate 171 is mounted on the rear plate 157 by means including screw and spacer devices 172, and this guide plate extends downwardly and has parts that are adapted to be engaged on the rear surface thereof by guide pins 173 on the pawls 154. When the pawls 154 are in their forward or effective positions, the pins 173 are disposed forwardly of the guide plate 171, and as the pawl carrier 153 reaches the right-hand end of its stroke, these pins 173 move past guide springs 174 that are fixed on the guide plate 171. These guide springs 174 then return to positions just to the left of the pins 173 so that when movement of the pawl carrier 153 is reversed so that the pawl carrier moves to the left, these springs 174 are engaged by the pins 173 so as to pivot the pawls 154 toward their rearward or ineffective positions wherein the pins 173 ride along the rear face of the guide plate 171. Then, when the pawls 154 are being moved to the left through their return strokes, such pawls are maintained in their retracted or ineffective positions, and when the return movement has been completed, the pins 173 ride off of the ends of the guide surfaces of the plate 171 so as to allow the pawls 154 to return to their effective positions.

The guideway 73 is in the present instance provided with a plurality of spring biased control rollers 177 mounted on the outer plate 158 and extended through clearance spaces afforded in such outer plate so that these rollers will define the limits of the stations IX, X and XI, and maintain the printing devices in the proper positions for discharge downwardly when the appropriate one of the control gates G–1, G–2 or G–3 is open.

The pawl carrier 153 is actuated from the lever arm 152 by means including a connecting link 178 and an overload release mechanism 178R which is effective to prevent injury to the mechanism in the event that a printing and control device D becomes jammed in the guideway 74.

The reciprocating movements of the pawl carrier 153 are utilized in the present instance to impart the desired reciprocating movements to the actuating slide 162. For this purpose a cam 153C is provided on the lower face of the pawl carrier 153, and this cam 153C is adapted to be engaged by a follower arm 180 that is pivoted on the slide 162 on a horizontal axis. This pivot is near the rear end of the pawl 180, and an arm 181 extends downwardly from the rear end of the follower 180 and is connected to the rear end of the spring 164. Thus the spring 164 not only tends to shift the slide 162 in a forward direction, but also tends to pivot the follower 180 in a clockwise direction as viewed in Fig. 22. This, of course, tends to raise the forward end of the follower 180. When the pawl carrier 153 is in its left-hand or raised position, the follower 180 is allowed to assume its upper position wherein the gates G–2 and G–3 are closed. Then, when a right-hand or advancing movement of the pawl carrier 153 is initiated, a cam surface 183 on the right-hand end portion of the pawl carrier 153 engages the forward end of the follower 180 and pivots the same downwardly so that the forward end of the follower 180 is located below the lower surface of the cam 153C. When the pawl carrier 153 reaches its right-hand position, the cam 153C has moved beyond the follower 180, and the follower 180 therefore moves upwardly into engagement with the lower surface of the horizontal flange of the pawl carrier and into position opposite a tapered cam surface on the left-hand end of the cam 153C. Thus, when the movement of the pawl carrier 153 is reversed so that the pawl carrier moves toward the left, this tapered end surface of the cam 153C engages the end of the follower 180 and imparts a rearward movement to the follower 180 and hence to the actuating slide 162. Hence the gates G–2 and G–3 will be yieldingly urged in an opening direction, and both of the gates will open unless the blocking arm 167 is in its blocking position, as will hereinafter be described.

*The sensing means*

In the operation of the printing machine 41, the printing and control devices D are advanced one by one out of the bottom of the magazine M, and into the sensing station II, as hereinbefore described, and in the last half of the machine cycle, while a printing and control device D is at rest at station II, the control means, such as the control perforations 60 and the tabs 65 and 66, are sensed by a sensing head 200 that is mounted over the guideway 171 for downward movement into sensing co-operation with the identifying means of tabs 65 and the data representations or perforations 60 of each printing device D as this printing device comes to rest at sensing station.

The sensing head 200 comprises a pair of rigidly connected parallel arms 201 and 202 that are disposed over the respective side rails of the guideway 71 just forward of the magazine M, and at their rear ends the arms 201 and 202 are pivotally related to the rails 193 and 194. Such pivotal mounting is afforded by means that are afforded by pivot pins 194', as will be evident in Figs. 9 and 10.

The sensing head 200 is of the same general character as that shown in the copending application of Walter T. Gollwitzer, Serial No. 58,742, filed November 6, 1948, now issued as Patent No. 2,568,064, patented September 18, 1951, to which application reference may be had for further details, and the sensing head 200 is arranged to be moved downwardly from the normally elevated position to a lower or sensing position shown in Fig. 10 in each cycle of operation of the printing device advancing means, as will hereinafter be explained in detail. The means for imparting such downward sensing head 200 includes a pair of cam plates 210 fixed on opposite ends of a rock shaft 211 that extends through the rails of the guideway 71 as will be evident in Fig. 12A of the drawings. The cams 210 each have a slot 212 formed therein to engage a roller 213 on the adjacent side of the sensing head 200. Such rollers 213 are fixed on opposite ends of a mounting shaft which extends between the arms 201 and 202 and constitutes a part of the structure that maintains these two arms in a rigid relationship. The form of the cam slots 212 is such that when the rock shaft 211 is rocked in a forward or counter-clockwise direction, Fig. 12A, the sensing head 200 is moved in a downward direction through the desired sensing structure.

Figure 9:
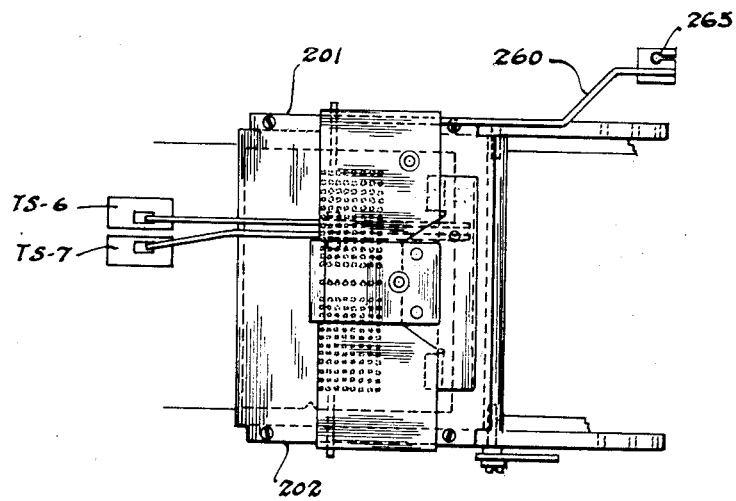
Fig. 9 is a top plan view of the sensing head.
Figure 10:
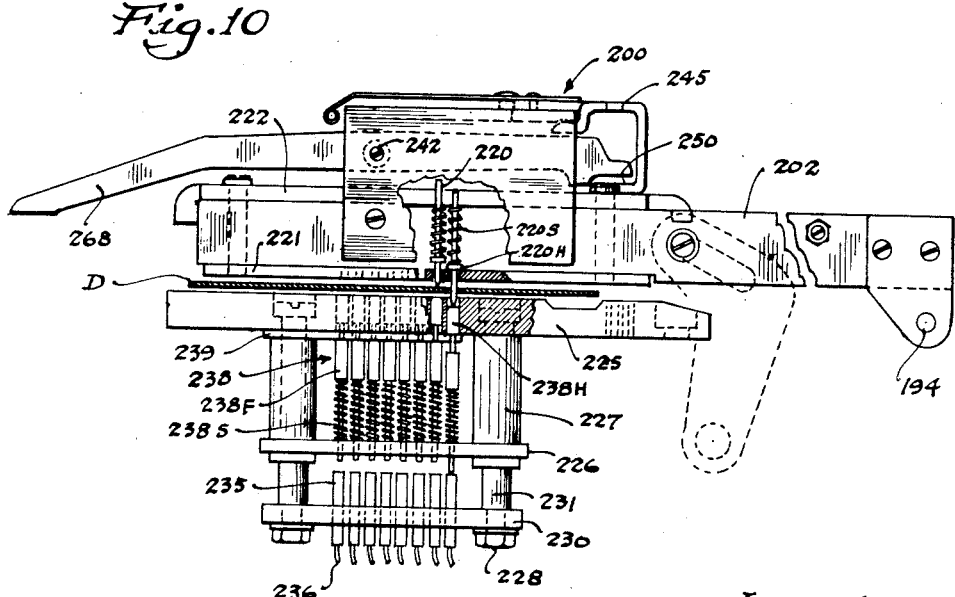
Fig. 10 is a side elevational view of the sensing head.

The sensing head 200 is arranged to carry means operable to sense the data representations afforded by the perforations 60 in the printing and control devices D, and for this purpose a plurality of sensing pins 220, Figs. 9 and 10, are provided on the sensing head with one such pin disposed in each index point position at which a perforation 60 may appear. In providing a mounting for such sensing pins 220, the sensing head 200 is provided with a lower mounting plate 221 secured as by screws to the lower edge of the arms 201 and 202 and, as shown in Fig. 10 of the drawings, an upper mounting plate 222 is also afforded which is fixed across the upper edges of the arms 201 and 202 by means of screws as will be evident in Fig. 10. The several sensing pins 220 are mounted and guided in aligned guide perforations formed in the upper and lower mounting plates, and each sensing pin 220 has a lower portion that extends downwardly through the guide perforation in the lower mounting plate 221 and an upper guide portion that extends through the aligned guide perforation in the upper guide plate 222. Near its lower end and the defining boundary between the upper and lower portions of the pin, each pin has a head 220H, and a spring 220S surrounds the portion of the pin so as to act between the head 220H and the upper mounting plate 222 so as to thereby urge the sensing pin downwardly to a lower position that is determined by the engagement of the head 220H with the upper face of the lower mounting plate 221.

When the sensing head 200 is moved downwardly through a sensing stroke, the several sensing pins 220 come into contact with the control cards 61, 62 and 63 at each one of the several index positions at which a data representing perforation 60 may appear. Where a pin 220 does not encounter such a perforation, the further downward movement of the sensing head 200 will result in compression of the spring 220S of that sensing pin. Where, however, a sensing pin 220 is aligned with a data representing perforation 60, the sensing pin 220 will pass through such perforation and the aligned frame perforation 60′ and will be effective to actuate switch means that govern the qualifier unit 41.

Thus, as shown in Fig. 10 of the drawings, the associated switch mechanism is provided beneath the area occupied by the sensing pins 220. In affording this structure, a stationary plate 225 is mounted so as to be disposed immediately below the location of the printing and control device D, and a second plate 226 is supported in downwardly spaced and parallel relation by means including spacer sleeves 227 and bolts 228. In downwardly spaced relation from the plate 226, an insulating plate 230 is mounted in parallel relation to the plate 226 by means including the bolts 228 and additional spacer sleeves 231. The insulating plate 230 serves as a support and mounting for a plurality of stationary switch contacts 235 from which individual wires 236 may be extended to the qualifier unit 41, as will hereinafter be described.

The stationary contacts 235 are arranged so as to be respectively aligned with the several sensing pins 220 when the sensing head 200 is in its lower or sensing position, and the movable contact means for cooperation with the stationary contacts 235 are disposed in the space between the upper ends of the stationary contacts 235 and the upper surface of the plate 225. Thus a plurality of spring plungers 238 are guided along vertical paths by the plates 225 and 226, and these plungers are arranged so as to be in alignment with the respective stationary contacts 235. Each plunger 238 has a head 238H at its upper end that is guided in an appropriate vertical bore in the plate 225, while the lower end of each plunger is extended through and guided by an appropriate opening in the plate 226. Just beneath the plate 225, a relatively thin stop plate 239 is afforded, and the uppermost position of each plunger 238 is defined by engagement of the upper end of an enlarged portion 238E of the pin with the lower surface of the stop plate 239. When the plunger is in this position, the upper end of its head 238H will be disposed in the plane of the upper surface of the plate 235. The respective plungers 238 are urged upwardly by springs 238S which surround the plungers between the enlarged portions 238E and the upper face of the plate 226. The plungers 238 thus constitute movable switch contacts which are electrically grounded through their sliding engagement with the plates 225 and 226, and when a control perforation 60 in a printing and control device D is sensed by one of the pins 220, this pin 220 forces the aligned plunger 238 downwardly so that the lower end of the plunger engages the aligned stationary switch contact 235, and it is such selective circuit closure that is effective to control the qualifier unit 41, as will hereinafter be described.

The sensing head 200 also embodies means for sensing the identifying tabs 65 and 66 of the printing devices D, and this means includes a plurality of sensing pins 240 that may be extended downwardly through openings formed respectively in the guide plates 222 and 221 as described in the aforesaid Gollwitzer application. The sensing pins 240 have heads 240H at their upper ends that rest on the upper surface of the plate 222, and in a downward sensing stroke of the sensing head 200, the pins 240 may encounter a tab 65 or 66 on a printing device D that is disposed in sensing position. It will be observed in Figs. 10 and 11 of the drawings that two sensing pins 240 are provided so that they are spaced in a front to rear direction, and this is done so that these pins may be utilized for cooperation with what are termed notched tabs, or with perforated tabs 65 which may have four and sometimes five perforations in each tab. This use of perforated tabs serves to increase the number of classifications that may be imparted to the printing devices through the use of tabs on such printing devices, but it will be observed that these pins 240 may be utilized with either perforated solid or notched tabs as is well understood in the art. When a sensing pin 240 engages a tab 65 or 66, or an unperforated area of such a tab, the continued downward movement of the sensing head serves in effect to cause relative upward movement of the sensing pin, and this relative upward movement is utilized to impart controlling movement to means that are mounted on the sensing head 200. Thus the sensing head 200 has a transverse mounting shaft 242 fixed thereon as will be evident in Figs. 9 and 10, and on this shaft 242 a rocker 245 is mounted so as to extend rearwardly.

The rocker 245 is in the form of a plate having a down-turned edge flange 246R at its rear end edge. The flange 246R, at the lower edge thereof, has a forwardly projecting horizontal flange 250 which overlies the heads 240H of the pins 240. Thus, when one of the pins 240 engages a tab, the continued rocking movement of the sensing head 200 causes the rocker 245 to be rocked in a counter-clockwise direction about the pivot afforded by the shaft 242. In other words, the rear or right-hand edge of the rocker 245 is in effect elevated when a tab 65 or 66 is thus sensed, and this relative rocking movement of the rocker 245 is utilized in causing the print-skip control of the printing machine in the same general manner described in the aforesaid Gollwitzer application.

Figure 38:
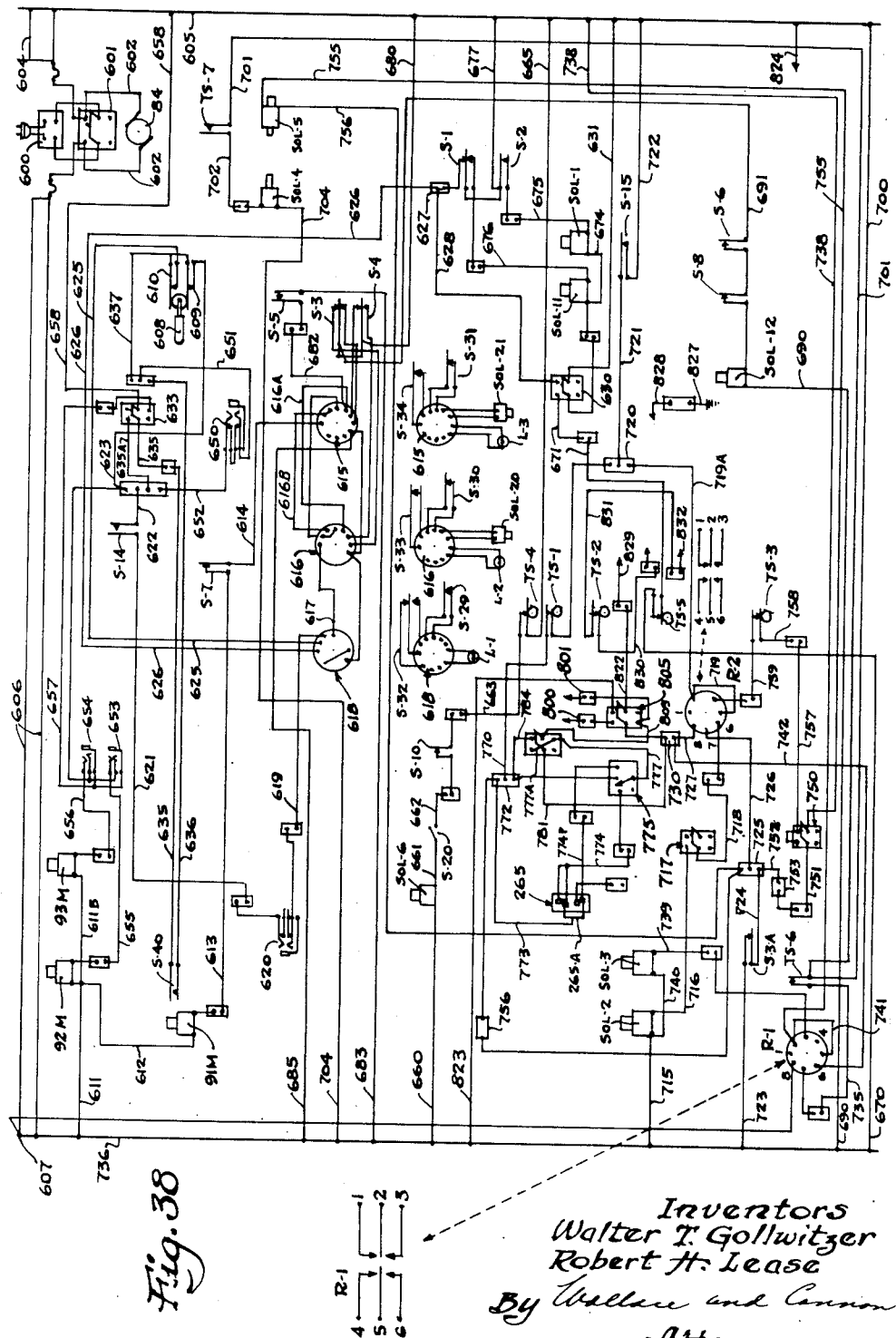
Fig. 38 is a schematic wiring diagram of the balance of the circuits in the printing machine.

It has been pointed out hereinbefore that the relative rocking movement of the rocker 245 on and with respect to the sensing head 200 is utilized to control the selector mechanism of the machine, and this is accomplished through the medium of a rearwardly extending transmitting arm 260, Fig. 9, the rear end of the arm 260 being operatively associated with a downwardly extending link, as described in said Gollwitzer application, that is connected to the movable member of a selector switch 265, Fig. 38. The rocker 245 is restored to its normal position when the sensing head is elevated, and this is accomplished by a resilient leaf spring abutment as described in said Gollwitzer application.

The sensing head 200 also includes means operable when a tab 65 is sensed in either one of two particular positions on the printing device D by a long or special purpose sensing pin, to produce a particular controlling operation, and for this purpose a pair of switches S–12 and S–13 are mounted on a bracket 267 over the guideway 71 and just forwardly of the sensing head 200. For this purpose a pair of forwardly extending levers 268–1 and 268–2 are carried on the sensing head 200 so that the forward end of the levers 268–1 and 268–2 are disposed over the operating elements of the respective switches S–12 and S–13. The levers 268–1 and 268–2 are carried on the transverse pivot shaft 242, and these levers have arms that extend rearwardly into a position wherein they will overlie the upper ends of long or special purpose sensing pins 240 disposed in a particular location on the sensing head 200. At this point, the flange 250 is cut away so that the arms are in position for direct cooperation with the related sensing pin or pins 240. Thus, when such a particular tab 65 is sensed, the related lever 268–1 or 268–2 will be forced to move or rock in a counter-clockwise direction as the sensing operation proceeds, and when this occurs the end of the lever 268–1 or 268–2 will be effective to actuate the operating element of the related control switch. When such a tab is not sensed, the arm 268–1 or 268–2 may strike the operating element of the related switch, but the lever at this time may rock freely and sufficient force will not be transmitted to the switch to actuate the same.

In the operation of the sensing head 200 it is, of course, essential that the printing devices be accurately located at the sensing station, and this same requirement is presented at sensing station III and at printing station VII. Thus, at printing station VII, a positioning pawl 275A is provided which is operated in proper timed relation by means including a rocker 276, as described in the aforesaid Hueber Patent No. 2,359,850. At the sensing station II and the punching station III, locating pawls 275 and 275X, respectively, are provided, Figs. 8 and 11, and these two locating pawls are operated in proper timed relation to the printing device feeding means in the same manner as in the aforesaid Gollwitzer application.

As described in said Gollwitzer application, the pawls 275 and 275X tend to assume their effective positions, and are moved outwardly at the proper times in the cycle by a cam bar 285, Fig. 11, that is slidably mounted along the adjacent outer face of the guideway 71.

The operation of the positioning pawl 275 is so arranged that it actuates a safety switch S–3 that is secured to the guideway just forwardly of the free end of the pawl 275. This switch includes an operating arm 297, and the relationship between the pawl 275 and the operating arm 297 is such that when the tooth 275T sits in the notch N of a printing device, the switch S-3 will be closed, but in the event that there is no printing device D positioned at the sensing station, the added inward movement of the pawl 275 causes the switch S-3 to be moved to an open relationship. The switch S-3 is included in a safety circuit as will hereinafter be described.

The operation of the sensing head

The sensing head 200 is operated in timed relationship to the printing device advancing means, and this relationship is such that the sensing head is maintained in its upper position of Fig. 11 during the first half of the machine cycle, it being during this period that the advancing movement of the printing devices takes place. Then, during the last half of the cycle, and at the time when the printing operation is being performed upon the printing device that is located at the printing station, the sensing head 200 is moved downwardly through a sensing stroke and is then allowed to return to its upper or retracted position. In accomplishing this operation of the sensing head 200, an operating link 300, Fig. 11, is pivoted at 301 on a plate 302 that is secured to the right-hand one of the operating cams 210. A spring 303 anchored on the guideway 71 extends downwardly along the link 300, and at its other end is attached to the link 300 so as to normally urge the link 300 in an upward and rearward direction, and this in turn serves to normally locate the cams 210 in their most clockwise position as shown in Fig. 11 of the drawings. The link 300 extends downwardly and forwardly and at its lower end is formed to cooperate, through a suitable cam roller, with a cam 305 that is being fixed on a rotatable sleeve 306. This rotatable sleeve is carried on an extension of the shaft 100, which forms an element of the printing device feeding means, and the sleeve is rotatable through indexing movements on and with respect to this extension of the shaft 100 as described in said Gollwitzer application. The cam roller 307 is so mounted on the link 300 that it is arranged to engage the edge of the cam 305. This cam 305 may be termed a modified form of star cam and has six lobes at equally spaced points about the edge thereof. Thus whenever the cam 305 is rotated through an indexing movement of 60°, the link 300 will be drawn downwardly by one of the lobes and will then be allowed to return to its upper position, and it might be pointed out that the indexing movements of the cam 305 are terminated when the cam roller 307 engages the low space between two of the lobes.

The sleeve 306 that carries the cam 305 is arranged to be actuated through such an indexing movement each time the printing device advancing means are operated, and this indexing movement takes place during the last half of the cycle of operation of such printing device advancing means. Thus, as shown in Fig. 12A of the drawings, the sleeve 306 has a toothed ratchet wheel 308 fixed thereon at a point adjacent to the rocker arm 134, and this toothed ratchet wheel has six teeth so as to correspond with the number of lobes of the cam 305. A pawl 309 carried on the rocker arm 134 extends downwardly, and the lower end thereof is arranged to ride against the rear face of the ratchet wheel 308. Thus, when the rocker arm 134 is moving in a forward direction during the first half of an operating cycle thereof, the pawl 309 rides freely over the teeth of the ratchet wheel 308. When, however, the movement of the rocker arm 134 is reversed in the last half of the machine cycle, the pawl 309 engages one of the teeth of the ratchet wheel 310 and imparts the desired 60° indexing movement to the sleeve 306, and it might be pointed out that this indexing movement is in the direction indicated by an arrow in Fig. 12A of the drawings. In order to prevent overthrow of the sleeve 306 and the operating elements associated therewith, a conventional friction brake 312 is associated therewith, and this friction brake may be tightened as described in said Gollwitzer application so as to insure proper actuation of the sleeve 306.

The storage mechanism

In the present machine, the sensing operation of the sensing head 200 takes place, of course, when a particular printing and control device D is located at sensing station II, and in accordance with the sensing operation and the setting of the selector mechanism associated with the selector switch 265, and in accordance with the operation and setting of the qualifier unit 41, certain control operations must be performed on or with respect to such printing and control device D when it reaches several successive stations along the printing device guideway. Thus, in respect to a particular printing and control device, there may be a recording operation performed at station III and at station IV, a print-skip control may be formed at station VII, and finally, the printing and control device may be directed into the cull drawer K-1 at station IX or selectively into the drawers K-2 or K-3 at stations X and XI.

In order to enable such delayed control operations to be performed in response to the operation of the sensing and qualifying means, the present machine includes four storage drums that are identified as drums 315A, 315B, 315C and 315D. In their structure, these storage drums are quite similar to the storage drums 315 and 315A, described in the aforesaid copending Gollwitzer application, and reference may be had to such copending application for details of physical structure of such storage drums.

In the present instance, the storage drums 315A and 315B are mounted in a fixed relation on the indexing sleeve 306, as will be evident in Fig. 12 of the drawings, and these storage drums 315A and 315B each have six stations defined thereon by storage pins 318A and 318B, respectively. The six stations about the two drums 315A and 315B are diagrammatically illustrated in Figs. 18A and 18B of the drawings, and it will be noted in these two views that the several stations have been identified by Roman numerals as stations I to VI. The station II on each drum constitutes the set-up station of the drum, and this allocation of stations about the two storage drums 315A and 315B is arranged to correspond with the identification of the first six stations along the printing device guideway. Thus, when a particular printing device D is in sensing station II along the printing device guideway, the result of the operation of the sensing head 200 and the qualifier unit, as well as the selector switch 265, is represented by an appropriate setting of the sensing pin 318A or 318B that is located at station II on the related drum. It should be observed that the set-up means in the present instance for drums 315A and 315B corresponds exactly with the set-up means illustrated in the aforesaid copending Gollwitzer application, and such set-up means include a solenoid SOL-2 for setting up the drum 315A, and a solenoid SOL-3 for setting up the drum 315B in the manner shown and described in said Gollwitzer application.

After a pin 318A or 318B has been set up at station II, it accomplishes its controlling functions in predetermined succeeding machine cycles, as will be described hereinafter with particular reference to Figs. 18A and 18B.

Now, with respect to the storage drums 315C and 315D, it may be noted that these drums are located just to the right of the right-hand end of the printing device guideway 74, as will be evident in Fig. 14 of the drawings, and the drums 315C and 315D are fixed on opposite ends of a mounting sleeve 306-2, which is in turn mounted on a horizontal shaft 320. The storage drums 315C and 315D are diagrammatically illustrated in Figs. 18C and 18D of the drawings, and it will be observed that these two storage drums have twelve equally spaced storage pins 318C and 318D mounted therein, in substantially the same manner as the pins are mounted in the other storage drums. Thus, the storage drums 315C and 315D must be indexed through 30° indexing movements, and this is accomplished through the provision of a 12-tooth ratchet wheel 322 on the left-hand end of the sleeve 306-2. Adjacent to the ratchet wheel 322, a pawl carrying rocker 324 is mounted on the shaft 320 so as to extend in a generally vertical direction. This rocker 324 carries a spring biased pawl 325 which is adapted to engage the ratchet wheel 322 when the rocker 324 is moved in a clockwise direction. The rocker 324 is urged in such clockwise direction by a spring 326. The ratchet wheel 322 is held against reverse movement by a retaining pawl 327, which is, of course, spring biased toward its effective position, as indicated in Fig. 18C of the drawings.

Means are afforded whereby the storage drums 315C and 315D are operated in timed relation to the operation of the printing device advancing means, and for this purpose an operating link 328 is extended downwardly and forwardly from the upper end of the rocker 141, and at its forward end this link 328 is connected by a pin and slot connection 329 to the lower end of the rocking lever 324. Hence, it will be clear that the storage drums 315C and 315D will be operated in a clockwise direction through a 30° indexing movement each time and at the same time that the drums 315A and 315B are being operated through their 60° indexing movements.

The storage drums 315C and 315D are arranged to accomplish their controlling functions in predetermined cycles after the sensing operation and when the related printing and control device D has reached a particular one of the stations along the printing device guideway. Thus, it will be observed that the various stations about the storage drums 315C and 315D have been indicated by Roman numerals from I to XII, and in this connection it should be observed that the set-up position is different in respect to the two drums 315C and 315D. Thus, with respect to the storage drum 315C, the set-up station II is located in the second position to the left of the uppermost position, and at this position, as shown in Fig. 14 of the drawings, a solenoid SOL-4 is mounted so that when the solenoid is energized, the aligned storage pin 318C that is located at station II will be moved to a set position.

With respect to the storage drum 315D, the set-up position is illustrated in Fig. 18D as being the first station to the right of the uppermost location of the drum, and as shown in Fig. 14 of the drawings, a set-up solenoid SOL-5 is mounted opposite this position so that when the solenoid SOL-5 is energized, the aligned storage pin 318D that is located in station II of this drum will be moved to its set-up or effective position. It will be recognized, of course, that in each instance restoring means of the cam type are provided so that the storage pins will be restored to their idle positions before they again reach the set-up station II of the drum in which they are mounted.

*The punching means*

As shown in Figs. 11, 11A, 12 and 15, punching means are provided at station III whereby a control perforation 60 may be formed at a predetermined location in the control card 62 of a printing and control device located at station III. Thus, a pair of rigid upright supports 350 are afforded on opposite sides of the printing and control device guideway 71 at station III, and a transverse rock shaft 351 is mounted so as to extend between the supports 350. On the rock shaft 351, a rearwardly projecting arm 352 is fixed, and in this arm a vertically movable punch 355 is supported in a releasable manner by means including a retaining pin 356 and a latch 357 for holding the pin 356 in place. The punch 355 extends downwardly through a guide bar 358 that is stationary and which extends across the printing device guideway 71. Thus, when the shaft 351 is rocked in a clockwise direction, Figs. 11 and 11A, the punch 355 is moved downwardly through a punching stroke, and it should be observed that in such punching stroke the frame perforation 60' that is accurately disposed beneath the punch 355 acts as a die so that the desired control perforation 60 is formed in the control card 62.

The desired rocking movement of the shaft 351 that is required for accomplishing a punching operation is accomplished by means associated with the storage drum 315A, as will be evident in Figs. 11 and 18A. Thus, on its right-hand end, as viewed in Fig. 12 of the drawings, the shaft 351 has a rearwardly projecting arm 359, and from the forward end of this arm a link 360 extends downwardly and in a slightly forwardly direction. The lower end of the link 360 is connected to the forward end of a bell crank lever 361 which is pivoted intermediate its ends at 362 on a stationary pivot on a bracket 362B. The other or rear end of the bell crank lever 361 is identified as 361R in Fig. 18A, and this arm extends into a position beside the storage drum 315A so as to be disposed in the path of a set storage pin 318A when this storage pin is being moved from station II to station III of the drum. A spring 364 connected between the link 360 and the adjacent bracket 350 urges the link 360 in an upward direction so as to thereby normally maintain the punch 355 in its elevated or retracted position. When a storage pin 318A has been set at station II, the printing and control device D that has governed the setting of the particular storage pin 318A will be moved from station II and into station III before the next indexing movement of the storage drum 315A, and hence, while this printing and control device is located at station III, the advancing movement of the storage drum 315A in the last half of the cycle will cause the related pin 318A to engage the arm 361R, thereby to actuate the punch 355 through a downward or punching stroke. The arrangement is such that just prior to the completion of the indexing movement of the storage drum 315A the pin that has caused downward actuation of the punch will pass beyond the end of the arm 361R, thereby to allow the punch 355 to return to its retracted position, and this, of course, releases the printing and control device so that it may be advanced out of station III in the next machine cycle. It will be recognized, of course, that the punch operating rock shaft 351 will be operated by each pin 318A that is in its set position, and in those instances where it is desired to eliminate the punching operation, this may be accomplished by removal of the pin 356 and the punch 355.

*The tab shifting mechanism*

As shown in Figs. 24 to 27, means are afforded in association with station IV of the printing and control device guideway for shifting the pivot tabs 66 from one position to another, and this is accomplished under control of the storage drum 315A. Thus, as will be evident in Fig. 24 of the drawings, an operating or actuating link 365 is connected to the forwardly extending arm 276-2 of the rocker 276, this connection being afforded by a pivot 366. This link extends generally to the right and to a point closely adjacent to the right-hand end of station IV of the printing device guideway. Near its right-hand end, the link 365 is supported and guided for movement from front to rear and in a horizontal plane by a guide 368 so that the link 365 may be urged by a spring 369 from the effective or forward position that is shown in full lines in Fig. 24 to a rear or ineffective position that is shown in dotted lines in Fig. 24. In such movements the link 365 pivots about the point 366.

It will be recalled that the printing and control devices D as illustrated herein have provision for the mounting of two pivot tabs 66 adjacent to opposite ends of the upper edge thereof, and in the present instance means are afforded in association with the link 365 so that this link may be rendered effective to engage and shift either one of these tabs 66 from a left-hand position to a right-hand position. For this purpose the link 365 has two mounting openings 370 formed therein, and a removable pin 371 is adapted to be mounted in either one of these openings 370. In the present instance, the pin 371 is shown as being located in the left-hand one of the two openings 370, and when this pin 371 is in such location, a forward shifting movement of the link 365 to the full line position of Fig. 24 places the pin 371 in position just to the left of the left-hand pivot tab 66. Similarly, when the pin 371 is located in the right-hand one of the openings 370, such pin will under such circumstances come to rest just to the left of the right-hand pivot tab 66. Hence, when the link 365 is disposed in its forward or effective position, the link 365 may be actuated to the right to effect the desired tab shifting operation, and in this respect it will be evident that the operation of the rocker 276 in the course of the operation of the printing device advancing means will impart such tab shifting movement to the link 365.

As pointed out hereinabove, the link 365 is disposed normally in its rearward or ineffective position, and when so located, the longitudinal movements of the link 365 will take place in each cycle of operation of the printing device advancing means, but these will, of course, be idle movements. When the link 365 is to be shifted to its effective position, this is accomplished by a lever 374 that is pivoted at 375 on a bracket 376. The right-hand end of the lever 374 is connected by a link 377 to the lever 365, and at its left-hand end, the lever 374 is connected to the armature of an actuating solenoid SOL-6. The solenoid is located rearwardly of the arm 375 so that when the solenoid is energized, the link 365 will be shifted to its effective position. This shifting movement is controlled primarily by the storage drum 315A, and is timed by timing switch means, as will hereinafter be described. Thus, as will be evident in Figs. 11 and 18A, a normally open control switch S-10 is mounted on a bracket 380 that is suspended from the frame bar 82, and an operating lever 383 that is loosely pivoted on the shaft 101 has an upwardly extending arm 384 thereon which is effective to close the switch S-10 when the lever 383 is rocked in a clockwise direction. The lever 383 is urged in a counterclockwise direction by a spring 386, and such movement in a clockwise direction is limited by an abutment arm 387 that engages a mounting or pivot shaft 388 which will be described hereinafter.

At its forward or left-hand end as viewed in Fig. 18A, the lever 383 has an elongated cam surface 383C that is arranged to be engaged by a set storage pin 318A as such a storage pin is moving into station IV of the storage drum 315A. The arrangement is such that the switch S-10 is closed late in the cycle of machine operation in which a related printing device is being moved into station IV, and the switch S-10 is maintained closed until the next indexing movement of the storage drum 315A has progressed to a substantial extent, as will be evident in Fig. 39A of the drawings. The switch S-10 thus serves as a conditioning switch for the tab shift mechanism, and the circuit to the solenoid SOL-6 is thereafter completed early in the next machine cycle by a timing switch TS-4 as will be hereinafter described in connection with the circuit diagram of the present machine.

The numbering machines

As shown particularly in Figs. 28 to 30 of the drawings, a pair of numbering machines N-1 and N-2 are mounted adjacent to printing station VII on the left-hand side of the printing device guideway 73 as viewed in Fig. 8. These numbering machines N-1 and N-2 are adapted, when in their raised or effective positions, to cooperate with a portion of the platen roller PR so that printed impressions are made from the type wheels of such numbering machines.

As herein shown, the numbering machines are removably mounted in a conventional manner by means of a spring retaining bar 400 on a mounting block 401 that is pivoted at 401P so that its forward end is adapted to be moved between a lower position and an upper or effective position, and this movement is accomplished by means of a rock shaft 402 that is disposed beneath the mounting plate 401. The shaft 402 has a flat side 402F as shown in Fig. 30A, so that when the shaft 402 is rocked in a clockwise direction from the position shown in Fig. 38, the numbering machines N-1 and N-2 will be returned to their lower position. When the shaft is in its most clockwise position, and it is desired to elevate the numbering machines for the purpose of making an impression therefrom, this may be accomplished by means of a solenoid SOL-1 that is mounted on a bracket 405 supported from the printing device guideway 73. The solenoid SOL-1 has an operating link 406 connected to its armature and extended rearwardly, the rear portion of the link 406 being connected to an arm 407 that is fixed on the rock shaft 402.

The numbering machine N-1 has an operating or advancing link 408-1 associated with the units order thereof, and this link extends rearwardly and has a laterally projecting arm disposed forwardly of an operating plunger 410 which, when actuated in a forward direction against the action of a spring 411-1, is effective to advance the numbering machine by one unit. The numbering machine N-2 has a generally similar actuating link 408-2 associated with the units order thereof and extending rearwardly therefrom, and a laterally projecting arm on this link is disposed forwardly of an operating plunger 410-2 so as to attain a similar advancing operation in respect to the numbering machine N-2. The numbering machine N-2 is arranged to be actuated each time a printed impression is made from a printing device, and the means for accomplishing this are known in the art and include a rocker arm 412-2 that is mounted on a shaft 413. Similarly, a rocker 412-1 is mounted on the shaft 413, and the rocker 412-1 is fixed to the shaft so that the shaft may be associated in a known manner with the other mechanisms of the machine so as to be operated in each cycle of machine operation, thus to register on the counter N-1 the total number of printing devices that are passed through the machine. The operation of the rocker 412-2 is such that the numbering machine N-2 is advanced only when the platen P of the machine is operated. When the numbering machines are raised, by pivoting about the pivot 401P, the rear ends of the plungers 410 are lowered out of the paths of the arms 412, and hence the numbering machines are not actuated in the cycle when impressions are made from the numbering machines.

When a total has been printed from the numbering machines N-1 and N-2, it is desirable to immediately clear these numbering machines, and for this purpose the two numbering machines have restoring pinions 415-1 and 415-2 on their other or left-hand ends. These pinions are disposed in a common vertical plane, and at their lower edges are meshed with a restoring rack 416. At its rear end the restoring rack is operatively connected to a rearwardly extending link 417 which, at its rear end, is connected by an overload type of pivotal connection 418 to the upper end of a bell crank 420. This bell crank is pivoted loosely on the shaft 100, and a spring 421 acts on the upper end of the bell crank 420 so as to normally urge the link 417 and the connected restoring rack 416 in a forward direction. This yielding action of the spring 421 is, however, normally ineffective by reason of a latch 423 that engages a tooth 420T on the bell crank lever 420. The latch 423 may be released when the numbering machines are to be restored, and this is accomplished by a solenoid SOL-11 that has its armature operatively connected with the latch 423.

The bell crank 420 has a lower arm 420A that extends rearwardly and has a cam roller 425 fixed thereon in position to be engaged with a cam 426, such cam in the present instance being fixed to the mounting sleeve of the drive sprocket 83, as will be evident in Fig. 33 of the drawings.

When the numbering machines are to be restored and the solenoid SOL-11 is energized, the bell crank 420 is allowed to move under the influence of the spring 421 so as to thereby move the restoring rack 416 in a forward or conditioning direction, and this movement continues until the cam roller 425 engages the cam 426. Then, in the rotation of the cam 426 in the next cycle of machine operation, the cam 426 withdraws the restoring rack in a rearward direction so as to fully restore the two numbering machines N-1 and N-2. It may be pointed out that the forward or conditioning movement of the restoring rack 416 takes place late in the cycle in which an impression has been taken from the two numbering machines or, in other words, after the platen roller PR has moved over the area occupied by the two numbering machines. At the end of the stroke of the rack 416 in a forward direction, a lug 416L on the rack 416 strikes a rearward extension of the link 406, and this moves the link 406 and the associated rock shaft 402 so that the rock shaft returns to the position wherein the flat surface 402F thereof is engaged with the mounting plate 401. This returns the numbering machine to its lower position. It should also be observed that the completion of the restoring movement of the rack 416 takes place at substantially the time when the operating rockers 412 are actuated, and hence, in the cycle wherein the numbering machines N-1 and N-2 are restored, they may be actuated so as to start a new counting operation.

It will be observed that the cam 426 has a lobe 426L formed thereon which serves to slightly rearwardly move the restoring rack 416 in each machine cycle, and this takes place at the time when it may be desired to release the latch 423. This is done in order to reduce the force that must be exerted by the solenoid SOL-11.

The control of the lifting and restoring of the numbering machines N-1 and N-2 is attained through the operation of the storage drum 315B, and it will be noted in Fig. 18B that this storage drum has two arms 431 and 432 associated therewith. The arm 432 is arranged so as to be engaged by a set pin 318B as this pin moves from station V to station VI of the storage drum, and such operation takes place late in the advancing or indexing cycle. The arrangement is such, as shown in Fig. 18B, that the arm 432 is released for return or clockwise movement about its supporting pivot shaft 388 just prior to completion of such indexing movement.

The arm 431 is arranged to be similarly actuated by such a set pin in the next cycle of indexing movement of the storage drum 315B, and the arms 431 and 432 are arranged, respectively, to close switches S-1 and S-2 that are supported adjacent to the storage drum. The timing of the closure of these two switches is illustrated in Figs. 39 and 40 of the drawings, and it should be pointed out that the switch S-2 governs the solenoid SOL-1 that effects lifting of the numbering machines N-1 and N-2, while the switch S-1 governs the operation of the solenoid SOL-11 which governs the restoring rack 416.

The cull-control mechanism

The storage drum 315D is arranged to govern the operation of the solenoid SOL-12 of the cull-control gate G-1, and for this purpose a switch S-6 is arranged with an operating plunger 436, Fig. 18D, so that whenever this plunger 436 is pushed in a forward direction, the switch S-6 will be closed. The plunger 436 is arranged to be engaged and forwardly actuated by a set pin 318D as such pin moves between stations IX and X of the drum, this timing being illustrated in Fig. 40A of the drawings. The switch S-6 is closed at substantially the time when the pin moves into station IX and is allowed to open just before this pin moves into station X, and in the cycle in which the pin is moved from station IX to station X, the circuit that is conditioned by closure of the switch S-6 is closed by the timing switch that is associated with the gate-operating slide 162 so that this last mentioned switch serves as a timing switch in this circuit.

The drawer drop control

The storage drum 315C is utilized in the present instance to govern the alternate use of the collecting drawers K-2 and K-3, and for this purpose, a follower arm 440 is pivoted on a shaft 441, Fig. 18C, so as to extend forwardly beneath the rear portion of the storage drum 315C. On this follower arm 440, a tooth 440T is provided so that when the set pin moves from station X to station XI the follower arm 440 will be rocked in a downward direction and then released for upward movement just prior to the time when the pin reaches station XI. This downward rocking movement of the follower arm 440 is utilized to impart an advancing or indexing movement to a control shaft 445. In accomplishing this, the shaft 445 has a ratchet wheel 446 fixed thereon, and a relatively long pawl 447 extends downwardly from the forward end of the follower arm 440, and has a tooth 447T thereon for engaging the ratchet wheel 446. This pawl 447 is thus operable to advance the control shaft 445 through an angular increment identified as "X" in Fig. 18C of the drawings. Such indexing movements of the shaft 445 are utilized to control the rocking movements of the shaft 166, and they are also utilized to govern the operation of a pair of reversing switches S-3 and S-4 which, among other things, govern the indicating lights associated with the drawers K-2 and K-3, and also govern the conditioning circuits for controlling the dropping of the drawer that is completely filled.

Thus, it will be observed that the shaft 445 has a cam 448 thereon which has alternate high and low portions 448L and 448H. At its forward edge, the cam 448 is adapted to be engaged by a roller 449 that is fixed on the arm 450 on the shaft 166. A spring 451 acts to hold the roller 449 in engagement with the cam 448, and hence, as the control shaft 445 is advanced, the shaft 166 will be rocked between two positions, in one of which the blocking arm 167 is in position to block movement of the gate G-2, and in the other of which the arm 167 is in a lower or ineffective position so that the gate G-2 may operate when the slide 162 is moved rearwardly.

On the rear side of the cam 148, a roller 452 is mounted on an arm 453 that is pivoted at 454. A spring 455 holds the roller 452 in engagement with the cam 448, and it should be observed that when one of the rollers 449 and 452 is located in a low portion of the cam, the other roller will be located on a high portion of the cam, and thus one or the other of these rollers acts as a detent to hold the control shaft 445 in the position to which it has been moved by the pawl 447. The arm 453 is effective to operate the reversing switches S-3 and S-4 so that these switches may obtain the reversing functions that will hereinafter be described.

The drawer mounting

All of the drawers or collectors K-1, K-2 and K-3 are similarly mounted on shelves 460 that are pivoted at 461 on brackets 462. When a drawer is in position on one of the shelves 460, the shelf may be pivoted at the pivot 461 to the upper position shown in Fig. 41, and when this is done, the drawer is held in such upper position by engagement of a detent 463 with a stud 464 that is afforded on the bracket 462. An operating handle 465 mounted beneath the forward end of the shelf 460 has a rearwardly extending rod 466 thereon so that an operator may manually push the rod 466 rearwardly to operate the pawl 463, thereby to permit the shelf 460 to drop downwardly at its forward end. Thus, it will be observed that the pawl 463 is pivoted at 467 on the lower portion of the shelf 460, and has a spring 468 urging the pawl to an effective position. When the rod 466 is pushed rearwardly, a lower push rod 466L engages the lower end portion of the pawl 463 to pivot the lower end in a rearward direction, thereby to release the shelf for downward movement. Such downward movement takes place by gravity, and it may be observed that means, such as a dash pot 470, may be associated with the rear end portion of the shelf to cushion the shock that might be caused by excessive weight in the forward portion of the drawer carried on the shelf.

The mechanism shown in Fig. 41 of the drawings also provides for an automatic release of the latch pawl 463. To accomplish this, a bell crank 471 is pivoted at 472 on the bracket 462, and a roller 473 on one arm of the bell crank is arranged to engage the forward face of the latch pawl 463. Thus, by rocking the bell crank 471 in a clockwise direction, the latch pawl 463 may be released and the drawer caused to drop. Electrically operated means are afforded for operating such bell crank 471, and with respect to the drawer K-3, a solenoid SOL-21 is provided having the armature thereof operatively connected to the other arm of the bell crank 471. With respect to the drawer K-2, the mechanism is the same, and a solenoid SOL-20, Fig. 38, is provided. On the bracket 462, a switch S-31 is provided in association with the drawer K-3, and the pawl 463 is arranged to engage and open the switch S-31 when the drawer has been dropped, or, in other words, when the shelf has moved downwardly in response to a release of the latch pawl 463. In respect to the drawer K-3, a switch S-30 is provided in this relationship, and in respect to the drawer K-1, a switch S-29 is provided for the same purpose.

On the rear portion of the shelf 460, means are afforded to provide an indication when the drawer on the shelf has been completely loaded. This is accomplished by the follower on such drawer when the follower moves to this most rearward position, and, as shown in Fig. 41, a switch S-34 is associated with the drawer K-3. A similar switch 33 is provided in association with the drawer K-2, while in respect to the drawer K-1, a reversing switch S-32 is mounted in this position.

The mechanism including the latch pawl 463 and the solenoid SOL-21 is, in each instance, enclosed with a protective housing 480, and, as shown in Fig. 41, and also in Fig. 1, an indicating light is provided at the forward end of each one of these enclosing housings, such lights being indicated by the reference characters L-1, L-2 and L-3 in respect to the drawers K-1, K-2 and K-3, and being mounted on the forward ends of the respective rods 466 so as to serve also as manual actuating buttons for these rods.

The timing switches

Figure 38A:
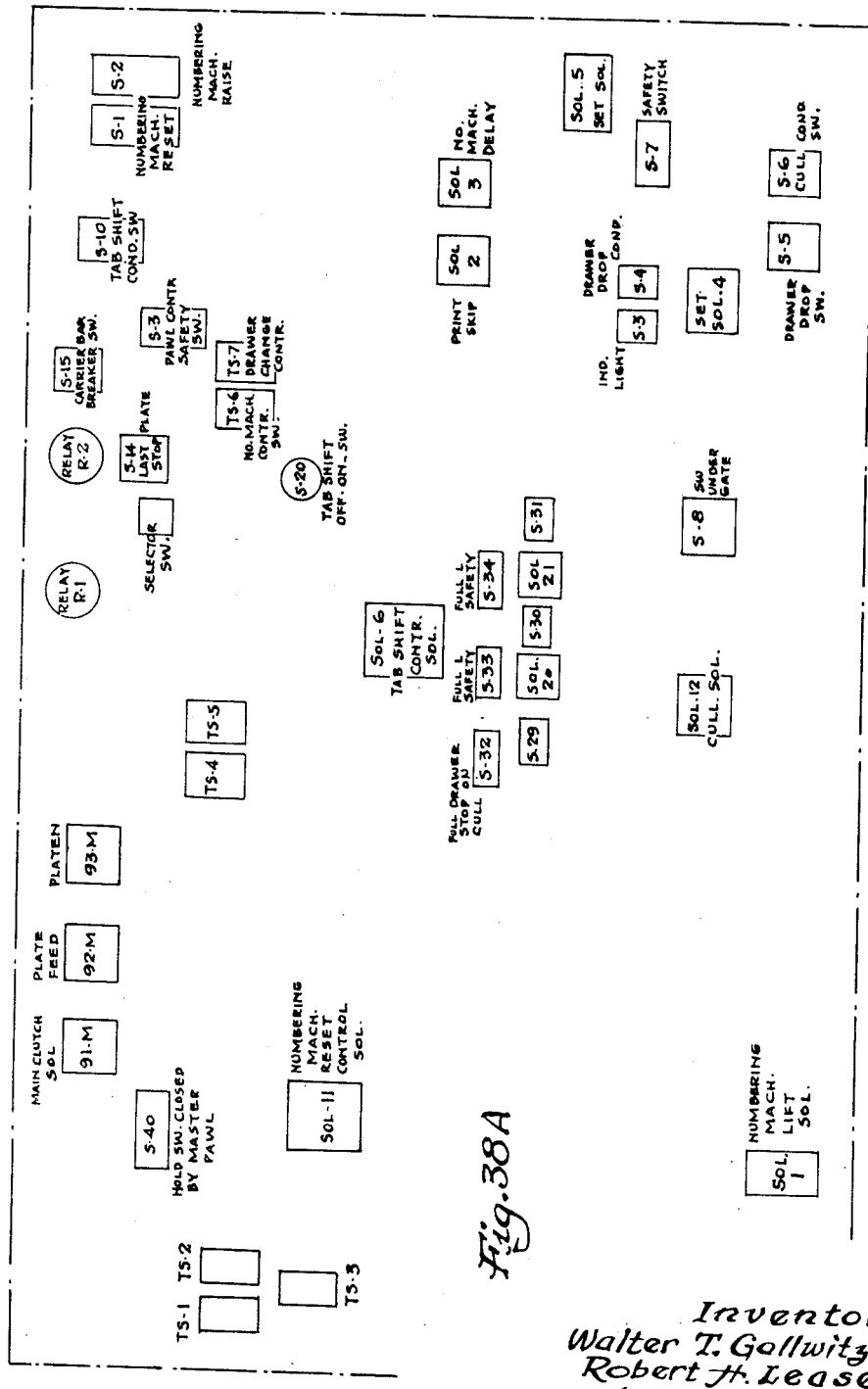
Fig. 38A is a diagrammatic plan view showing the approximate physical locations of the switches and solenoids in the printing machine.

The main drive shaft 80 of the machine is utilized to operate timing switches TS-1, TS-2, TS-3, TS-4 and TS-5, Figs. 38 and 38A, that are mounted over the main shaft 80, and for the purpose of operating these timing switches, a plurality of cams C-1 to C-5 are fixed on the shaft 80 in the location shown in Fig. 31 of the drawings. These cams are arranged to close the timing switches at the times and for the purpose shown in the timing chart of Fig. 39.

Control circuits in the unit 40

The control circuits in the unit 40 take their power from a terminal block 600 through a main off-on switch 601, and when the switch 601 is closed, the driving motor 84 is energized through connections 602 as shown in Fig. 38 of the drawings. When the switch 602 is closed, circuit is extended through a wire 604 to a main bus bar 605 that is shown at the right-hand side in Fig. 38 of the drawings. Similarly, wires 606 in parallel extend from the other side of the switch 602 to another bus bar 607 that is shown at the left-hand side of Fig. 38, and the various control circuits are afforded between the bus bars 605 and 607.

Thus, it will be recalled that the main clutch 91 is caused to engage by energizing the solenoid 91M, and when this is to be done, a start-stop control handle 608 is operated to close a normally open start switch 609. The handle 608 may also be utilized to open a normally closed stop switch 610 that is included in what may be termed the running or safety circuit of the machine, as will hereinafter be described. This running or safety circuit is also arranged to include the switch S–40, which is closed by the stop lever 91S when this stop lever moves to its released position, and this is effective, as will hereinafter be described, to afford a shunt circuit around the start switch 609. Thus, it will be noted that wires 611 and 612 in series extend from the bus bar 607 to one terminal of the solenoid 91M, and means including a wire 613 are extended from the other terminal of the solenoid 91M to a normally closed switch S–7 that is arranged in association with the arm 152 so as to be opened in the event that the overload release mechanism 178R becomes released, as would be the case in the event that the printing devices jammed in the distributing guideway 74 of the machine. From the other terminal of the switch S–7, a wire 614 extends to one contact of a plug and socket connector 615, and from this contact the circuit is extended through the switch S–34, which constitutes the overload or full-load switch of the drawer K–3. From the other side of the switch S–34, the circuit is extended by a wire 616B to one contact of a plug and socket connector 616 through which the circuit is extended to the switch S–33, which constitutes the full load switch of the drawer K–2. From the other side of this switch, the circuit is extended by a wire 617 to a plug and socket connector 618 so as to be extended through the switch S–29, which is the switch that is opened when the cull drawer K–1 is in its down or ineffective position.

Before proceeding further with the aforesaid starting circuit, it should be pointed out that the switches 30 and 31 are connected so that the starting circuit will be broken if both of the drawers K–2 and K–3 are in their lower positions. Thus, the switch 34 has one connection through the switch 30 to the switch 33, while the switch 33 has an alternate connection back to the switch 34 through the switch 31. Thus, if one or the other of the drawers K–2 or K–3 is in its upper position, the circuit will be extended through the switches 33 and 34 and one of the switches 30 or 31 to the switch 29, and thence the circuit is extended through the plug connector 618 and a wire 619 through a plug or jack connection 620 that may be utilized in association with a special control switch fitting. The switches of the jack 620 are normally closed when a plug is not in position therein, and circuit is thus extended through the switches of the jack 620 and a wire 621 to one contact of a normally closed switch S–14 that is located in a conventional manner adjacent the magazine M so as to be opened when the supply of printing and control devices has been exhausted. A wire 622 extends from the other side of the switch S–14, and in series through a wire 623 to one contact of the normally open starting switch 609. The other contact of the switch 609 is connected by a wire 624 to one contact of the normally closed stop switch, and a wire 625 from the other contact of the stop switch extends back to the plug 618 through which it is connected to the normally closed contact of the reversing switch S–32, the common contact of this switch being connected through the plug 618 and a wire 626 to a junction plate 627. From the junction plate 627, a wire 628 extends to the upper right stationary contact of a control switch 630, which constitutes a control for the numbering machines. When the switch 630 has the control element thereof in its upper position, circuit is extended from the wire 628 through a wire 631 to the line wire 605. Thus, when the starting switch 609 is closed, the solenoid 91M will be energized, thereby to cause the main clutch 91 of the machine to be engaged, and when this occurs, the switch S–40 will be closed.

This closure of the switch S–40 serves, when the machine is set for automatic operation, to afford a shunt circuit around the starting switch 609. The machine is set for such automatic operation by a control switch 633 of the double throw type. When the switch 633 is set in its upper position, the machine is conditioned for automatic operation, and the left-hand movable element of the switch member is connected by a wire 635 to one contact of the switch S–40. The upper left stationary contact of the switch 633 is connected by a wire 635A to the wire 622. The other contact of the switch S–40 is connected by a wire 636 and a wire 637 in series to the wire 624, and this affords the desired shunt connection around the starting switch 609 and enables the control circuit to be broken by opening of the stop switch 610.

A similar starting action may be attained by connecting suitable switch means into a jack 650 that has its opposite contacts connected by wires 651 and 652 to the wires 637 and 622, respectively.

It will be recalled that solenoids 92M and 93M may be energized to disengage the clutches 92 and 93, respectively, and for this purpose, connecting jacks 653 and 654 are provided. The wire 607, and a branch 611B extend circuit to one contact of the solenoid 93M. Wires 655 and 656 extend, respectively, from the other terminals of the solenoids 92M and 93M to one of the contacts of each of the related jacks 653 and 654, and a wire 657 extends from the common contacts of the two jacks to the lower right-hand stationary contact of the switch 633. A wire 658 extends from the right-hand movable contact of the switch 633 to the wire 605, so that when the switch 633 is set in its lower or manual position the solenoids 92M and 93M are conditioned for use under control of switch means associated with the jacks 653 and 654. The upper position of the switch 633, is, of course, the position required for automatic operation of the machine.

*The controlling action of the storage drum 315A*

In such automatic operation of the machine the set storage pins 318A in the drum 315 serve, of course, to mechanically actuate the punch 355, and this takes place in the timed relation shown in Figs. 39A and 40. Such pins also serve to operate the lever 105 and the associated stop lever 93S–2 of the platen clutch 93 so as to cause the desired print-skip operation of the platen P, and the timing of such operation is also shown in Figs. 39A and 40.

The set pins 318A in the storage drum 315A also serve to govern the operation of the tab shifting means of Figs. 24 to 27, and this is accomplished electrically by the circuit shown in Fig. 38. Thus, the control solenoid SOL–6 has one terminal connected by a wire 660 to the line wire 607. The other terminal of the solenoid SOL–6 is connected by a wire 661 to one contact of an off-on switch S–20, the other contact of which is connected by a wire 662 to one contact of the switch S–10, this last switch being the one that is closed as hereinbefore described by the set pins 318A. The other contact of the switch S–10 is connected by a wire 663 to one contact of the timing switch TS–4, the other contact of which is connected by a wire 665 to the line wire 605. The timing of the operation of the tab shifting means is shown in Figs. 39A and 40.

*Controlling circuits from the storage drum 315B*

The set pins 318B in the drum 315B serve primarily to govern the numbering machine control solenoids SOL–1 and SOL–11, and in this action the switch TS–5 serves as a timing switch. Thus, one contact of the switch TS–5 is connected by a wire 670 to the line wire 607, the other contact of this switch being connected by a wire 671 to the upper left stationary contact of the off-on switch 630, the left-hand movable contact of which is connected by a wire 673 and a branch 674 to one terminal of the respective solenoids SOL–11 and SOL–1. The other contact of the solenoid SOL–1 is connected by a wire 675 to one contact of the switch S–2, while the other terminal of the solenoid SOL–11 is connected by a wire 676 to the normally open stationary contact of the switch S–1. The movable contact of the switch S–1 is normally engaged with a second stationary contact of the switch S–1, and this second stationary contact is connected to the terminal block 627. The common contact of the switch S–1 and the other contact of the switch S–2 are connected to the line wire 605 by a wire 677. Thus, when the switch 630 is in its upper closed position, the closure of the switch S–2 will cause the numbering machines N–1 and N–2 to be lifted so as to cause impressions to be made therefrom, and the subsequent closure of the switch S–1 to the normally open contact thereof by the pin 318B serves to cause the numbering machines to be reset in the next cycle, as indicated in the timing charts of Figs. 39A and 40.

The switch 630 serves in its open position to change the function of the storage drum 315B. Thus, when this switch is in its open position, the normally closed contacts of the switch S–1 serve to replace the wires 628 and 631 in the running circuit of the machine, and when a pin 318B actuates the switch S–1, this running circuit is broken and the solenoid 91M is deenergized, thereby to stop the machine.

Controlling action of the drum 315C

The set pins 318C in the drum 315C serve as hereinbefore described to reverse the position of the gate stop arm 167, to reverse the switches S–3 and S–4, and to close the switch S–5. The switch S–4 serves to control energization of the solenoids SOL–20 and SOL–21, while the switch S–3 serves to control and alternately energize the indicating lights L–2 and L–3. Thus, the common contacts of the switches S–3 and S–4 are connected by a wire 680 to the line wire 605, while stationary contacts of the switch S–4 are connected, respectively, through the plugs 615 and 616 to one terminal of the respective solenoids SOL–21 and SOL–20. The other terminals of the solenoids SOL–21 and SOL–20 are connected through the respective plugs 615 and 616 and a common lead wire 682 to one contact of the switch S–5, the other contact of which is connected by a wire 683 to the line wire 607.

Similarly, the stationary contacts of the switch S–3 are connected, respectively, through the plugs 615 and 616 to the terminal of each of the respective indicating lights L–3 and L–2, the other terminals of such lights being connected through such plugs and a common lead wire 685 to the line wire 607.

It should be noted here that the light L–1 serves merely to indicate the reason why the machine has stopped when filling of the cull drawer K–1 has reversed the switch S–32. Thus, one terminal of the light L–1 is connected by means including the wire 685 to the line wire 607, and within the plug 618, the other terminal of the light L–1 is connected to the normally open stationary contact of the switch S–32. Thus, when actuation of the switch S–32 engages the movable contact with this stationary contact, the circuit is completed through the wire 626 and the extensions thereof, as hereinbefore described, to the line wire 605, thereby to energize the light L–1.

Controlling action of the drum 315D

In a culling run of the machine, the drawer changing and dropping action of the storage drum 315C takes place in the same manner as in regular runs of the machine, but the drum 315A is not used and hence no printing takes place. In such a culling run, however, the drum 315D governs the gate G–1 so as to drop predetermined or selected printing devices D into the cull drawer K–1. Thus, the gate operating solenoid SOL–12 has one terminal connected by a wire 690 to the line wire 607, and from the other terminal of the solenoid SOL–12, the switches S–8 and S–6 are connected in series to a wire 691 which extends to the wire 680, and thus to the line wire 605. Thus, when a set pin 318D in the drum 315D closes the conditioning switch S–6, at the line indicated in Fig. 40A, the subsequent closure of the timing switch S–8 by the gate operator 162 in the next machine cycle, completes the energizing circuit for the solenoid SOL–12. This causes the related printing device to be dropped by the gate G–1 into the cull drawer K–1.

The set-up of the storage drum 315C

The storage drum 315C serves, as hereinbefore described, to govern the changing of the collecting drawers K–2 and K–3, and in accomplishing this result, it is desired that each drawer shall receive the same group of printing and control devices D that have been removed from this drawer and placed in the magazine M. To enable this to be done, a tab 65 is placed in a selected identifying position on the last printing and control device D that is included in a particular storage drawer. When this last printing device reaches sensing station II, the aforesaid tab is sensed by a long sensing pin, which is arranged to cooperate with the rear end of the arm 268 that is associated with the switch TS–7. Hence, the switch TS–7 will be closed, and this is arranged to energize the set-up solenoid SOL–4 that is associated with the storage drum 315C. Thus, it will be observed that a wire 700 extends from the line wire 605 to one contact of the switch TS–6, and a wire 701 extends this circuit to one contact of the switch TS–7. A wire 702 from the other contact of the switch extends to one terminal of the solenoid SOL–4, while a wire 704 extends from the other terminal of this solenoid to the line wire 607. Hence, it will be clear that closure of the switch TS–7 will energize the solenoid SOL–4, thereby to set a pin 318C so that the controlling operation in respect to the drawers K–2 and K–3 will be attained at the proper time as hereinbefore described.

The set-up of the storage drum 315A

In attaining controlled set-up of the drum 315A, a timing relay R–2 is utilized so as to be operated each time a pin 318A is to be actuated to set position, while in certain cycles where a pin 318B is to be set, a similar relay R–1 is operated in a controlling relation as will hereinafter be described. Each of the relays R–1 and R–2 has its operating coil disposed between its plug terminals 7 and 8, while in each case, such relays have stationary contacts 1 and 3 between which contact 2 may be actuated from normal engagement with contact 1 to engagement with contact 3. Similarly, each relay has contacts 4 and 6 between which contact 5 may be actuated from normal engagement with contact 4 to engage contact 6.

The timing relay R–2 is arranged to energize the solenoid SOL–2 when contacts 5 and 6 thereof are engaged due to operation of the relay R–2. Thus, a wire 715 extends to one terminal of the solenoid SOL–2, and from the other terminal a wire 716 extends to one contact of an off-on switch 717 which may be opened when operation of the platen is not desired. Circuit is extended from the other contact of the switch 717 to the No. 6 contact of the relay R–2, by a wire 718, and from the No. 5 contact thereof, wires 719 and 719A in series extend to a terminal block 720. From this terminal block 720 circuit is extended by a wire 721, the switch S–15 and a wire 722 to the line wire 605. The switch S–15 constitutes a control switch that is held open when the carrier bars of the guideway 71 are in their rear or home positions, and thus switch S–15 is effective to prevent counting and similar functions in the second printing cycles of duplicate printing operations.

The operating circuits for energizing the relay R–2 are afforded in part by a wire 723 extended from the lead wire 607 to one contact of the safety switch S–3 which is open when a printing device D has not been moved into sensing station II. A wire 724 extends from the other contact of the switch S–3 to a terminal 725, from which a wire 726 extends to the No. 7 terminal of the relay R–2. The operating coil of the relay is disposed between the 7 and 8 terminals, and from the No. 8 terminal a wire 727 extends to a terminal block 730. When the timing relay is to be energized, circuit is extended from the terminal block 730 to the line wire 605 by operation of the selector switch 265, the qualifier unit 41, or by operation of the relay R–1, as will be hereinafter described.

The set-up of the storage drum 315B

The storage drum 315B is utilized to control printing from and re-setting of the numbering machines N–1 and N–2, and this numbering operation is used where the number of impressions in a particular group is to be printed from a special printing device that follows the last printing device of such group, with the last impression in such group. This expedient is commonly used in mailing operations where the special printing device that follows a group constitutes a town marker addressed to a particular city or area. Such town marker printing device has a tab 65 thereon in a particular position. Such a tab is sensed by a long sensing pin which operates the one of the arms 268 that is associated with the switch TS–6, and thus the switch TS–6 is closed when such a tab is sensed. It will be recalled that one contact of the switch TS–6 is connected by the wire 700 to the line wire 605, while a wire 735 extends from the other contact of this switch to one end of the operating coil of the relay R–1. The other end of the coil of the relay R–1 is connected by a wire 736 to the line wire 607 so that when the switch TS–6 is closed, the relay R–1 is operated.

When the relay R–1 is thus operated, the closure of its contacts 2 and 3 serves to complete circuit to the solenoid SOL–3 so as to thereby effect setting of a pin 318B in the drum 315B. Thus, the contact 2 is connected by a wire 738 to the line wire 605, while a wire 739 connects the contact 3 to one terminal of the solenoid SOL–3, the other terminal of the solenoid SOL–3 being connected by a wire 740 and the wire 715 to the line wire 607.

When a pin 318B is thus set to cause lifting of the numbering machines N–1 and N–2, it is, of course, necessary that the platen P be caused to operate in the related cycle. This is accomplished by placing the relay R–1 in control of the operation of the relay R–2. Thus, circuit is extended between the 2 and 5 contacts of the relay R-1 by a wire 741, and a wire 742 is extended from the No. 6 contact of the relay R-1 to the terminal block 730. Thus, when the relay R-1 is operated, a similar operation of the relay R-2 takes place, and hence the platen will operate when the town marker printing device reaches printing station.

The set-up of the storage drum 315D

The storage drum 315D is, of course, utilized to control operation of the gate G-1 in a culling run of the machine, and in such a run the relay R-2 functions under control of the selector switch or the qualifier unit 41, as will hereinafter be described, to govern the culling operation. In such a culling run, the qualifier and/or the selector switch mechanism serve to determine whether each printing device meets certain predetermined standards or qualifications, and through control of the relay R-2, serves to govern the setting of the pins 318D.

Thus, in a culling run the off-on switch 717 is opened so as to render the relay R-2 ineffective with respect to the solenoid SOL-2, thus to prevent printing in such a run. Similarly, a cull control switch 750 is closed, this switch having one movable contact connected by a wire 751 and 752 through an electrically operated cull counter 753 to the terminal block 725. The other movable contact of this switch is connected by a wire 755 to one terminal of the solenoid SOL-5. The other terminal of the solenoid SOL-5 is connected by a wire 756 to the terminal 725.

The stationary contacts of the switch 750 are connected together, and are connected by wires 757 and 758 to one contact of the cull timing switch TS-3, the other contact of which is connected by a wire 759 to the No. 4 contact of the relay R-2. With this arrangement, when a printing device fails to meet the qualifications established so that the relay R-2 is not operated, the contacts 4 and 5 thereof remain engaged, and the cull counting circuit through the counter 753 and the solenoid actuating circuit through the solenoid SOL-5 are completed, and the printing device will thus be discharged into the cull drawer K-1. When a printing device is found to be qualified, so as to cause operation of the relay R-2, the cull circuit will be broken at the contacts 4-5, and hence such printing device will be returned to the collection in the drawer K-2 or K-3.

The control of the relay R-2 by the selector switch 265

As described in the aforesaid Gollwitzer application, Serial No. 58,742, the selector switch 265 is set to different levels by the sensed absence of a tab 65, by the sensed presence of a tab 65, and by the different lengths of sensing pin that may sense such a tab. This functioning is utilized in the present instance to extend circuit in the desired circumstances from the line wire 605 to the terminal block 730, thereby to energize the relay R-2. Thus, as shown in Fig. 38, a wire 770 extends from the terminal 720 to one contact of the timing switch TS-1, and from the other contact of the switch TS-1, a wire 771 extends to a terminal block 772. A wire 773 extends from the block 772 to the stationary contact arms 265A of the selector switch 265.

When the selector switch 265 is set in its lower position, due to the absence of a tab 65 in alignment with a sensing pin, the switch extends circuit from one of the arms 265A to a wire 774 that extends to the left-hand stationary contact of a selector-setting switch 775. When the selector switch 265 is set in its next higher position, circuit is similarly extended by a wire 774P to the right-hand stationary contact of the switch 775. The left-hand contact thus constitutes a skip-tab contact while the right-hand contact constitutes a print-tab contact, and the center stationary contact of the switch 775 may be termed an "off" contact. The movable contact of the switch 775 may be manually engaged with any one of these three contacts, and when it is set for example to the right or print contact it may extend circuit by a wire 777 to the lower right contact of a double-throw, double-pole setting switch 780. An extension 777A of the wire 777 also connects with the upper left stationary contact of the switch 780, so that when this switch is set in its upper position, circuit is extended through the left-hand movable contact and a wire 781 to the terminal block 730. Hence, the closure of the proper circuit by the selector switch 265 results in operation of the relay R-2, with the corresponding operation of the setting solenoid SOL-2, for example, as hereinbefore described.

It should be observed that when the switch 775 is set to its center or off position, the wire 777 is connected through the off contact and a wire 783 to the block 772. Also, a wire 784 extends from the block 772 to the upper right contact of the switch 780, for purposes that will hereinafter appear.

The control of the relay R-2 by the qualifier unit 41

The qualifier unit 41 is arranged, as will hereinafter be described, to complete a circuit between two terminals 800 and 801 when the sensed data representations 60 meet predetermined standards or qualifications, and as shown in Fig. 38 of the drawings, such terminals 800 and 801 may be so connected through the switch 780 and through an off-on switch 805, that control of the circuit to the terminal block 730, and hence to the relay R-2, may be attained under the joint control of the qualifier unit 41 and the selector switch 265, or under control of either. Thus, the terminal 800 is connected by a wire 806 to the upper left contact of the switch 805, while the left movable contact thereof is connected by a wire 807 to the terminal block 730. The terminal 801 is connected by a wire 808 to the lower left contact of the switch 805, and a wire 809 from this contact extends to the right-hand movable contact of the switch 780.

Thus, when the switch 805 is in its upper position, the qualifier unit 41 is in proper operative association with the control means for the relay R-2, and when the switch 780 is in its upper position, either the selector switch 265 or the qualifier unit 41 may serve to operate the relay R-2. Such operation of the selector switch has been described, and with respect to the operation of the qualifier unit 41 it should be noted that the requisite circuit is extended from the timing switch TS-1 through the wires 771 and 784, the wires 809 and 808 to the terminal 801, through the qualifier unit 41 and back to the terminal 800, from which circuit is completed to the terminal block 730 by wires 806 and 807.

When the switch 780 is in its lower position, the selector switch 265 and the qualifier unit 41 are placed in joint control of the relay R-2. Thus the circuit from the timing switch TS-1 must under such circumstances be extended by the selector switch to the wire 777 and through the switch 78 and the wires 809 and 808 to the terminal 801, and then through the qualifier unit 41 and back through the terminal 800 to the terminal block 730.

When the machine is to be operated without the controlling action of either the selector switch 265 or the qualifier unit 41, the switches 775, 780 and 805 are set to their "off" positions, and under such circumstances, the relay R-2 is energized in each cycle by a circuit from the timing switch TS-1, the wire 783, switch 775, wire 777, the switch 780, the wire 809, switch 805 and the wire 807 to the terminal block 730.

The connector sockets on the printing machine

For the purpose of electrically associating the printing machine 40 with the qualifier unit 41, six multiple contact sockets 810-1 to 810-6 are provided on the rear side of the printing machine 40 as shown in Figs. 2 and 37A, and these sockets are allocated to the six seasonal data fields that are provided on the two control cards 61 and 63 of the printing and control devices D. A seventh multiple contact socket 811 is also provided adjacent to the socket 810-6, as shown in Figs. 2 and 37A, and this socket is allocated in part to the data field afforded in the card 62 of the printing and control devices D, and the socket 811 is also utilized to extend connections to the unit 41 from certain circuit elements shown in Fig. 38.

Figure 37:
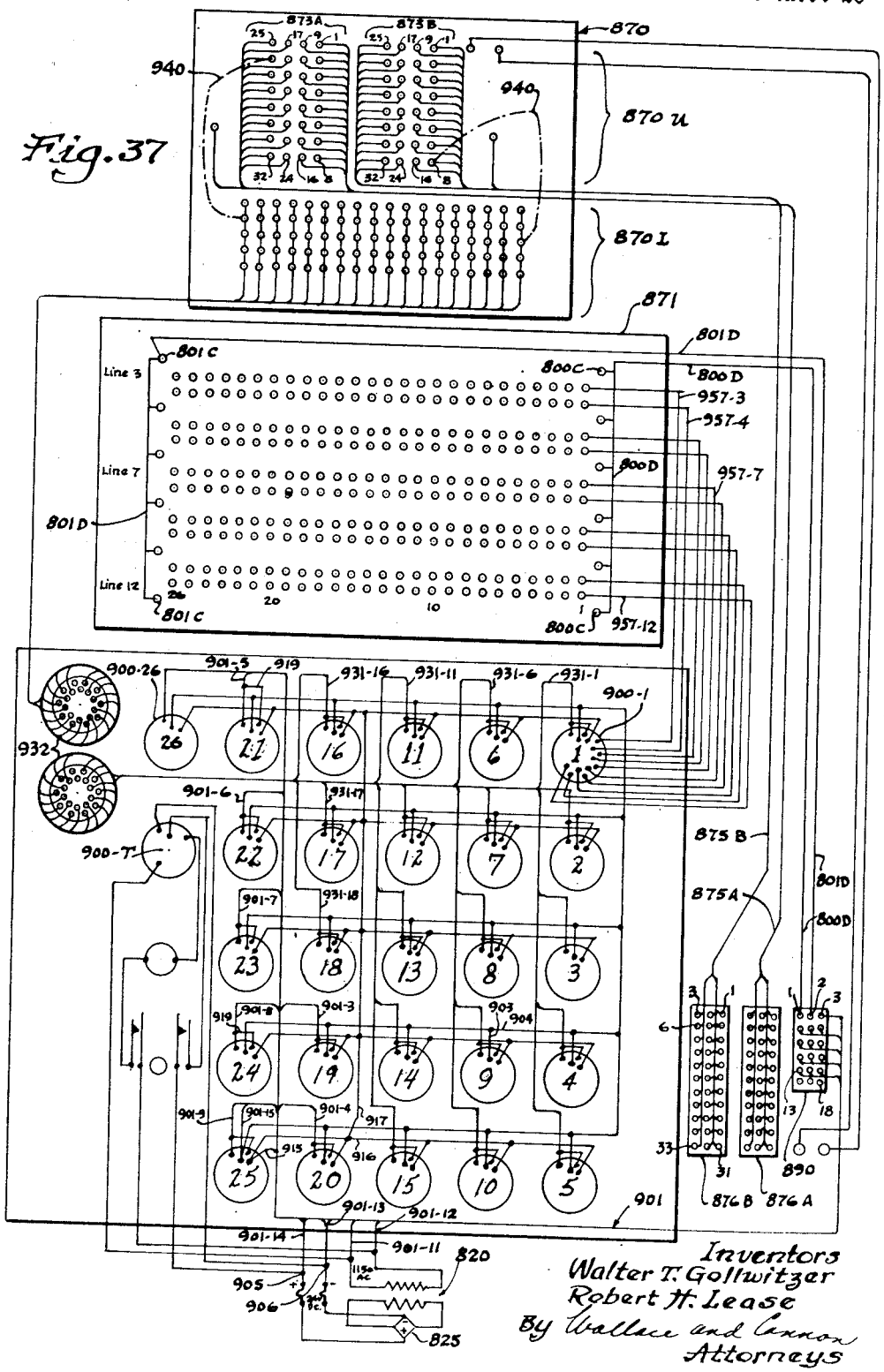
Fig. 37 is a schematic wiring diagram of the selecting or qualifying portion of the machine.

Thus, the socket 811 has eighteen contacts arranged in three vertical rows, and these contacts may be identified by contact numbers shown in Fig. 37A. Contacts 1 and 2 of the socket 811 are connected, respectively, by wires 815 and 816 to the terminal blocks 800 and 801, as shown in Fig. 37A. Contacts 11 and 12 of the plug 811 are used to extend circuit to a transformer 820, Fig. 37, that is afforded in the qualifying unit 41, and to this end the contact 11 is connected by a wire 821 and a wire 822 in series to the right-hand movable contact of the switch 805, as shown in Figs. 37A and 38. The upper right stationary contact of the switch 805 is connected by a wire 823, Fig. 38, to the line wire 607. The other side of the primary circuit for the transformer 820 is extended from the contact 12 of the socket 811 by a wire 824, Fig. 37A, which connects to the line wire 605, as shown in Fig. 38. Thus, the transformer 820 is energized only when the switch 805 is in its upper closed position.

The unit 41, as shown in Fig. 37, includes a rectifier 825 that is energized from the transformer 820, and the socket 811 is also utilized to extend the requisite connections between the rectifier 820, the D. C. timing switch TS-2, and the coils of the relays in the qualifier unit 41. Thus, a ground connection 827, Fig. 38, in the printing machine 40 is connected by a wire 828, Figs. 38 and 37A, to contact 13 in the socket 811. Similarly, the contact 14 of the socket 811 is connected by a wire 829 and a wire 830 to one contact of the D. C. timing switch TS-2, the other contact of the D. C. timing switch TS-2 being connected by a wire 831 and a wire 832 to the contact No. 15 of the socket 811.

In Fig. 37B of the drawings, the six large data fields are identified as fields 850-1 to 850-6 and the small central field is identified as field 851. The field 851 is also shown in Fig. 37A and the eight index positions are, of course, physically defined by the stationary contacts 235, and are identified as index points 1 to 8 numbered vertically downwardly in the column formed by such index points. The contacts 235 at the index points 1 to 8 of the field 851 are connected by individual wires 236, Fig. 10, in a cable 853 to contacts 3 to 10, respectively, of the socket 811, such cable being shown in Fig. 37A.

Similar connections are afforded between the contacts 235 at the several index points of the fields 850-1 to 850-6 and the contacts of the respective sockets 810-1 to 810-6. Thus, as shown in Fig. 37A, the four vertical columns of index points in each field 850-1 to 850-6 are similarly numbered, the left-hand column being numbered upwardly from 1 to 8, the next column being numbered upwardly from 9 to 16, the third column being numbered upwardly from 17 to 24, and the fourth column being numbered upwardly from 25 to 32. Individual conductors afforded in a cable 855-1 extend from the contacts 235 that define the index points of the field 850-1, and these individual conductors are connected to correspondingly numbered contacts of the socket 810-1. Similar cables 855-2 to 855-6 similarly connect the contacts 235 of the fields 850-2 to 850-6 to the contacts of the respective sockets 810-2 to 810-6. In respect to the sockets 810-1 to 810-6, it should be observed that the contacts of each socket are arranged in three vertical columns, and each horizontal line of three contacts is numbered from right to left, and the contacts in successive lines are similarly numbered in order. Hence, the upper line of contacts constitutes contacts 1, 2 and 3, from right to left; the second line of contacts constitutes contacts 4, 5 and 6, from right to left, and by continuing this numbering system the lower line constitutes contacts 31, 32 and 33, from right to left.

*The qualifier unit 41*

The physical structure of the qualifier unit 41 is illustrated in Figs. 1, 2, 42 and 43, wherein it will be evident that such qualifier is afforded by an upstanding cabinet 41C having rearwardly facing doors 41D in its upper portion which may be opened to expose a plug board 870 and a matrix mounting contact panel 871, these elements being best shown in Figs. 42 and 43. The plug board 870 has an upper section 870U which affords two fields 873A and 873B. Each of these two fields contains four vertical columns of individual sockets, there being eight such sockets in each column, and the sockets thus afforded in each field are numbered from 1 to 32. Sockets 1 to 8 are numbered downwardly in the right-hand column of each field, sockets 9 to 16 are numbered downwardly in the next column to the left in each field, sockets 17 to 24 are numbered downwardly in the third column to the left in each field, while sockets 25 to 32 are numbered downwardly in the fourth or left-hand column of each field. The sockets in each field thus correspond in number with the contacts afforded in each of the sockets 810-2 to 810-6 on the rear of the printing machine 40, and means are afforded for connecting each one of the fields 873A and 873B to any one of the aforesaid sockets 810-1 to 810-6, the connection being effected in each instance in such a way that correspondingly numbered contacts in the sockets are electrically connected.

Thus, as shown in Fig. 37 of the drawings, the field 873A has the respective sockets thereof connected by individual conductors afforded in a cable 875A to correspondingly numbered contacts in a multiple contact socket 876A, while a similar cable 875B serves to similarly associate the field 873B with the socket 876B, the sockets 876A and 876B being afforded in an accessible location on the side of the qualifier unit 41 as shown in Fig. 2 of the drawings. It will be noted that the sockets 876A and 876B are arranged to afford, in each instance, three vertical columns of contacts which are numbered from 1 to 33 in the same arrangement as hereinbefore described in respect to the sockets 810-1 to 810-6.

For the purpose of electrically connecting the corresponding contacts of the sockets 876A and 876B with any selected pair of sockets 810-1 to 810-6, a pair of connector cables 880A and 880B are provided, as shown in Fig. 2 of the drawings. The connector cable 880A has a multiple contact connector plug 881A at one end for association with any one of the sockets 810-1 to 810-6, while the cable 880A has a similar multiple contact plug 882A at its other end for association with the socket 876A. Similarly, the cable 880B has plugs 881B and 882B at its opposite ends to afford a similar connection between the sockets, and it is to be pointed out that correspondingly numbered contacts are afforded in the plugs at opposite ends of each of such cables and the conductors of the respective cables serve to connect correspondingly numbered contacts in the plugs at opposite ends thereof.

It will also be observed that another cable 885 is provided with a multiple contact connector plug 886 at one end for association with the socket 811 on the printing machine, and a plug 887 at its other end for association with a multiple contact socket 890 that is afforded on the side of the qualifier unit adjacent to the sockets 876A and 876B.

The qualifier unit 41 also has a relay mounting portion in the lower part of the casing 41C thereof, and within this relay mounting portion, twenty-seven multiple contact relays 900 are mounted, and these relays are identified as 900-1 to 900-26, the other or twenty-seventh relay being identified as 900T. In Fig. 37D of the drawings, a typical base of the relays 900 is illustrated with the several contacts thereof identified by numbers from 1 to 20.

In Fig. 37C, the wiring of the relays 900 is illustrated and it will be noted that each relay embodies an operating coil 900C which is connected between contacts 19 and 20 of the base thereof. For present purposes, but twelve of the relay contacts in each relay are utilized, and hence only such contacts are illustrated in Fig. 37C. It will be noted that six pairs of contacts are utilized, and these contacts are numbered from 1 to 12 and are associated electrically with correspondingly numbered contacts in the relay base, as identified in Fig. 37D. All of these six sets of contacts are normally open, and are arranged to be closed when the relay is operated. Contacts 1 and 2 constitute a pair, and each succeeding pair is afforded in order that the sixth pair of contacts is afforded by the contacts 11 and 12.

In affording an energizing circuit for the several relays 900-1 to 900-26, one end of the field coil 900C, as represented by the contact 20 in the relay base, is connected to the number 15 contact of the socket 890 in the qualifier unit. This connection is afforded in part by a conductor 901-15 that is included in a distributing cable 901 which extends from certain of the contacts of the socket 890. The wire or conductor 901-15 is connected as shown in Fig. 37 to the number 20 contact of the relay 900-25, and the circuit is extended to the number 20 contact of each of the other relays from 900-1 to 900-26 by wires 902 and branches 903 and 904 that extend from the number 20 contact of the relay 900-25.

The relays 900-19 to 900-26 are operatively associated with the field 851 of the sensing head so that when a perforation 60 is sensed in any one of the index positions in this field, an operating circuit will be afforded between the terminals 800 and 801, thereby to cause the timing relay R-2 to be operated. In effecting such an operative association, the cable 901 has conductors 901-3 to 901-10 extended from the correspondingly numbered contacts of the socket 890, and these conductors 901-3 to 901-10 are extended through the cable 901 and are connected, respectively, to the number 19 contacts in the sockets of the relays 900–19 to 900–26, as shown in Fig. 37 of the drawings.

It will be recalled that the number 15 contact of the socket 890 is connected through the intermediate cable and the socket 811 through the wire 832 and the wire 831 to one contact of the timing switch TS–2, while the other side of this timing switch TS–2 is connected by wires 830 and 829 back to the number 14 contact of the socket 811. This circuit, of course, extends through the connecting cable to the number 14 contact of the socket 890, and a conductor 901–14 in the cable 901 is connected to a terminal 905 which constitutes the positive terminal of the D. C. source 825. Thus when the timing switch TS–2 is closed, the circuit is extended from the positive terminal of the D. C. source 825 to the number 20 contact of each of the relays 900–1 to 900–26, and the circuit to any one of these relays may, of course, be completed at this time in the event that the other side of the circuit to the number 19 contact of such relay has been previously completed as by the closure of the related switch 238 at sensing position. Assuming, for example, that a perforation 60 has been detected at a position in the control card 62 that has been allocated to the relay 900–19, a circuit will in such an instance be completed from the negative terminal 906 of the D. C. source through a conductor 901–13, through the contacts 13 of the sockets 890 and 811, and through the wires 828 and 827 to the common ground that is afforded at the sensing station by the plate 226 and all of the plungers 238 that are slidable therein. The plunger 238 that has been pressed downwardly due to the presence of a control perforation at the index point allocated to the relay 900–19 will extend this circuit to the related stationary contact 235 and this circuit will then be extended to the qualifier unit 41, as above described.

In order to afford a holding circuit for each relay 900, under control of the timing switch TS–2, a wire 915 is extended from the D. C. negative terminal 906 to the No. 2 contact of the relay 900–25, and from this contact, a wire 916 and branches 917 and 918 extend to the No. 2 contacts of all of the other relays 900. The other side of the holding circuit through the contacts 1 and 2 of the respective relays 900 is afforded in each instance by connecting the No. 1 contact thereof by a wire 919 to the No. 19 contact.

The relays 900–19 to 900–26 are arranged to be energized respectively by the sensing of a control perforation 60 at the related index point of the control card 62, and when one of these relays is thus operated, it may be rendered effective, as will hereinafter be described, to close the circuit between the terminal blocks 800 and 801, thereby to cause operation of the relay R–2.

The relays 900–1 to 900–18 are arranged to be controlled by connections extended from the lower plug board section 870L. In this lower section 870L, eighteen vertical columns of sockets 930–1 to 930–18 are provided, and each column contains five such sockets. All of the sockets 930–1 are connected by a wire 931–1 which, as shown in Fig. 37, is extended through a connector plug and socket 932 to the No. 19 contact of the relay 900–1. Similar wires 931–2 to 931–18 are similarly extended from the sockets 930–2 to 930–18 to the No. 19 contacts of the relays 900–2 to 900–18, respectively.

In setting up the qualifier 41, any one of the relays 900–1 to 900–18 may be caused to be operated in response to closure of circuit to any one or more of the plugs in the fields 873A or 873B, and this is accomplished by establishing connections by plug connectors 940 between the selected sockets of the fields 873A and 873B and selected of the sockets 930–1 to 930–18.

Such settably selective operation of the relays 900–1 to 900–18 and the selective operations of the relays 900–19 to 900–26 are utilized through a replaceable matrix 950 to govern the completion of the energizing circuit for the relay R–2 across the terminals 900 and 801.

*The matrix card 950*

The matrix card 950 is made from electrically non-conductive material such as cardboard, and is of rectangular form as shown in Fig. 35. The card 950 is adapted to be mounted, face down, on the mounting plate 871, Figs. 37, 42 and 43, and in order to accurately locate the card on the plate 871, three non-symmetrically located positioning pins 951 are provided on the plate 871, and complemental perforations 952 are afforded in the card 950. In this regard, it should be observed that the plate 871 is shown in Fig. 37 in bottom plan. After the card 950 is in position, it is clamped in place by a removable clamp plate 953 and associated clamping devices 954, and by this procedure, the card 950 is held in engagement with a plurality of spring plunger contacts 955 which are disposed so as to extend yieldingly through the upper face of the plate 871 in a predetermined pattern as will be described. In mounting such spring contacts 955, a pair of spaced guide plates 956 and 957 are mounted in spaced relation to each other beneath or behind the plate 871, and all three of these plates are of insulating material so that the several contacts 955 may be slidably mounted therein in an insulated relation, as will be evident in Fig. 43. Between the plates 871 and 956, each plunger 955 has a spring 955S disposed thereabout, thereby to actuate the plungers to slightly projecting positions. Adjacent to the right-hand end of the plate 871, Fig. 37, a column of six spring plunger contacts 800C are mounted, these contacts being similar to the contacts 955, and these six contacts 800C are connected by a wire 800D to the contact 1 of the socket 890. Similarly, six spring contacts 801C are provided along the left-hand edge, Fig. 37, of the plate 871, and these six contacts 801C are connected by a wire 801D to the No. 2 contact of the socket 890. Thus the contacts 800C and 801C are electrically associated with the terminals 800 and 801, respectively.

The contacts 955 are arranged, as shown in Fig. 37, in twenty-six vertical columns 1–26 allocated, respectively, to the relays 900–1 to 900–26, and in each such column, five pairs of contacts 955 are afforded. These five pairs of contacts are so arranged as to afford ten horizontal lines identified as lines 3 to 12 in Fig. 37, and these lines of contacts are in effect allocated to the similarly numbered contacts 3 to 12 of the relays 900. Thus, the contacts 3 to 12 of the relay 900–1 are connected by wires 957–3 to 957–12 to the contacts 955 located in column 1 and disposed, respectively, in lines 3 to 12. Similar connections are afforded from the contacts 3–12 of the relay 900–2 to the contacts 955 in similarly numbered lines in column 2. This same system of connection is continued until all of the contacts of all the relays 900–1 to 900–26 have been associated with the contacts 955 in the related columns and lines.

The matrix card 950 is arranged for cooperation with selected contacts 955, 800C and 801C, and for this purpose the card has printed indicia thereon defining index points disposed in complemental relation to such contacts of the mounting plate 871. Thus the card has six index points 800T along the right end edge in positions complemental to the contacts 800C, while six index points 801T are afforded along the left end edge in positions complemental to the locations of the contacts 801C. In addition, ten lines of twenty-six index points 955P are afforded on the card 950 in positions complemental to the contacts 955. Thus these index points 955P are disposed in lines identified as lines 3 to 12, so as to correspond with the identification of the lines of contacts 955, and these index points are disposed in twenty-six columns. The columns are numbered from right to left as columns 1 to 18, and the remaining eight columns are identified by letters which correspond with the letters used in the related index points of the control card 62.

The index points 955P on the card 950 serve in association with the points 800T and 801T to afford a guide means for simplifying the application of a pattern or network of electrically conductive paths whereby the effect of operation of the several relays 900–1 to 900–26 may be governed and controlled so as to enable the qualification of each printing device to be judged or determined upon the basis of a large number of factors or conditions. Such electrically conductive paths are under the present invention afforded by painted lines 960, formed from a conductive metal paint on the face of the matrix card that is to be placed opposite the contacts 955, 800C and 801C. While the pattern employed in such conductive lines 960 must vary in accordance with the selection or qualifying problem that is presented, it may be pointed out that such pattern is in each instance arranged to produce or complete a circuit between the contacts 800C and 801C when certain relays 900 are operated singly, or in predetermined combinations.

In connection with the operation of the relays 900, it should be observed that the sensing switches 238—235 are closed, as shown in the timing chart of Fig. 39, prior to the completion of the relay-energizing circuit by the timing switch TS–2, and that the holding circuit afforded by the relay contacts 1 and 2 then maintains the relay 900 energized while the related sensing switch 238—235 opens prior to the final opening of the relay energizing circuit by the timing switch TS–2.

*The solution of selecting or qualifying problems*

The qualifier unit 41 of the present invention is so constructed and arranged that the operation of the machine may be controlled by a single set of qualifying factors or by a plurality of sets of qualifying factors, each such set of factors being considered for present purposes as an individual qualifying problem, and the set-up of the machine to attain this result is accomplished by establishing plug board connections between the plug board sections 870U and 870L and by preparing a related matrix card 950 which is then put in position in the qualifier. As an illustration of the way in which the plug connections are determined and the design of the matrix card is determined, a table constituting a typical set of selection or qualifying problems has been set forth in Fig. 36A of the drawings. In Fig. 36A, eleven selection problems or sets of qualifying conditions have been set forth in the eleven lines of the table that form this figure, and it will be noted that in each selection problem, factors that appear in the control card 62 and in either one or two of the control fields of the cards 61 and 63 may be considered. The factors that are to be sensed from control card 62 are shown in the first column of the table in Fig. 36A, the factors that are to be sensed from the field of the printing device that relates to the preceding season are shown in the second column, while the factors that are to be sensed from the second preceding season of the printing and control device are shown in the third column.

Thus, as to the first line of the table in Fig. 36A, a problem identified as problem No. 1 is shown, and this problem requires that the customer must have had at least two orders as shown on the control card 62, and in the preceding season must have had orders totaling ten dollars or more. In problem No. 1 no requirements are set up as to the second preceding season.

In problem No. 2 it will be observed that a different set of conditions has been set up, and while in the first preceding season the total dollar value requirements have been set somewhat lower than in problem No. 1, the factors to be sensed from control card 62 have been set somewhat higher in that the customer must have had two orders and must have been indicated as being a previously preferred customer. Moreover, in problem No. 2 it is required that the customer must have had at least one order in the second preceding season.

*The plug board connections*

It will thus be clear that, as shown in Fig. 36A of the drawings, a wide variety of different sets of controlling factors may be established, and when all of these sets of controlling factors have been established, the first step in the set-up of the machine is to establish plug board connections 940 between the fields 873B and 873A of the upper plug board section 870U to appropriate columns of sockets 930 in the lower plug board section 870L. In this procedure it is necessary to analyze the various requirements that are set up in the group of problems as shown in Fig. 36A, and it might be pointed out that the two seasons are considered separately in this procedure and appropriate plug connections 840 are established independently from the fields 873 and 873B.

Figure 36B:
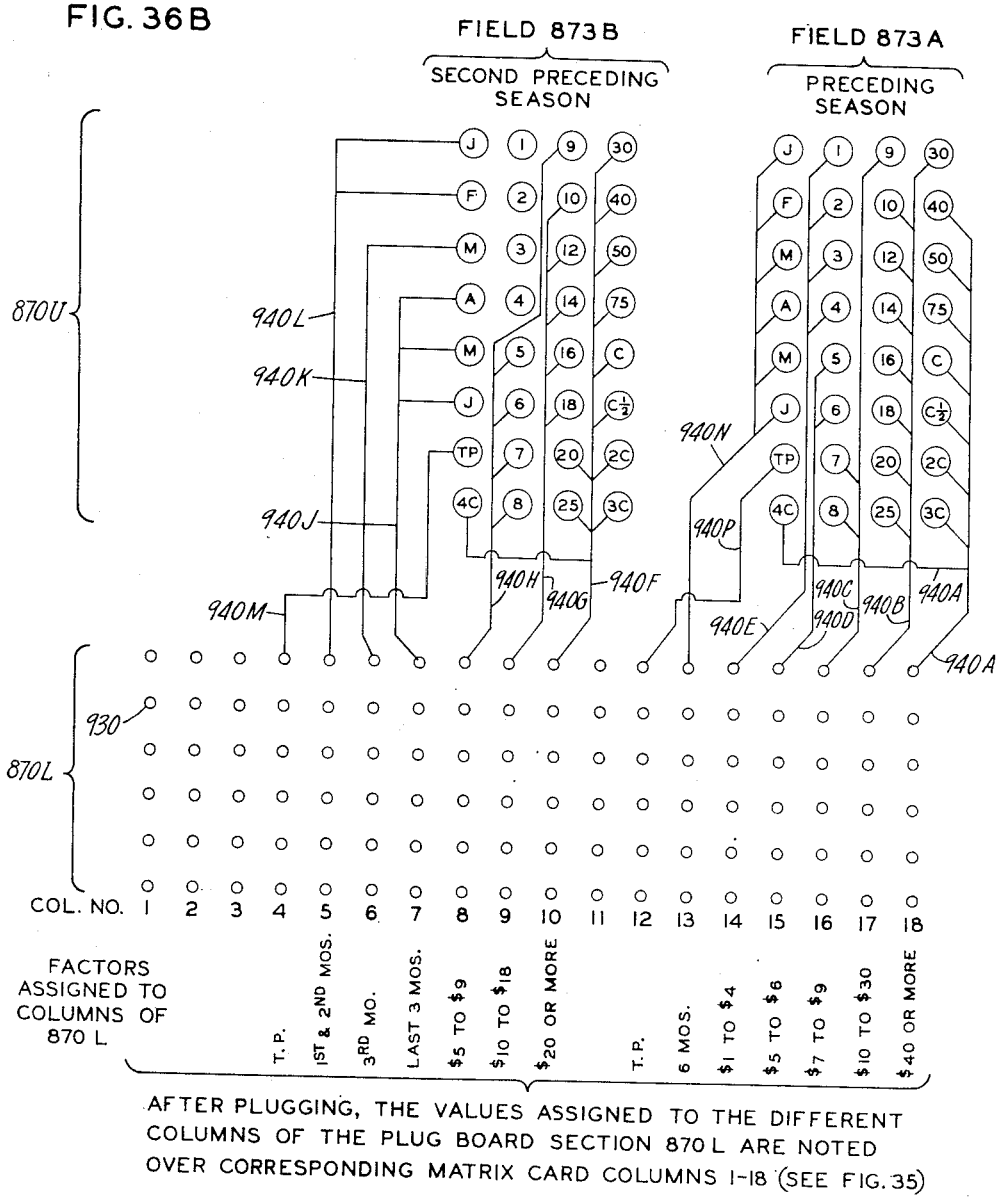
Fig. 36B is a view showing the plug board connections required in connection with the problem of Fig. 36A.

In facilitating the analysis of the requirements for the plug connections, it has been found to be advantageous to first review the ranges of dollar values that have been established for a particular season, and to set individual plug board connections in accordance with each of these different ranges. Thus, it is first determined that in the problem at hand that in the preceding season the highest dollar value that is to be required is forty dollars, and, therefore, as shown in Fig. 36B, a plug connector 940A is extended from any selected one of the columns in the field 870L to each contact in the field 873A that has a dollar value of forty dollars or more, so that this connector 940A has a relatively large number of branches that have been indicated by the same reference character. In the present instance, this connector 940A has been extended to column 18, and for illustrative purposes, the controlling factor that has thus been assigned to column 18 has been indicated in Fig. 36B below the column. In practice, this notation may, of course, be made directly on the matrix card 950 that is to be prepared, as shown at 950N in Fig. 35 of the drawings.

After the highest dollar value requirement has thus been established, the next lower dollar value is determined, and in the present instance this is ten dollars or more as shown in problem No. 1. Hence, for the next plug board connection it is desirable to establish a common connection for all dollar values falling between ten dollars and the next increment of dollar value below forty, thereby to avoid overlapping of values. Thus, in the present instance, the next plug board connection must be from all contacts in the field 873A between and including from ten to thirty dollars, and this is established by a connector 940B which has appropriate branches to the required contacts, as shown in Fig. 36B. The connector 940B is in the present instance extended to column 17 of the lower plug board section 870L, and an appropriate notation is illustrated in Fig. 36B beneath column No. 17 and is actually made directly over column 17 on the matrix cord 950, as shown in Fig. 35. In further consideration of the dollar value groupings, successively lower dollar value groups are determined by examination of the problem chart of Fig. 36A, and in the present instance, a connector 940C is extended from column 16 of the plug board 870L to contacts representative of seven, eight and nine dollars; a connector 940D is extended from contacts in the field 873A that are representative of five and six dollars, while a connector 940E is extended to column 14 from contacts in this field representative of dollar values from one to four dollars.

The same procedure is followed in respect to the dollar value aspects of the second preceding season, and, as shown in Fig. 36B, a connector 940F is extended from column No. 10 to all of the contacts in field 873B that are representative of twenty dollars or more; a connector 940G is extended from column 9 to all of the contacts in field 873B that are representative of values between and including ten to eighteen dollars; while a connector 940H is extended from column No. 8 to contacts in this field that are representative of dollar values from and including five to nine dollars.

After the dollar value factors or requirements have thus been established to different columns of the lower plug board section 870L, the different requirements as to orders that are set up in the two different seasons are analyzed, and the different groupings of such order requirements are determined. Thus, in the second preceding season it will be noted that in problem No. 4, we must be able to determine whether or not a customer has had an order in the last four months, or in the last three months, as shown in problem No. 7 of Fig. 36A, or an order in any month of the season as shown by problems Nos. 2 and 10. In affording a solution for problem No. 7, a connector 940J is extended from column 7 to the contacts of the field 873B that represent the last three months of the season; in affording a solution for problem No. 4, the connector 940J is utilized, and in addition a separate connector 940K is afforded from the contact that represents the third month of the season to column No. 6. These connectors 940J and 940K also are utilized in affording solutions for problems Nos. 2 and 10, and in these last mentioned problems, another connector 940L is required, and this is extended from column No. 5 to the contacts in field 870B that are representative of the first two months of the season.

In addition to the foregoing, it will be noted that problem No. 10 has as one of its factors a time payment or TP indication, and for taking care of this situation a connector 940M is extended from column No. 4 to the contact TP in field 873B that constitutes a time payment indication.

The same general procedure is followed in connection with the requirements that have been set concerning purchases or orders in the preceding season, and it will be noted that the only problem set forth in Fig. 35A that includes these considerations in the preceding season is problem No. 9. This problem requires an order in the preceding season, and a connector 940N is, therefore, extended from contacts representative of all of the months of the season in Fig. 873A to column No. 13 of the lower field 870L. This same problem also requires a time payment indication, and a connector 940P is therefore extended from the time payment contact TP of the field 873A to column No. 12.

The foregoing plug connections that are shown in Fig. 36B serve to complete this portion of the solution of the various problems set forth in Fig. 36A, and the values or factors that have been assigned to the different columns in the lower plug board field 870L are, of course, noted along the upper edge of the matrix card 950 as the different plug board connections are established. With the plug connections thus established in accordance with the factors included in the several problems set forth in the problem chart of Fig. 36A, the matrix card 950 may be completed, as will now be described.

*Making the matrix card 950*

It will be observed on the matrix card 950 that there are, in effect, five individual horizontal areas in which circuits may be extended across the matrix card between the index points 800T and 801T, the first of these areas being afforded by lines 3 and 4 of the index points 955P, the second by lines 5 and 6, the third by lines 7 and 8, the fourth by lines 9 and 10, and the fifth by lines 11 and 12. As presented in Fig. 36A, however, it will be noted that eleven individual problems must be represented on the matrix card 950, and to enable this to be done, it is, of course, necessary to group the eleven problems so that they may be represented in the five circuit areas afforded on the card 950.

In grouping the problems from the chart, such as that shown in Fig. 36A, problems are selected for each such group so that the problems have one or more controlling factors in common and one or more other factors that are dissimilar in character and which do not overlap as to time or dollar value.

Thus, with respect to the problems that are presented in the chart of Fig. 36A, it has been determined that problems 1 and 3 may be grouped, and these two problems have been presented on the matrix card of Fig. 35 in the area afforded along lines 3 and 4 of the index points 955. Similarly, problems 2 and 6 of Fig. 36A have been grouped and have been applied to the matrix card 950 in the area afforded by lines 4 and 5. Problems 7 and 8 have also been grouped, and these have been applied to the matrix card in the area afforded by lines 7 and 8. Problems 4 and 9 have also been grouped and have been applied to the matrix card 950 in the area afforded by lines 9 and 10. In the area afforded by lines 11 and 12 of the matrix card 950, problems 5, 10 and 11 have been grouped and applied to the card.

Considering first the grouping of problems 1 and 3 and the application of appropriate circuits to the matrix card 950, it will be observed that both of these problems require that the customer have an indication that he has had two orders. In setting up this requirement on the matrix card 950, as shown in Fig. 35, a conductor 960A is painted onto the matrix card 950 so as to extend from the upper index point 801T to the index point that falls in line 3 below or in the two-order column. This common factor of problems 1 and 3 is then applied to the dissimilar or different requirements of these two problems, and a conductor 960B is painted onto the card so as to extend from the index point in line 4 of the two-order column to the index point in line 4 of column 18 of the card. It will be observed in this connection that this line is so extended that it does not cross any of the intermediate index points 950P of the card. The conductor 960B is extended at 960C to the index points in line 4 of columns 16 and 17, and in line 3 of the matrix card 950, a conductor 960D is extended between the index points in columns 17 and 18. An extension 960E of the conductor 960D connects the conductor 960D with the upper index point 800T. The conductors thus far described afford a solution of problem No. 1 of Fig. 36A, for it will be observed that if a printing and control device has been sensed that has a perforation 60 in the card 62 which indicates that the customer has had two orders, the relay 900–22 will have been operated, and this serves through the No. 3 and 4 contacts of such relay and the associated spring contacts 955, to connect the index points in lines 3 and 4 of the two-order column of the matrix 950. Similarly, the sensing of any dollar value from ten to thirty dollars in the preceding season will, through the plug board connections above described, cause the relay 900–17 to be energized, which will complete the circuit through the wires or conductors 960B and 960E to the upper index point 800T. This, of course, will extend circuit between the terminals 800 and 801, thereby to cause the timing relay R–2 to be energized.

In the area afforded by lines 3 and 4 of the index points on the matrix card 950, problem No. 3 of Fig. 36A is also shown. Thus a conductor 960F is extended from the index point in line 3 of column 16 to the index point in line 3 of column 10, and the conductor 960F also extends to the index points in columns 8 and 9 of line 3. Similarly, a conductor 960G is provided which extends between the index points in columns 8, 9 and 10 of line 4, and which also extends to the second index point 800T. It will be observed that the circuits afforded by the conductors 960F and 960G are independent of the circuit afforded by the conductors 960D and 960E, and hence circuit may be extended in accordance with problem No. 3 only if the dissimilar factors that are included in problem No. 3 are satisfied.

Thus, when a two-order indication is sensed, circuit will be closed between the index points in the two-order column of lines 3 and 4, and will be extended through the conductors 960B and 960C to the index point in line 4 of column 16, which column has been assigned a money value range of from seven to nine dollars. If the particular printing and control device contains an indication of dollar value within this range, the relay 900–16 will be energized, due to the plug board connections that have been established as hereinbefore described, and circuit will thus be extended through the conductor 960F to the index points in columns 8, 9 and 10 of line 3. These last mentioned three columns cover all of the dollar values down to and including five dollars in the second preceding season, and hence if any dollar value within this range is sensed in the printing and control device, one of the relays 900–8, 900–9 or 900–10 will be energized so as to thereby establish a connection between the conductors 960F and 960G, and this completes the circuit between the upper index point 801T and the second index point 800T. This, of course, completes the circuit between the two terminals 800 and 801, thereby to cause operation of the timing relay R–2.

As shown in Fig. 35 of the drawings, the same system above described is utilized in providing additional circuits on the matrix card 950 to satisfy the other problems set forth in Fig. 36A of the drawings.

*"Absent-hole" selection*

As pointed out hereinabove, the present machine may also be used for attaining control of the operative mechanism of the machine in response to the absence of a control perforation 60 in any one or more positions on the printing and control devices, and to enable this to be accomplished, it is merely necessary to substitute a different relay 900 in the related portion of the qualifier unit 41. Thus, as shown in Fig. 37E of the drawings, a relay 900S may be substituted in the appropriate location in the qualifier 41, and, as shown in Fig. 37E, the relay 900S has normally open contacts 1 and 2 that are connected in the same way as in the relays 900 heretofore described. In the relay 900S, however, all of the other pairs of contacts are normally closed as shown in Fig. 37E and hence, where such a relay 900S is utilized, the related sensing switch 238—235 must sense a control perforation if the contacts 3 to 12 of the relay 900S are to be opened. Thus, when there is no control perforation 60 in the related position on the printing and control device D, the relay 900S will not be operated, and hence the primary contacts thereof will remain closed and will extend circuit to the appropriate index points 955 of the matrix card.

Through such an arrangement many advantageous uses of the machine may be attained. For example, where a mail order company has sent a catalogue to a customer, and has indicated this fact by shifting of a particular one of the tabs 66, the company may at some predetermined later date readily and easily determine which customers have not responded with an order to the catalogue that has been mailed to them. Thus, in such an instance, the machine would be set up to be rsponsive to two conditions or factors, the first of which would be the shifted tab 66 which would indicate that a catalogue had been sent to a particular customer, and the second of which would be the absence of perforations in the index points allocated to the months between the mailing of the catalogue and the time when the follow-up mailing is being prepared. Under such circumstances, the machine would be effective to detect that the customer to whom a catalogue had been sent had not responded with an order in the time that has elapsed since the mailing. This would cause the machine to print a mailing slip for this customer which could then be used in the follow-up mailing that is to be made.

Change of qualifications during a run

With the qualifier 41 it has been found that the machine is readily and easily adaptable to changing conditions or controlling factors that may become apparent in the course of a run of the machine. For example, when the original specifications are set up in a table such as that shown in Fig. 36A, there must, of course, be many assumptions as to what percentage of the printing devices will eventually be qualified under the governing factors that are thus set up, and it is customary with machines of the present construction to carefully watch the percentage of qualified printing devices as a run proceeds. By this procedure it may become apparent early in the course of the run of a machine that there will be an incorrect or unsatisfactory percentage of printing devices that qualify under the conditions that have been set, and it may then become desirable to modify the qualifying factors in such a way as to bring the percentage of qualified printing devices within the proper or desirable range. This may readily be accomplished with the present qualifier merely through readily performed alterations in the plug connections between the upper plug board section 870U and the lower plug board section 870L. Thus, for example, if it appears desirable to raise the money value in problem 1 of the table of qualifications shown in Fig. 36A, this may readily be accomplished by removing the portions of the connector 940G that are inserted in the plugs relating to the ten and twelve dollar money values. It will be apparent, of course, that this same procedure may readily be employed in what may be termed a reverse manner to lower the qualifications that are established by any particular problem, as for example, by adding connections to lower money value sockets in the money range. This may be done without the necessity for any modification in the matrix 950.

Conclusion

From the foregoing description, it will be apparent that the present invention represents a marked improvement in printing machines of the kind through which individual printing and control devices are passed one by one to printing position. It will be evident that under the present invention the printing and control devices may carry a relatively large number of data representations, and that these data representations may be utilized singly or in relatively complex combinations to control and govern the operation of the impression means as well as other operative mechanisms included in or associated with the printing machine. It will also be evident under the present invention, that the data representations carried on the printing and control devices may take different forms and that despite such differences in the form of the data representations, such different types of data representations may be effectually utilized in attaining the desired control of the machine. More specifically, it will be evident that under the present invention, data representing perforations and index tabs may be used to attain control of the machine either singly or jointly, and that this control may be made responsive to the presence or absence of various combinations of control data perforations.

It will also be evident that the present invention enables the machine to be operated under different types or systems of selection, and that the data representing perforations may be utilized either for selection in response to the presence of perforations in particular locations on the printing devices or for selection in response to the absence of perforations at selected positions.

It will also be evident that under the present invention, an extremely effective and flexible qualifier unit has been afforded which may readily be set up in accordance with qualifying problems that are presented and this qualifying unit is of such a character that it utilizes a small and relatively simple control matrix which may be preserved and readily stored for use where the same qualifying conditions are presented.

Under the present invention, the results of the selection or qualifying action of the qualifier unit may be preserved through the recording of the results of such qualifying action upon the printing devices, and more specifically, it will be apparent that this recording of the results of the qualifying action may be made either by shifting of tabs on printing devices or through the formation of a control perforation in a particular location thereon.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. In a printing machine of the kind through which printing and control devices, each adapted to have control data representations physically represented thereon at one or more positions, are adapted to be passed one by one from a supply magazine to and through a sensing station and a plurality of subsequent stations in the machine, sensing means at said sensing station operable to sense the physically represented control data on each printing and control device when it is in said sensing station, an impression mechanism at one of said subsequent stations operable on such a printing and control device to make a printed impression therefrom, governing means for effecting a control operation and operatively connected to said sensing means and governed thereby, in response to sensing of control data representations at selected positions on a particular printing and control device at sensing station, to effect operation of said impression mechanism on such particular printing and control device when such particular device reaches said one of said subsequent stations, and record producing means at another of said subsequent stations and controlled by said governing means, in response to sensing of control data representations at selected positions on a particular printing and control device at sensing station, to produce a control data representation at a predetermined position on such particular printing and control device when it reaches said last mentioned station.

2. In a printing machine having a printing device feeding means and a succession of stations including a magazine station, a sensing station and a recording station to which printing and control devices, each embodying physically represented control data representations at any one or more of a plurality of positions thereon, may be advanced in a step by step manner by such printing device feeding means, sensing means at said sensing station for sensing such physically represented control data representations on each printing and control device as such control device is disposed at said sensing station, an impression mechanism located at another one of said stations operable on such a printing and control device to make a printed impression therefrom, recording means at said recording station for making a record at a predetermined position on a printing and control device, governing means controlled by said sensing means in accordance with the physically represented control data representations sensed by said sensing means, and storage means set up by said governing means and effective to cause operation of said operative mechanism and said recording means when a printing device reaches the respective stations where said impression mechanism and said recording means are located.

3. In a printing machine having a printing device feeding means and a succession of stations including a magazine station, a sensing station and a punching station to which printing and control devices, each embodying physically represented control data representations at any one or more of a plurality of positions thereon, may be advanced in a step by step manner by such printing device feeding means, sensing means at said sensing station for sensing such control data representations on each printing and control device as such control device is disposed at said sensing station, an impression mechanism located at another one of said stations operable on such a printing and control device to make a printed impression therefrom, punching means at said punching station for making a data representing perforation at a predetermined position on a printing and control device, governing means controlled by said sensing means in accordance with the control data representations sensed by said sensing means, and storage means set up by said governing means and effective to control and cause operation of said impression mechanism and said punching means when a printing device reaches the respective stations where said impression mechanism and said punching means are located.

4. In a printing machine having a printing device feeding means and a succession of stations including a magazine station, a sensing station and a punching station to which printing and control devices, each embodying physically represented control data representations at any one or more of a plurality of positions thereon, may be advanced in a step by step manner by such printing device feeding means, sensing means at said sensing station for sensing such control data representations on each printing and control device as such control device is disposed at said sensing station, an impression mechanism located at another one of said stations operable on such a printing and control device to make a printed impression therefrom, punching means at said punching station for making a data representing perforation at a predetermined position on a printing and control device, governing means controlled by said sensing means in accordance with the control data representations sensed by said sensing means, storage means set up by said governing means and effective to control and cause operation of said impression mechanism when a printing device reaches the respective station where said impression mechanism is located, and an operating means for said punching means arranged for operation by said storage means when such a printing device reaches said recording station.

5. In a printing machine having a printing device feeding means and a succession of stations including a magazine station, a sensing station, an impression station, and a tab-shifting station to which printing and control devices, each embodying physically represented control data at any one or more of a plurality of positions thereon and each having a shiftably mounted tab, may be advanced in a step by step manner by such printing device feeding means, sensing means at said sensing station for sensing such physically represented control data on each printing and control device as such control device is disposed at said sensing station, an impression mechanism located at said impression station operable upon such a printing device to produce a printed impression therefrom, tab shifting means at said tab shifting station for shifting the tab on a printing and control device, governing means controlled by said sensing means in accordance with the physically represented control data sensed by said sensing means, and storage means set up by said governing means and effective to control said impression mechanism and said tab shifting means when a printing device reaches the respective stations where said impression mechanism and said tab shifting means are located.

6. In a printing machine of the kind through which printing and control devices, each adapted to have control data physically represented thereon at one or more positions and at least certain of such data being adapted to be represented by a shiftably mounted tab carried on each such device, are adapted to be passed one by one from a supply magazine to and through a sensing station, an impression station and a tab shifting station in the machine, sensing means at said sensing station operable to sense the physically represented control data on each printing and control device when it is in said sensing station, an impression mechanism at said impression station operable upon such a printing and control device to produce a printed impression therefrom, governing means for effecting a control operation and operatively connected to said sensing means and governed thereby, in response to sensing of control data representations on a particular printing and control device at sensing station, to effect operation of said impression mechanism when such particular printing and control device reaches said impression station, another of said subsequent stations constituting a recording station, and tab shifting means disposed at said tab shifting station and controlled by said governing means to shift the shiftably mounted tab on such particular printing and control device when it reaches said tab-shifting station.

7. In a printing machine of the kind through which printing and control devices, each adapted to have control data physically represented thereon at one or more positions and at least in part by a shiftably mounted tab carried on each such device, are adapted to be passed one by one from a supply magazine to and through a sensing station, an impression station and a tab-shifting station in the machine, sensing means at said sensing station operable to sense the physically represented control data on each printing and control device when it is in said sensing station, an impression mechanism at said impression station operable upon such a printing and control device to produce a printed impression therefrom, governing means for effecting a control operation and operatively connected to said sensing means and governed thereby, in response to sensing of control data representations at selected positions on a particular printing and control device at sensing station, to effect operation of said impression mechanism when such particular printing and control device reaches said impression station, a normally ineffective tab shifting means at said tab shifting station, means operative to actuate said tab shifting means through an idle cycle in each machine cycle, and means controlled by said governing means to render said tab shifting means effective on the shiftable tab of such particular printing and control device when it reaches said tab shifting station.

8. In a printing machine of the kind through which printing and control devices, each adapted to have control data physically represented thereon in a plurality of multi-position data fields, are adapted to be passed one by one from a supply magazine to and through a sensing station and a plurality of subsequent stations in the machine, sensing means at said sensing station operable to sense the physically represented control data in all of the fields on each printing and control device when it is in said said sensing station, an impression mechanism at one of said subsequent stations operable upon such a printing and control device to produce a printed impression therefrom, a qualifier unit comprising a matrix-mounting panel having matrix-positioning means thereon, a plurality of pairs of contacts on said panel for engagement with a matrix, a plurality of relays allocated one to each of said pairs of contacts and each of said relays having a pair of relay contacts connected respectively to the pair of contacts to which such relay is allocated, each of said relays having an energizing coil, a plug board having an output section having a plurality of output sockets allocated to and electrically connected to the energizing coils of the respective relays, said plug board having an input section having a plurality of input sockets adapted for selective plug connection to said output sockets, and means for electrically associating said input sockets with the sensing means that sense any selected one of said data fields, and means connected to said matrix panel and operable under control of said qualifier unit to effect operation of said impression mechanism when such particular printing and control device reaches said one of said subsequent stations.

9. In a printing machine of the kind through which printing and control devices, each adapted to have control data physically represented thereon in a plurality of multi-position data fields, are adapted to be passed one by one from a supply magazine to and through a sensing station and a plurality of subsequent stations in the machine, sensing means at said sensing station operable to sense the physically represented control data in all of the fields on each printing and control device when it is in said sensing station, an impression mechanism at one of said subsequent stations operable upon such a printing and control device to produce a printed impression therefrom, a qualifier unit comprising a matrix-mounting panel having matrix-positioning means thereon, a plurality of pairs of contacts on said panel for engagement with a matrix, a plurality of relays allocated one to each of said pairs of contacts and each of said relays having a pair of relay contacts connected respectively to the pair of contacts of which such relay is allocated, each of said relays having an energizing coil and additional contacts for affording a holding circuit for said coil, a plug board having an output section having a plurality of output sockets allocated to and electrically connected to the energizing coils of the respective relays, said plug board having an input section having a plurality of input sockets adapted for selective plug connection to said output sockets, a timing switch in said machine arranged for closure after closure of said sensing switches, and means including said timing switch for electrically associating said input sockets with the sensing means that sense any selected one of said data fields, electrical circuits connected to said matrix panel and operable under control of said qualifier unit to effect operation of said impression mechanism when such particular printing and control device reaches said one of said subsequent stations.

10. In a printing machine of the kind through which printing and control devices, each adapted to have control data physically represented thereon in a plurality of multi-position data fields, are adapted to be passed one by one from a supply magazine to and through a sensing station and a plurality of subsequent stations in the machine, sensing means at said sensing station operable to sense the physically represented control data in all of the fields on each printing and control device when it is in said sensing station, an impression mechanism at one of said subsequent stations operable upon such a printing and control device to produce a printed impression therefrom, a qualifier unit comprising a matrix-mounting panel having matrix-positioning means thereon, a plurality of pairs of contacts on said panel for engagement with a matrix, a plurality of relays allocated one to each of said pairs of contacts and each of said relays having a pair of relay contacts connected respectively to the pair of contacts to which such relay is allocated, each of said relays having an energizing coil, means for selectively associating the coils of each of said relays with any of the sensing means at said sensing station, and means connected to said matrix panel and operable under control of said qualifier unit to effect operation of said impression mechanism when such particular printing and control device reaches said one of said subsequent stations.

11. In a printing machine of the kind through which printing and control devices, each adapted to have control data physically represented thereon in at least one data field, are adapted to be passed one by one from a supply magazine to and through a sensing station and a plurality of subsequent stations in the machine, sensing means at said sensing station operable to sense the physically represented control data on each printing and control device when it is in said sensing station, an impression mechanism at one of said subsequent stations operable upon such a printing and control device to produce a printed impression therefrom, a qualifier unit comprising a matrix-mounting panel having matrix-positioning means thereon, a plurality of pairs of contacts on said panel for engagement with a matrix, a plurality of relays allocated one to each of said pairs of contacts and each of said relays having a pair of relay contacts connected respectively to the pair of contacts to which such relay is allocated, each of said relays having an energizing coil, a plug board having an output section having a plurality of output sockets allocated to and electrically connected to the energizing coils of the respective relays, said plug board having an input section having a plurality of input sockets adapted for selective plug connection to said output sockets, and means for electrically associating said input sockets with said sensing means, and means connected to said matrix panel and operable under control of said qualifier unit to effect operation of said impression mechanism when such particular printing and control device reaches said one of said subsequent stations.

12. In a printing machine of the kind through which printing and control devices, each adapted to have control data physically represented thereon in a plurality of multi-position data fields, are adapted to be passed one by one from a supply magazine to and through a sensing station and a plurality of subsequent stations in the machine, sensing means at said sensing station operable to sense the physically represented control data in all of the fields on each printing and control device when it is in said sensing station, an impression mechanism at one of said subsequent stations operable upon such a printing and control device to produce a printed impression therefrom, a qualifier unit comprising a matrix-mounting panel having matrix-positioning means thereon, a plurality of pairs of contacts on said panel for engagement with a matrix, a plurality of relays allocated one to each of said pairs of contacts and each of said relays having a pair of relay contacts connected respectively to the pair of contacts to which such relay is allocated, each of said relays having an energizing coil, a plug board having an output section having a plurality of output sockets allocated to and electrically connected to the energizing coils of the respective relays, said plug board having an input section comprising at least two socket fields each corresponding to said data fields and each socket field having a plurality of input sockets adapted for selective plug connection to said output sockets, and means for electrically associating said input sockets of each of the respective socket fields with the sensing means that sense any selected one of said data fields, and means connected to said matrix panel and operable under control of said qualifier unit to effect operation of said impression mechanism when such particular printing and control device reaches said one of said subsequent stations.

13. In a printing machine of the kind through which printing and control devices, each adapted to have control data physically represented thereon in a plurality of multi-position data fields, are adapted to be passed one by one from a supply magazine to and through a sensing station and a plurality of subsequent stations in the machine, sensing means at said sensing station operable to sense the physically represented control data in all of the fields on each printing and control device when it is in said sensing station, an impression mechanism at one of said subsequent stations operable upon such a printing and control device to produce a printed impression therefrom, a qualifier comprising first and second output contacts, a plurality of pairs of selecting contacts adapted for selective connection to afford a circuit between said output contacts when a particular one or more of said pairs of contacts have been bridged, a plurality of relays allocated one to each of said pairs of contacts and each of said relays having a pair of relay contacts connected respectively to a pair of contacts to which such relay is allocated, each of said relays having an energizing coil means for selectively connecting the energizing coils of said relays to particular portions of the sensing means of such a machine, and means for connecting said first and second output contacts in controlling relation to said impression mechanism of such a machine.

14. In a printing machine of the kind through which individual devices, each having text material thereon adapted to be reproduced, and each adapted to have control data physically represented thereon in a plurality of multi-position data fields, are adapted to be passed one by one from a supply magazine to and through a sensing station and a plurality of subsequent stations including an impression station in the machine, sensing means at said sensing station operable to sense the physically represented control data in all of the fields on each device when it is in said sensing station, an impression mechanism at said impression station operable to reproduce the text material from such a device, a qualifier unit comprising a matrix-mounting panel having matrix-positioning means thereon, a plurality of pairs of contacts on said panel for engagement with a matrix, a plurality of relays allocated one to each of said pairs of contacts and each of said relays having a pair of relay contacts connected respectively to the pair of contacts to which such relay is allocated, each of said relays having an energizing coil, means for selectively associating the coils of each of said relays with any of the sensing means at said sensing station, and means connected to said matrix panel and operable under control of said qualifier unit to govern operation of said impression mechanism.

References Cited in the file of this patent

UNITED STATES PATENTS

| Number | Name | Date |
|---|---|---|
| 1,488,667 | Duncan | Apr. 1, 1924 |
| 1,608,837 | Bryce | Nov. 30, 1926 |

(Other references on following page)

UNITED STATES PATENTS

| Number | Name | Date |
|---|---|---|
| 1,695,518 | Watson | Dec. 18, 1928 |
| 1,862,032 | Pierce | June 7, 1932 |
| 1,938,410 | Van Billiard | Dec. 5, 1933 |
| 2,053,063 | Bryce | Sept. 1, 1936 |
| 2,066,511 | Arlt | Jan. 5, 1937 |
| 2,140,601 | Serriere | Dec. 20, 1938 |
| 2,236,276 | Stewart | Mar. 25, 1941 |
| 2,265,222 | Benes | Dec. 9, 1941 |
| 2,299,007 | Bundy | Oct. 13, 1942 |
| 2,356,995 | Gollwitzer | Aug. 29, 1944 |
| 2,359,680 | Roth | Oct. 3, 1944 |
| 2,406,040 | Ryan | Aug. 20, 1946 |
| 2,414,813 | Hueber | Jan. 28, 1947 |
| 2,441,064 | Gollwitzer | May 4, 1948 |
| 2,450,997 | Shann | Oct. 12, 1948 |
| 2,456,273 | Gruver | Dec. 14, 1948 |
| 2,465,494 | Sullivan | Mar. 29, 1949 |
| 2,541,461 | Churchill | Feb. 13, 1951 |